United States Patent
Li et al.

(10) Patent No.: US 12,479,919 B2
(45) Date of Patent: *Nov. 25, 2025

(54) ANTI-CTLA4 AND ANTI-PD-1 BIFUNCTIONAL ANTIBODY, PHARMACEUTICAL COMPOSITION THEREOF AND USE THEREOF

(71) Applicant: Akeso Pharmaceuticals, Inc., Guangdong (CN)

(72) Inventors: Baiyong Li, Guangdong (CN); Yu Xia, Guangdong (CN); Zhongmin Maxwell Wang, Guangdong (CN); Peng Zhang, Guangdong (CN)

(73) Assignee: Akeso Pharmaceuticals, Inc., Guangzhou (CN)

( * ) Notice: Subject to any disclaimer, the term of this patent is extended or adjusted under 35 U.S.C. 154(b) by 292 days.

This patent is subject to a terminal disclaimer.

(21) Appl. No.: 18/067,669

(22) Filed: Dec. 16, 2022

(65) Prior Publication Data

US 2024/0010728 A1  Jan. 11, 2024

Related U.S. Application Data

(63) Continuation of application No. 16/327,076, filed as application No. PCT/CN2017/098466 on Aug. 22, 2017, now Pat. No. 11,578,128.

(30) Foreign Application Priority Data

Aug. 23, 2016 (CN) .......................... 201610705624.2

(51) Int. Cl.
C07K 16/28 (2006.01)
A61K 39/395 (2006.01)
A61P 7/06 (2006.01)
A61P 35/00 (2006.01)
A61P 35/02 (2006.01)
C07K 16/46 (2006.01)
C12N 15/62 (2006.01)
G01N 33/577 (2006.01)
G01N 33/68 (2006.01)
A61K 39/00 (2006.01)

(52) U.S. Cl.
CPC ........ *C07K 16/2818* (2013.01); *A61K 39/395* (2013.01); *A61P 7/06* (2018.01); *A61P 35/00* (2018.01); *A61P 35/02* (2018.01); *C07K 16/46* (2013.01); *C07K 16/468* (2013.01); *C12N 15/62* (2013.01); *G01N 33/577* (2013.01); *G01N 33/68* (2013.01); *A61K 2039/505* (2013.01); *C07K 2317/24* (2013.01); *C07K 2317/31* (2013.01); *C07K 2317/622* (2013.01); *C07K 2317/76* (2013.01); *C07K 2317/92* (2013.01); *G01N 2333/70521* (2013.01)

(58) Field of Classification Search
None
See application file for complete search history.

(56) References Cited

U.S. PATENT DOCUMENTS

| | | |
|---|---|---|
| 7,488,802 B2 | 2/2009 | Collins et al. |
| 10,066,013 B2 | 9/2018 | Chen et al. |
| 10,344,090 B2 | 7/2019 | Yuan et al. |
| 10,449,251 B2 | 10/2019 | Li et al. |
| 11,578,128 B2 | 2/2023 | Li et al. |
| 12,076,398 B2 | 9/2024 | Li et al. |
| 2015/0093380 A1 | 4/2015 | Honjo et al. |
| 2017/0216433 A1* | 8/2017 | Li .................... C07K 16/28 |
| 2019/0161548 A1* | 5/2019 | Johnson .............. A61P 35/00 |
| 2019/0177414 A1 | 6/2019 | Li et al. |
| 2019/0185569 A1 | 6/2019 | Li et al. |
| 2019/0321466 A1 | 10/2019 | Li et al. |
| 2022/0275089 A1 | 9/2022 | Xia et al. |
| 2025/0041409 A1 | 2/2025 | Li et al. |

FOREIGN PATENT DOCUMENTS

| | | |
|---|---|---|
| CN | 1753912 A | 3/2006 |
| CN | 102264762 A | 11/2011 |
| CN | 102741423 A | 10/2012 |
| CN | 102822198 A | 12/2012 |
| CN | 103547595 A | 1/2014 |
| CN | 103608040 A | 2/2014 |
| CN | 104250302 A | 12/2014 |
| CN | 104936982 A | 9/2015 |
| CN | 104974253 A | 10/2015 |
| CN | 104987421 A | 10/2015 |
| CN | 105175544 | * 10/2015 ............. C07K 16/28 |

(Continued)

OTHER PUBLICATIONS

Okawa et al (Intern Med 58: 699-702, 2019).*
Tanios (Blood (2018) 132 (Supplement 1): 2324).*
CN105175544, Hu et al., published Dec. 2015, English Translation.*
He, M., et al., "Remarkably similar CTLA-4 binding properties of therapeutic ipilimumab and tremelimumab antibodies," Oncotarget, May 19, 2017, vol. 19; 8(40), pp. 67129-67139.
Inbal Sela-Culang, et al., "The Structural Basis of Antibody-Antigen Recognition," Frontiers in Immunology, vol. 4, Oct. 8, 2013, DOI: 10.3389/fimmu.2013.00302, p. 7.

(Continued)

*Primary Examiner* — Laura B Goddard
(74) *Attorney, Agent, or Firm* — COOLEY LLP

(57) ABSTRACT

An anti-CTLA4 (cytotoxic T lymphocyte associated antigen 4) and anti-PD-1 (programmed cell death 1) bifunctional antibody. a pharmaceutical composition thereof and use thereof. Particularly, the anti-CLTA4 and anti-PD-1 bifunctional antibody comprises a first protein functional domain that targets PD-1 and a second protein functional domain that targets CTLA-4. The bifunctional antibody can bind to CTLA-4 and PD-1 specifically, relieve immunosuppression of CTLA4 and PD-1 on an organism specifically, activate T lymphocytes, and thus has good application prospects.

22 Claims, 32 Drawing Sheets

Specification includes a Sequence Listing.

(56) References Cited

FOREIGN PATENT DOCUMENTS

| | | | |
|---|---|---|---|
| CN | 105175544 A | 12/2015 | |
| CN | 105175545 A | 12/2015 | |
| CN | 105296433 A | 2/2016 | |
| CN | 105754990 A | 7/2016 | |
| CN | 105873615 A | 8/2016 | |
| CN | 106967172 A | 7/2017 | |
| CN | 106977602 A | 7/2017 | |
| EP | 3176181 A1 | 6/2017 | |
| KR | 20160058938 A | 5/2016 | |
| WO | WO-2009134776 A2 | 11/2009 | |
| WO | WO-2010036959 A2 | 4/2010 | |
| WO | WO-2011113019 A2 | 9/2011 | |
| WO | WO-2012120125 A1 | 9/2012 | |
| WO | WO-2012135408 A1 | 10/2012 | |
| WO | WO-2012145493 A1 | 10/2012 | |
| WO | WO-14022758 A1 | 2/2014 | |
| WO | WO-2014209804 A1 | 12/2014 | |
| WO | WO-2015048520 A1 | 4/2015 | |
| WO | WO-2015085847 A1 | 6/2015 | |
| WO | WO-2015101587 A1 | 7/2015 | |
| WO | WO-2015112800 A1 | 7/2015 | |
| WO | WO-2016015675 A1 * | 2/2016 | ........... A61K 39/395 |
| WO | WO-2016180034 A1 | 11/2016 | |
| WO | WO-2017106061 A1 | 6/2017 | |
| WO | WO-2017128534 A1 | 8/2017 | |
| WO | WO-2018036472 A1 | 3/2018 | |
| WO | WO-2018036473 A1 | 3/2018 | |

OTHER PUBLICATIONS

Kontermann R.E., "Bispecific Antibodies," Springer, 2011, pp. 1-381.

Lu D., et al., "Fab-scFv fusion protein: an efficient approach to production of bispecific antibody fragments," Recombinant Technology, 2002, vol. 267, pp. 213-226.

Mazor Y., et al., "Enhanced tumor-targeting selectivity by modulating bispecific antibody binding affinity and format valence," Scientific Reports, 2017, pp. 1-11.

Monnier., et al., "In Vivo Applications of Single Chain Fv (Variable Domain) (scFv) Fragments," Antibodies, 2013, vol. 2, pp. 193-208.

Sun, L., et al., "Targeting Glycosylated PD-1 Induces Potent Antitumor Immunity", Cancer research, vol. 80, No. 11, Jun. 1, 2020, pp. 2298-2310.

Tan, S., "An unexpected N-terminal loop in PD-1 dominates binding by nivolumab," Nature communications, Feb. 6, 2017, vol. 8, 14369.

Nair et al., "Immunotherapy-associated hemolytic anemia with pure red-cell aplasia." New England Journal of Medicine 374(11):1096-1097 (Mar. 17, 2016).

Philips, G. K. et al., "Therapeutic uses of anti-PD-1 and anti-PD-L1 antibodies," International Immunology, vol. 27, No. 1, Oct. 2014, pp. 39-46.

Altshuler et al., Production of recombinant antibodies and methods for increasing their affinity, Advances in biological chemistry 50:229-250 (2010).

Anonymous: "Study of REGN2810 (Anti-PD-1) in Patients With Advanced Malignancies—Full Text View—ClinicalTrials.gov", Mar. 9, 2015, Retrieved from the Internet: URL: https://clinicaltrials.gov/ct2/show/NCT02383212 [retrieved on Mar. 5, 2020], 8 pages.

Blatter et al., "Abstract 736: Combining PD1- and CTLA4-inhibiting antibodies with cisplatin or PARP inhibition in an attempt to eradicate BRCA1-deficient mouse mammary tumors," Cancer Research, AACR 106th Annual Meeting 2015; Apr. 18-22, 2015; Philadelphia, PA, 4 pages retrieved May 22, 2019 at http://cancerres.aacrjournals.org/content/75/15_Supplement/736.

Brahmer, J.R., et al., "Nivolumab: targeting PD-1 to bolster antitumor immunity," Future Oncology, 2015, vol. 11(9), pp. 1307-1326.

Chan et al., "Abstract 5021: Regulatory T-Cells and Effects of Anti-CTLA4 and anti-PD1 Therapy in a Transgenic Murine Model of Neuroblastoma," Proceedings: AACR Annual Meeting 2014; Apr. 5-9, 2014; San Diego, CA, 4 pages, retrieved May 22, 2019 at http://cancerres.aacrjournals.org/content/74/19_Supplement/5021.

Hoogenboom, H., "Selecting and screening recombinant antibody libraries", Nature Biotechnology 23(9): 1105-1116 (2005).

Mcdermott, J., et al., "Pembrolizumab: PD-1 inhibition as a therapeutic strategy in cancer," Drugs of Today, 2015, vol. 51(1), pp. 7-20.

Miao et al., "Role of Programmed Death-I PD-1 in Patients with Aplastic Anemia," Jiangsu Medical Journal, pp. 626-627 (2009). Explanation: Miao et al. describes detecting the levels of PD-1 and soluble PD-1 in peripheral blood of patients with aplastic anemia (AA) and their role in developing AA.

Okawa et al., "Pembrolizmab-Induce Autoimmune Hemolytic Anemia and Hemophagocytic Lymphohistiocytosis in Non-Small Cell Lung Cancer," Intern Med 58:699-72 (2019).

Orcutt et al., "A modular IgG-scFv bispecific antibody topology, "Protein Engineering, Design & Selection: Peds Apr. 23(4):221-228 (2010).

Tanios et al., "Autoimmune Hemolytic Anemia and Checkpoint Inhibitors: 68 Cases from the FDA Databases and Critical Review," Blood (2018) 132 (Supplement 1): 2324, pp. 1-6.

* cited by examiner

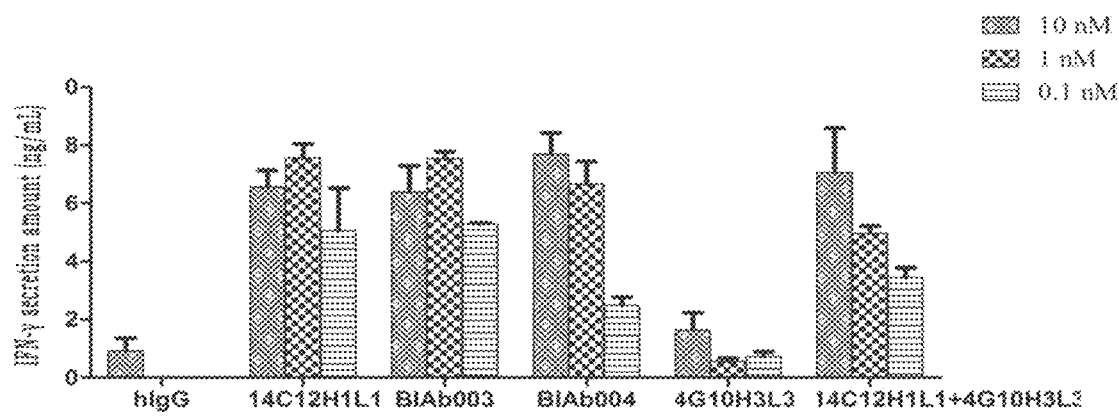
Figure S3
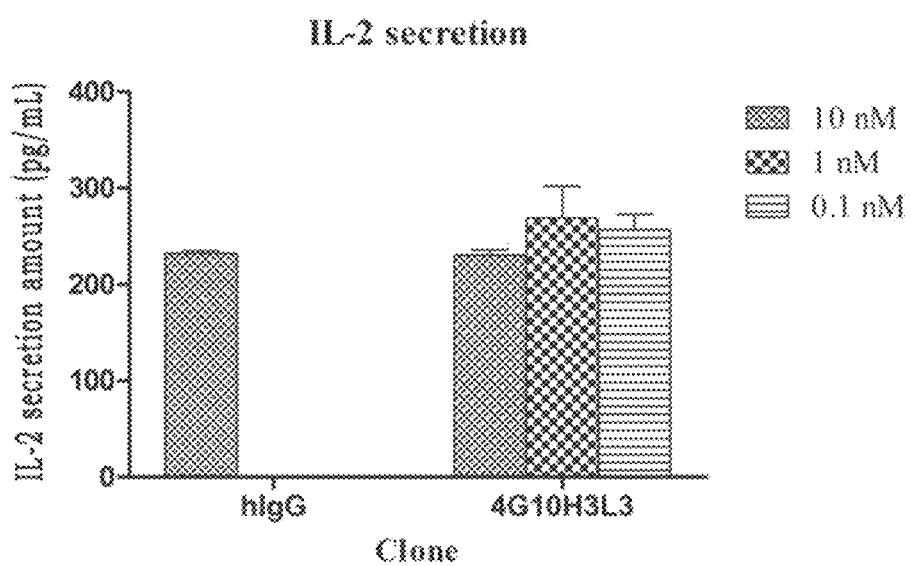
Figure S4

ANTI-CTLA4 AND ANTI-PD-1 BIFUNCTIONAL ANTIBODY, PHARMACEUTICAL COMPOSITION THEREOF AND USE THEREOF

CROSS-REFERENCE TO RELATED APPLICATIONS

This application is a continuation of U.S. patent application Ser. No. 16/327,076, filed Feb. 21, 2019, which is a U.S. National Phase of PCT/CN2017/098466, filed Aug. 22, 2017, which claims priority to Chinese Application No. 201610705624.2, filed Aug. 23, 2016, each of which is hereby incorporated by reference.

REFERENCE TO AN ELECTRONIC SEQUENCE LISTING

The contents of the electronic sequence listing (AKSO_002_02US_SeqList_ST26.xml; Size: 63,212 bytes; and Date of Creation: Dec. 16, 2022) are herein incorporated by reference in its entirety.

TECHNICAL FIELD

The present invention belongs to the field of tumor therapy and molecular immunology. The present invention relates to anti-CTLA4 and anti-PD-1 bispecific antibodies, and their pharmaceutical compositions and methods of use. Specifically, the present invention relates to monoclonal antibodies against CTLA4 and PD-1 proteins.

TECHNICAL BACKGROUND

Cytotoxic T lymphocyte associated antigen 4 (CTLA4) closely relates to CD28 in gene structure, chromosomal localization, homology of sequences and gene expression, and both of them are receptors of costimulatory molecule B7, and mainly expresses on the cell surface of activated T cells. Interaction of CTLA4 and B7 inhibits the activation of T cells in mice and human, and negatively regulates the activation of T cells.

Anti-CTLA4 antibody or CTLA4 ligand can prevent CTLA4 from binding to its natural ligand, thereby block the negative signal transduction in T cells induced by CTLA4, and enhance the response of T cells to various antigens, which has been confirmed by both in vivo and in vitro studies. Currently, clinical trials of anti-CTLA4 antibodies treating prostate cancer, bladder cancer, colorectal cancer, gastrointestinal cancer, liver cancer, and malignant melanoma, etc. are ongoing (Grosso J F., Jure-Kunkel M N., CTLA-4 blockade in tumor models: an overview of pre-clinical and translational research. Cancer Immun. 2013; 13:5. Epub 2013 Jan. 22).

Interleukin 2 (IL-2) produced by T cells is a cytokine regulating proliferation of certain subgroups of T cells, and a crucial factor regulating immune responses, promoting the proliferation of activated B cells and participating in antibody responses, hematopoiesis and tumor surveillance. Recombinant human IL-2 has been approved by the U. S. FDA for the treatment of malignant tumors (including melanoma, renal tumors, etc.) while undergoing clinical studies to treat chronic viral infections (Chavez, A. R., et al., Pharmacologic administration of interleukin-2. Ann N Y Acad Sci, 2009. 1182: p. 14-27). In in vitro experiments, anti-CTLA4 antibodies can specifically remove the immunosuppression of CTLA4, activate T cells, and induce the generation of IL-2, displaying promising prospects in therapies for neoplastic and parasitic diseases.

As crucial factors on T cell functions, CTLA4 and anti-CTLA4 antibodies have particular therapeutic effects via intervening immune microenvironment, displaying high efficacy and supplementing traditional medicine, thereby crafting new opportunities in therapies. The therapeutic effects of CTLA4 and anti-CTLA4 antibodies are investigated in various pre-clinical and clinical studies, such as inhibition of airway hyper-responsiveness in asthma animal models, prevention of the development of rheumatic diseases, and induction of immune tolerance in allogeneic transplantation, etc. Meanwhile, although no adverse effects have been found in short-term clinical trials, we should note the potential impacts of long-term usage of drugs targeting CTLA4, such as anti-CTLA4 antibody, might provoke auto-immune diseases due to over-blockage on CTLA4-B7 signal pathway. Since antibodies can bind specifically to its antigen and induce target cell lysis or block pathological progress, drug development of antibodies especially humanized antibodies is very important in treating malignant tumors or auto-immune diseases.

The transmembrane receptor PD-1 (programmed cell death 1, also known as PD-1) is a member of the CD28 gene family, expresses in activated T cells, B cells and myeloid cells. Receptors of PD-1, PDL1 and PDL2, belong to the B7 superfamily; wherein PDL1 is broadly expressed in a variety of cells including T cells, B cells, endothelial cells and epithelial cells, while PDL2 is only expressed in antigen presenting cells such as dendritic cells and macrophages.

T cells play an important role in clearing viral infections, but T cell antivirus responses are often associated with immunopathogenesis. Although negative regulation of T cell activation mediated by PD-1 is critical in reducing tissue damage caused by infection, blocking or inhibiting the PD-1 pathway might lead to autoimmune diseases, for example, PD-1 gene knockout mice showed more effective clearance of pancreatic virus infection, but led to more severe liver damage (Iasi et al., 2003, j. Exp. J Med, 198, 39-50). In addition, tumors with high PD-1 expression often develop into cancers that are difficult to detect (Hamanishi et al., 2007, Proc. Natl. Acad. Sci. USA 104:3360-5). An established method to regulate PD-1 expression is through injection of antibodies in vivo.

Due to the broad antitumor prospects and astounding efficacy of PD-1 antibodies, it is generally believed that antibodies against PD-1 pathways will lead to breakthroughs in the treatment of a variety of tumors: non-small cell lung cancer, renal cell carcinoma, ovarian cancer, melanoma (Homet M. B., Parisi G., et al., Anti-PD-1 Therapy in Melanoma. Semin Oncol. 2015 June; 42(3):466-473), leukemia and anemia (Held S A, Heine A, et al., Advances in immunotherapy of chronic myeloid leukemia CML. Curr Cancer Drug Targets. 2013 September; 13(7):768-74). Ever since the revelation of the unprecedented clinical efficacy data at the annual meetings of American Association for Cancer Research (AACR) and American Society of Clinical Oncology (ASCO) in 2012 and 2013, PD-1 antibodies have become the hottest new drugs in R&D in the global pharmaceutical industry.

Interferon gamma (IFN-γ) is produced naturally mainly by natural killer (NK) cells, natural killer T (NKT) cells, or by effector T cells consisting of CD4$^+$ Th1 cells and CD8$^+$ cytotoxic T lymphocytes (CTL) after being stimulated by specific antigens. As an important innate immune and acquired immune cytokine, IFN-γ plays an import role in antagonizing or inhibiting viral, some bacterial and protozoon infections. In the meantime, IFN-γ can activate macrophages and induce the expression of type 2 major histocompatibility complex (MHC) to activate immune responses to control the progression of tumors (Schoenborn J R, Wilson C B. Regulation of Interferon-gamma Durin g Innate and Adaptive Immune Responses. Advances in Immunology 2007; 96: 41-101 ☐.

Monoclonal antibodies (mAbs) targeting a single antigen have been used to treat cancers, inflammation, infectious diseases, etc. However, the cause and in vivo factors of many diseases are complicated, including up- or down-regulations of different proteins, cytokines or receptors in different signaling pathways, either inhibiting or promoting biological functions. Therefore, simultaneously blocking different targets can improve treatment efficacy, which can be achieved by combinations of drugs with different targets or by one drug with multiple targets, such as multispecific antibodies.

Bispecific antibody, also called bi-functional antibody targeting two different antigens at the same time, can be produced by immune sorting purification, as well as advantageous recombinant technologies with flexibilities in binding site optimization, format of synthesis, and production output. At present, there have been more than 45 forms of bispecific antibodies (Müller D, Kontermann R E. Bispecific antibodies for cancer immunotherapy: Current perspectives. BioDrugs 2010; 24:89-98). The IgG-scFv structure, named after Morrison, has been used in many bispecific antibodies, (1997 Coloma M J, Morrison S L. The Design and production of will be tetravalent bispecific antibodies. Nat Biotechnol. Nature Biotechnology, 1997; 15, 15, 9-163). Bispecific antibody with IgG-scFv structure has been proven as an ideal form of bispecific antibody with advantages in antibody engineering, expression and purification due to its similarity to the natural IgG format (Miller B R, Demarest S J, et al., Stability engineering of scFvs for the development of bispecific and multivalent antibodies. Protein Eng Des Sel 2010; 23:549-57; Fitzgerald J, Lugovskoy A. Rational engineering of antibody therapeutics targeting multiple oncogene pathways. MAbs 2011; 3:299-309).

However, bispecific antibodies have been developed mostly against antigens on the surface of two different cells, not against two different antigens on the same cell. Thus, a bispecific antibody drug against both PD-1 and CTLA4 needs to be developed.

SUMMARY OF THE INVENTION

Through profound research and creative work, by immunizing mice with recombinant PD-1 or CTLA4 expressed in mammalian cells as antigen, the inventors obtained hybridoma cells via fusion of mouse splenocytes and myeloma cells. After screening a large number of samples, the inventors obtained the following hybridoma cell lines respectively:

Hybridoma cell line LT002 (CTLA4-4G10), which was preserved in China Center for Type Culture Collection (CCTCC) on Jun. 16, 2015, with the CCTCC Deposit Accession NO: C201587;
and
hybridoma cell line LT003 (PD-1-14C12), which was preserved in China Center for Type Culture Collection (CCTCC) on Jun. 16, 2015, with the CCTCC Deposit Accession NO: C2015105.

The inventors surprisingly found that:

Hybridoma cell line LT002 is capable of secreting a specific monoclonal antibody (named 4G10) that binds specifically to CTLA4, and the monoclonal antibody can effectively block the interaction of CTLA4 to B7.

Hybridoma cell line LT003 is capable of secreting a specific monoclonal antibody (named 14C12) that specifically binds to PD-1, and the monoclonal antibody can effectively block the interaction of PD-1 to PDL1.

Furthermore, the inventors generated humanized antibodies against CTLA4 (named 4G10H1L1, 4G10H3L3, 4G10H4L3 and 8D2H14L2, respectively) and humanized antibodies against PD-1 (named 14C12H1L1) in a creative way.

Furthermore, the inventors created a series of new humanized bispecific antibodies (named BiAb001 BiAb002 BiAb003, BiAb004, BiAb007 and BiAb010, respectively) via recombining the two kinds of humanized antibodies, which can bind both CTLA4 and PD-1, and block interactions of CTLA4 with B7, and PD-1 with PDL1. The bispecific antibodies can effectively bind and activate human T cells, induce lymphocytes to secrete IFN-γ and IL-2, with the potential to be prepared into drugs for prevention and treatment of cancers, such as lung cancer, melanoma, renal cancer, ovarian cancer and leukemia.

The following are provided by the present invention:
The present invention relates to a bispecific antibody thereof, wherein,
the first protein functional area targets PD-1,
and
the second protein functional area targets CTLA4, In one embodiment of the invention, the said bispecific antibody, wherein the said first and second protein functional areas are connected directly or via connecting fragments; Preferably, the connecting fragments are (GGGGS)n, and n is a positive integer, such as 1, 2, 3, 4, 5 or 6.

In one embodiment of the invention, the said bispecific antibody, wherein,
the said first and second protein functional areas are respectively immunoglobulins or their antigen-binding fragments, such as half antibody, Fab, F(ab')2 or single-chain antibody.

Preferably, the said first protein functional area is an immunoglobulin, and the said second protein functional area is a single-chain antibody;
or,
Preferably, the said first protein functional area is a single-chain antibody, and the said second protein functional area is an immunoglobulin.

In one embodiment of the invention, the said bispecific antibody, wherein, the quantity of the first protein functional area or the second protein functional area is one, two, or more, independently.

In one embodiment of the invention, the said bispecific antibody, wherein, the said immunoglobulin is IgG, IgA, IgD, IgE or IgM; Preferably IgG, such as IgG1, IgG2, IgG3, or IgG4.

In one embodiment of the invention, the said bispecific antibody, wherein, the said single-chain antibody is attached at the c-terminal of the heavy chain of the immunoglobulin. Since one immunoglobulin consists of two heavy chains, thus one immunoglobulin molecule is linked to two single-chain antibody molecules. Preferably, the two said single-chain antibody molecules are the same.

In one embodiment of the invention, the said bispecific antibody, wherein,
the heavy chain variable region of the said immunoglobulin comprises CDRs with the amino acid sequences of SEQ ID NO: 29-31, and the light chain variable region of the said immunoglobulin comprises CDRs with the amino acid sequences of SEQ ID NO: 32-34;

And/or, the heavy chain variable region of the said single-chain antibody comprises CDRs with the amino acid sequences of SEQ ID NO: 35-37, or SEQ ID NO: 35, SEQ ID NO: 41 and SEQ ID NO: 37, or SEQ ID NO: 42-44; and the light chain variable region of the said single-chain antibody comprises CDRs with the amino acid sequences of SEQ ID NO: 38-40, or SEQ ID NO: 45-47.

In one embodiment of the invention, the said bispecific antibody, wherein, the heavy chain variable region of the said immunoglobulin comprises CDRs with the amino acid sequences of SEQ ID NO: 35-37, or SEQ ID NO: 35, SEQ ID NO: 41 and SEQ ID NO: 37, or SEQ ID NO: 42-44; and the light chain variable region of the said immunoglobulin comprises CDRs with the amino acid sequences of SEQ ID NO: 38-40, or SEQ ID NO: 45-47;

and/or, the heavy chain variable region of the said single-chain antibody comprises CDRs with the amino acid sequences of SEQ ID NO: 29-31; and the light chain variable region of the said single-chain antibody comprises CDRs with the amino acid sequences of SEQ ID NO: 32-34.

In one embodiment of the invention, the said bispecific antibody, wherein, the amino acid sequence of the heavy chain variable region of the said immunoglobulin is selected from SEQ ID NO. 16 or SEQ ID NO. 20; the amino acid sequence of the light chain variable region of the said immunoglobulin is selected from SEQ ID NO: 18 or SEQ ID NO: 22;

And/or, the amino acid sequence of the heavy chain variable region of the said single-chain antibody is selected from SEQ ID NO: 2, SEQ ID NO: 6, SEQ ID NO: 10, SEQ ID NO: 14 or SEQ ID NO: 25; the amino acid sequence of the light chain variable region of the said single chain antibody is selected from SEQ ID NO: 4, SEQ ID NO: 8, SEQ ID NO: 12 or SEQ ID NO: 27.

In one embodiment of the invention, the said bispecific antibody, wherein, the amino acid sequence of the heavy chain variable region of the said immunoglobulin is selected from SEQ ID NO: 2, SEQ ID NO: 6, SEQ ID NO: 10, SEQ ID NO: 14 or SEQ ID NO: 25; the amino acid sequence of the light chain variable region of the single-chain antibody is selected from SEQ ID NO: 4, SEQ ID NO:8, SEQ ID NO:12 or SEQ ID NO:27;

and/or,

The amino acid sequence of the heavy chain variable region of the said single-chain antibody is selected from SEQ ID NO: 16 or SEQ ID NO: 20; the amino acid sequence of the light chain variable region of the said immunoglobulin is selected from SEQ ID NO: 18 or SEQ ID NO: 22.

In one embodiment of the invention, the said bispecific antibody, wherein, the said immunoglobulin contains non-CDR regions from species other than mouse, for example, from human.

In one embodiment of the invention, the constant region of the said immunoglobulin is humanized. For example, the constant region of the heavy chain is Ig gamma-1 chain C region, ACCESSION: P01857; the constant region of light chain is Ig kappa chain C region, ACCESSION: P01834.

In one embodiment of the invention, the said bispecific antibody, wherein, the said bispecific antibody binds to CTLA4 protein and/or PD-1 protein with a $K_D$ less than approximately $10^{-5}$ M, such as less than approximately $10^{-6}$ M, $10^{-7}$ M, $10^{-8}$ M, $10^{-9}$ M or $10^{-10}$ M or less.

The present invention also relates to a bispecific antibody, whose heavy chain variable region comprises CDRs with amino acid sequences of SEQ ID NO: 29-31, SEQ ID NO: 35-37, or SEQ ID NO: 35, SEQ ID NO: 41, and SEQ ID NO: 37, or SEQ ID NO: 42-44;

and, of SEQ ID NO: 32-34, or SEQ ID NO: 38-40, or SEQ ID NO: 45-47;

And light chain variable region comprises CDRs with amino acid sequences of SEQ ID NO: 32-34, or SEQ ID NO: 38-40, or SEQ ID NO: 45-47;

Preferably, the CDRs in the light chain variable region and the heavy chain variable region are not the same.

The present invention relates to an isolated nucleic acid molecule comprising a nucleotide sequence capable of encoding the heavy chain variable region of the antibody, wherein, the heavy chain variable region of the said antibody comprises CDRs with amino acid sequences selected from SEQ ID NO: 29-31, SEQ ID NO: 35-37, or SEQ ID NO: 35, SEQ ID NO: 41, and SEQ ID NO: 37, or SEQ ID NO: 42-44;

and, selected from SEQ ID NO: 32-34, or SEQ ID NO: 38-40, or SEQ ID NO: 45-47.

The present invention also relates to an isolated nucleic acid molecule comprising a nucleotide sequence capable of encoding the light chain variable region of the antibody, wherein, the light chain variable region of the said antibody comprises CDRs with amino acid sequences selected from SEQ ID NO: 32-34, or SEQ ID NO: 38-40, or SEQ ID NO: 45-47.

The present invention relates to a vector comprising the isolated nucleic acid molecule described in the present invention.

The present invention relates to a host cell comprising the isolated nucleic acid molecule described in the present invention, or the vector described in the present invention.

The present invention relates to a method for preparing the bispecific antibodies described in the present invention, by culturing the host cells in the present invention under appropriate conditions, and recovering the said bispecific antibodies from the cell culture.

The present invention relates to conjugates, including the bispecific antibodies described in the present invention and a conjugating partner as a detectable marker. Specifically, the said conjugating partners are radioactive isotopes, fluorescein, luminescent materials, colorful substances, or enzymes.

The present invention relates to reagent kits, consisting of the bispecific antibodies or the conjugates described in the invention Specifically, the reagent kits may contain a secondary antibody, which specifically recognizes the said bispecific antibody; optionally, such secondary antibody may contain detectable markers such as radioactive isotopes, fluorescein, luminescent materials, colorful substances, or enzymes.

The present invention relates to usage of the said bispecific antibodies described in the present invention to prepare reagent kits for detection of the existence or the levels of CTLA4 and/or PD-1 in samples.

The present invention relates to a pharmaceutical composition comprising the said bispecific antibodies or the conjugates described in the invention. Optionally, it may also comprise a pharmaceutically acceptable carrier or excipient.

The present invention relates to use of the bispecific antibodies or conjugates described in the invention for producing drugs that are used for prevention and/or treatment of tumors or anemia, or for diagnosis of tumors or anemia; specifically, the said tumors may be melanoma, renal cancer, prostate cancer, bladder cancer, colorectal cancer, gastrointestinal cancer, liver cancer, non-small cell lung cancer, ovarian cancer and leukemia.

The present inventors have found through animal experiments that, bispecific antibody BiAb004 described in the invention can effectively inhibit the growth of MC38 tumor cells inoculated subcutaneously in right side of PD-1 HuGEMM mice, which the growth of tumor volume in PD-1 HuGEMM tumor-bearing mice is significantly inhibited.

The present invention relates to the use of the bispecific antibodies or the conjugates described in the present invention, to prepare drugs with the following purposes:
  Testing CTLA4 level in samples,
  Blocking CTLA4 binding to B7,
  Regulating (e.g. down-regulating) CTLA4 activity or CTLA4 levels,
  Removing immunosuppression of CTLA4,
  Activating T lymphocytes, or
  Increasing the secretion of IL-2 in T lymphocytes;
  And/or,
  Blocking PD-1 binding to PDL1,
  Regulating (e.g. down-regulating) PD-1 activity or PD-1 levels,
  Removing immunosuppression of PD-1, or
  Increasing the secretion of IFN-γ in T lymphocytes.

The present invention relates to an in vivo or in vitro method to apply to cells or subjects in need with an effective dose of the bispecific antibodies or the conjugates described in the present invention, and the said method is selected from the following:
  Testing CTLA4 level in samples,
  Blocking CTLA4 binding to B7,
  Regulating (e.g. down-regulating) CTLA4 activity or CTLA4 levels,
  Removing immunosuppression of CTLA4,
  Activating T lymphocytes, or
  Increasing the secretion of IL-2 in T lymphocytes;
  And/or,
  Blocking PD-1 binding to PDL1,
  Regulating (e.g. down-regulating) PD-1 activity or PD-1 levels,
  Removing immunosuppression of PD-1, or
  Increasing the secretion of IFN-γ in T lymphocytes.

In in vitro experiments in the present invention, the anti-CTLA4 antibodies, the anti-PD-1 antibodies, and the anti-CTLA4-anti-PD-1 bispecific antibodies described in the present invention all can induce the secretion of IFN-γ, and activate the immune response.

The present invention relates to a method for the prevention and/or treatment of tumors or anemia, or for diagnosis of tumors or anemia, including procedures to apply to subjects in need with an effective dose of the bispecific antibodies or the conjugates described in the present invention; specifically, the said tumors may be melanoma, renal cancer, prostate cancer, bladder cancer, colorectal cancer, gastrointestinal cancer, liver cancer, non-small cell lung cancer, ovarian cancer or leukemia.

The use of bispecific antibodies or conjugates thereof described in the present invention for the prevention and/or treatment of tumors or anemia, or for diagnosis of tumors or anemia; specifically, the said tumors may be melanoma, renal cancer, prostate cancer, bladder cancer, colorectal cancer, gastrointestinal cancer, liver cancer, non-small cell lung cancer, ovarian cancer or leukemia.

Use of bispecific antibodies or the conjugates thereof described in the present invention, with the following purposes:
  Blocking CTLA4 binding to B7,
  Regulating (e.g. down-regulating) CTLA4 activity or CTLA4 levels,
  Removing immunosuppression of CTLA4,
  Activating T lymphocytes, or
  Increasing the secretion of IL-2 in T lymphocytes;
  And/or,
  Blocking PD-1 binding to PDL1,
  Regulating (e.g. down-regulating) PD-1 activity or PD-1 levels,
  Removing immunosuppression of PD-1, or
  Increasing the secretion of IFN-γ in T lymphocytes.

Antibody drugs, especially monoclonal antibodies (MAB), have shown good efficacy in the treatment of a variety of diseases. The traditional methods to obtain therapeutic antibodies are to immunize animals with antigens to generate antigen-specific antibodies, or to improve low affinity antibodies by affinity maturation. However, these methods are time- and effort-consuming, and often may not target the specific epitopes on the antigen.

The variable regions of light and heavy chains of antibodies determine binding of an antibody to its antigen; a variable region of each chain contains three highly variable regions, which are called complementarity determining region (CDR) (the CDRs of a heavy chain (H) consist of HCDR1, HCDR2 and HCDR3; the CDRs of a light chain (L) consist of LCDR1, LCDR2 and LCDR3; named by Kabat et al (Sequences of Proteins of Immunological Interest, Fifth Edition (1991), 1-3, NIH Publication 91-3242, Bethesda Md)).

Use conventional techniques known by those of ordinary skill in the art, for example, to analyze amino acid sequences of CDRs in the monoclonal antibodies listed in (1)-(13) through VBASE2 database, and the results are as follows:
  (1) 14C12

The amino acid sequence of the heavy chain variable region is shown in SEQ ID NO: 16, and the amino acid sequence of the light chain variable region is shown in SEQ ID NO: 18.

The amino acid sequences of three CDRs of the heavy chain variable region are as follows:

```
                                      (SEQ ID NO: 29)
        HCDR1: GFAFSSYD
                                      (SEQ ID NO: 30)
        HCDR2: ISGGGRYT
                                      (SEQ ID NO: 31)
        HCDR3: ANRYGEAWFAY
```

The amino acid sequences of three CDRs of the light chain variable region are as follows:

```
                                      (SEQ ID NO: 32)
        LCDR1: QDINTY
                                      (SEQ ID NO: 33)
        LCDR2: RAN
```

-continued

```
LCDR3: LQYDEFPLT                        (SEQ ID NO: 34)
```

(2) 14C12H1L1

The amino acid sequence of the heavy chain variable region is shown in SEQ ID NO: 20, and the amino acid sequence of the light chain variable region is shown in SEQ ID NO: 22.

The amino acid sequences of three CDRs of the heavy chain variable region are the same as those of 14C12.

The amino acid sequences of three CDRs of the light chain variable region are the same as those of 14C12.

(3) 4G10

The amino acid sequence of the heavy chain variable region is shown in SEQ ID NO: 2, and the amino acid sequence of the light chain variable region is shown in SEQ ID NO: 4.

The amino acid sequences of three CDRs of the heavy chain variable region are as follows:

```
HCDR1: GYSFTGYT                         (SEQ ID NO: 35)
HCDR2: INPYNNIT                         (SEQ ID NO: 36)
HCDR3: ARLDYRSY                         (SEQ ID NO: 37)
```

The amino acid sequences of three CDRs of the light chain variable region are as follows:

```
LCDR1:
                                        (SEQ ID NO: 38)
TGAVTTSNF

LCDR2:
                                        (SEQ ID NO: 39)
GTN

LCDR3:
                                        (SEQ ID NO: 40)
ALWYSNHWV
```

(4) 4G10H1L1

The amino acid sequence of the heavy chain variable region is shown in SEQ ID NO: 6, and the amino acid sequence of the light chain variable region is shown in SEQ ID NO: 8.

The amino acid sequences of three CDRs of the heavy chain variable region are the same as those of 4G10.

The amino acid sequences of three CDRs of the light chain variable region are the same as those of 4G10.

(5) 4G10H3L3 The amino acid sequence of the heavy chain variable region is shown in SEQ ID NO:

10, and the amino acid sequence of the light chain variable region is shown in SEQ ID NO: 12.

The amino acid sequences of three CDRs of the heavy chain variable region are the same as those of 4G10.

The amino acid sequences of three CDRs of the light chain variable region are the same as those of 4G10.

(6) 4G10H4L3

The amino acid sequence of the heavy chain variable region is shown in SEQ ID NO: 14, and the amino acid sequence of the light chain variable region is shown in SEQ ID NO: 12.

The amino acid sequences of three CDRs of the heavy chain variable region are as follows:

```
HCDR1:
                                        (SEQ ID NO: 35)
GYSFTGYT

HCDR2:
                                        (SEQ ID NO: 41)
INPYNDIT

HCDR3:
                                        (SEQ ID NO: 37)
ARLDYRSY
```

The amino acid sequences of three CDRs of the light chain variable region are the same as those of 4G10.

(7) 8D2H14L2

The amino acid sequence of the heavy chain variable region is shown in SEQ ID NO: 25, and the amino acid sequence of the light chain variable region is shown in SEQ ID NO: 27.

The amino acid sequences of three CDRs of the heavy chain variable region are as follows:

```
HCDR1:
                                        (SEQ ID NO: 42)
GFTFSDNW

HCDR2:
                                        (SEQ ID NO: 43)
IRNKPYNYET

HCDR3:
                                        (SEQ ID NO: 44)
TAQFAY
```

The amino acid sequences of three CDRs of the light chain variable region are as follows:

```
LCDR1:
                                        (SEQ ID NO: 45)
ENIYGG

LCDR2:
                                        (SEQ ID NO: 46)
GAT

LCDR3:
                                        (SEQ ID NO: 47)
QNVLRSPFTF
```

(8) BiAb001

The amino acid sequences of nine CDRs of the heavy chain variable regions are as follows

```
HCDR1:
                                        (SEQ ID NO: 29)
GFAFSSYD

HCDR2:
                                        (SEQ ID NO: 30)
ISGGGRYT

HCDR3:
                                        (SEQ ID NO: 31)
ANRYGEAWFAY

HCDR4:
                                        (SEQ ID NO: 35)
GYSFTGYT
```

```
HCDR5:
                                 (SEQ ID NO: 36)
INPYNNIT

HCDR6:
                                 (SEQ ID NO: 37)
ARLDYRSY

HCDR7:
                                 (SEQ ID NO: 38)
TGAVTTSNF

HCDR8:
                                 (SEQ ID NO: 39)
GTN

HCDR9:
                                 (SEQ ID NO: 40)
ALWYSNHWV
```

The amino acid sequences of three CDRs of the light chain variable region are as follows:

```
LCDR1:
                                 (SEQ ID NO: 32)
QDINTY

LCDR2:
                                 (SEQ ID NO: 33)
RAN

LCDR3:
                                 (SEQ ID NO: 34)
LQYDEFPLT
```

(9) BiAb002

The amino acid sequences of nine CDRs of the heavy chain variable regions are the same as those of BiAb001.

The amino acid sequences of three CDRs of the light chain variable region are the same as those of BiAb001.

(10) BiAb003

The amino acid sequences of nine CDRs of the heavy chain variable regions are the same as those of BiAb001.

The amino acid sequences of three CDRs of the light chain variable region are the same as those of BiAb001.

(11) BiAb004

The amino acid sequences of nine CDRs of the heavy chain variable regions are the same as those of BiAb001.

The amino acid sequences of three CDRs of the light chain variable region are the same as those of BiAb001.

(12) BiAb007

The amino acid sequences of nine CDRs of the heavy chain variable regions are as follows:

```
HCDR1:
                                 (SEQ ID NO: 29)
GFAFSSYD

HCDR2:
                                 (SEQ ID NO: 30)
ISGGGRYT

HCDR3:
                                 (SEQ ID NO: 31)
ANRYGEAWFAY

HCDR4:
                                 (SEQ ID NO: 35)
GYSFTGYT

HCDR5:
                                 (SEQ ID NO: 41)
INPYNDIT

HCDR6:
                                 (SEQ ID NO: 37)
ARLDYRSY

HCDR7:
                                 (SEQ ID NO: 38)
TGAVTTSNF

HCDR8:
                                 (SEQ ID NO: 39)
GTN

HCDR9:
                                 (SEQ ID NO: 40)
ALWYSNHWV
```

The amino acid sequences of three CDRs of the light chain variable region are the same as those of BiAb001.

(13) BiAb010

The amino acid sequences of nine CDRs of the heavy chain variable regions are as follows:

```
HCDR1:
                                 (SEQ ID NO: 29)
GFAFSSYD

HCDR2:
                                 (SEQ ID NO: 30)
ISGGGRYT

HCDR3:
                                 (SEQ ID NO: 31)
ANRYGEAWFAY

HCDR4:
                                 (SEQ ID NO: 42)
GFTFSDNW

HCDR5:
                                 (SEQ ID NO: 43)
IRNKPYNYET

HCDR6:
                                 (SEQ ID NO: 44)
TAQFAY

HCDR7:
                                 (SEQ ID NO: 45)
ENIYGG

HCDR8:
                                 (SEQ ID NO: 46)
GAT

HCDR9:
                                 (SEQ ID NO: 47)
QNVLRSPFTF
```

The amino acid sequences of three CDRs of the light chain variable region are the same as those of BiAb001.

Unless otherwise defined herein, scientific and technical terms used in connection with the present invention shall have the meanings that are commonly understood by those of ordinary skill in the art. Furthermore, laboratory techniques of cell and tissue culture, molecular genetics, oligo- or polynucleotide chemistry, and immunology described herein are those well-known and commonly used in the art. Meanwhile, to better understand the present invention, the following terms, unless otherwise indicated, shall be understood to have the following meanings:

As used herein, the term "amino acid sequence of CTLA4 (Cytotoxic T-Lymphocyte Antigen 4)" refers to not only the full-length CTLA4 protein, but also, the extracellular fragment of CTLA4 (CTLA4ECD), or fragments containing CTLA4ECD, or fusion proteins of CTLA4ECD, such as fragments of fusions with mouse or human IgG Fc fragments (mFc or hFc). However, understood by those of ordinary skill in the art, the amino acid sequence of CTLA4 protein can have natural or artificial mutations or variation (including but not limited to substitutions, deletions, and/or additions), not affecting its biological functions. Thus, in the present invention, the term "CTLA4 protein" also includes these amino acid sequences containing natural or artificial variants. Additionally, when referring to sequence fragments of CTLA4 protein, the sequence fragments containing natural or artificial variants are also included.

As used herein, the term "amino acid sequence of PD-1 (Programmed cell death protein 1, NCBI GenBank: 005018 NM)" refers to not only the full-length PD-1 protein, but also, the extracellular fragment of PD-1, PD-1ECD), or fragments containing PD-1ECD, or fusion proteins of PD-1ECD, such as fragments of fusions with mouse or human IgG Fc fragments (mFc or hFc). However, understood by those of ordinary skill in the art, the amino acid sequence of PD-1 protein can have natural or artificial mutations or variation (including but not limited to substitutions, deletions, and/or additions), not affecting its biological functions. Thus, in the present invention, the term "PD-1 protein" also includes these amino acid sequences containing natural or artificial variants. Additionally, when referring to sequence fragments of PD-1 protein, the sequences fragments containing natural or artificial variants are also included.

As used in this invention, if not specifically stated, B7 protein described herein is B7-1 and/or B7-2 protein whose amino acid sequences are well known in the prior art, which can be referenced from the existing literature or sequences disclosed in GenBank. For example, B7-1 (CD80, NCBI Gene ID: 941) and B7-2 (CD86, NCBI Gene ID: 942).

As used herein, the term "$EC_{50}$" refers to the concentration of 50% of maximal effect.

As used herein, the term "antibody" refers to an immunoglobulin molecule normally composed of two pairs of peptides (each pair with a "light" (L) chain and a "heavy" (H) chain). In general, the heavy chain can be comprehended as the polypeptide chain with a higher molecular weight, while the light chain refers to the polypeptide chain with a lower molecular weight. The light chains of an antibody are classified as either κ or λ light chains, while the heavy chains of an antibody are classified as μ, δ, γ, α or ε heavy chains, which define the antibody isotypes as IgM, IgD, IgG, IgA, and IgE, respectively.

Within a light and a heavy chain, the variable region and the constant region are connected through a "J" region consisting of about 12 or more amino acids, and a heavy chain also contains a "D" region consisting of about three or more amino acids. A heavy chain consists of a heavy chain variable region ($V_H$) and a heavy chain constant region ($C_H$). A heavy chain constant region consists of three structural domains ($C_H1$, $C_H2$, and $C_H3$). A light chain consists of a light chain variable region ($V_L$) and a light chain constant region (CL). The constant region of a light chain consists of a structural domain CL. The constant region of an antibody mediates the binding of an immunoglobulin to host tissues or factors, including various immune cells (e.g. effector cells) and the complement component 1q (C1q) of the classical complement system. $V_H$ and $V_L$ regions can further be subdivided into regions with high variability (known as complementarity determining region (CDR)), separated by relatively conservative regions called framework region (FR). Each $V_H$ and $V_L$ comprises three CDRs and four FRs in the order of FR1, CDR1, FR2, CDR2, FR3, CDR3, and FR4 from the amino terminus to the carboxyl terminus. The variable regions ($V_H$ and $V_L$) of each heavy/light chain form the antibody binding sites respectively. Distribution of amino acids to the regions or domains follows the definitions by Kabat Sequences of Proteins of Immunological Interest (National Institutes of Health, Bethesda, Md.) (1987 and 1991), or Chothia & Lesk (1987) j. Mol. Biol. 196:901-917; Chothia et al. (1989) Nature 342:878-883. In particular, heavy chains can also contain more than three CDRs, such as 6, 9, or 12. For example, in the case of the bispecific antibodies in the present invention, the heavy chain can be a heavy chain of an IgG antibody with a scFv of another antibody connected to its C terminus, thus this heavy chain contains 9 CDRs. The term "antibody" is not restricted by any particular method of making antibodies. For example, it includes, in particular, recombinant antibodies, monoclonal antibodies or polyclonal antibodies. Antibodies can be of different isoforms, such as IgG (for example, IgG1, IgG2, IgG3 or IgG4 subtypes), IgA1, IgA2, IgD, IgE or IgM antibodies.

As used herein, the term "antigen-binding fragments" refers to polypeptides containing fragments of a full-length antibody, maintaining the ability to bind specifically to the same antigen, and/or to compete with the full length antibody against the antigen, which is also called "the antigen binding portion". See Fundamental Immunology, Ch. 7 (Paul, W., 2nd edition, Raven Press, N.Y. (1989)), including the entire article and references in this invention for all purposes. Antigen-binding fragments can be produced by recombinant DNA techniques or by cleaving intact antibodies with proteolytic enzymes or chemicals. In some cases, the antigen-binding fragments include Fab, Fab', F(ab')2, Fd, Fv, dAb and CDR fragments, single-chain antibodies (e.g. scFV), chimeric antibodies, diabody, and polypeptide which includes at least a portion of the antibody which is sufficient to confer a specific antigen binding capacity.

As used herein the term "Fd fragment" refers to an antibody fragment composed of $V_H$ and $C_H1$ domains. The term "Fv fragment" refers to an antibody fragment composed of the $V_L$ and $V_H$ domains from a single arm of the antibody. The term "dAb fragment" refers to an antibody fragment composed of a $V_H$ domain (Ward et al., Nature 341:544 546 (1989)). The term "Fab fragment" refers to an antibody fragment composed of $V_L$, $V_H$, CL and $C_H1$ domains. The term "F(ab')2 fragment" refers to an antibody fragment containing two Fab fragments connected by a disulfide bridge in the hinge region.

In some cases, the antigen-binding fragments of an antibody are single-chain antibodies (e.g. scFv), a single polypeptide chain composed of $V_L$ and $V_H$ domains linked together (see, for example, Bird et al., Science 242: 423-426 (1988) and Huston et al., Proc. Natl. Acad. Sci. USA 85: 5879-5883 (1988)). Such scFv molecules may have a common structure: $NH_2$-$V_L$-linker-$V_H$—COOH or $NH_2$-$V_H$-linker-$V_L$-COOH. The appropriate linker may be a repeat of GGGGS or its variants, for example, amino acid sequence of (GGGGS)4 or its variants (Holliger et al., (1993), Proc. Natl. Acad. Sci. USA 90: 6444-6448). Other applicable linkers had been described by Alfthan, et al., (1995), Protein Eng. 8: 725-731, Choi, et al., (2001) Eur. J. Immunol. 31: 94-106, Hu, et al., (1996), Cancer Res. 56: 3055-3061, Kipriyanov et al., (1999), J. Mol. Biol. 293: 41-56 and Roovers, et al., (2001) Cancer Immunol.

In some cases, the antigen binding fragment is a diabody, namely, a dimeric antibody, whose $V_H$ and $V_L$ domains are lined on a single polypeptide chain, while because of the the too short linker to allow pairing between the two domains of on same chain, thus the domains are forced to pair with complementary domains on another chain to generate two antigen binding sites (see, for example, Holliger P. et al., Proc. Natl. Acad. Sci. USA 90: 6444-6448 (1993), and Poljak R. J. et al., Structure 2: 1121-1123 (1994)).

Using conventional techniques known by those of ordinary skill in the art (such as recombinant DNA technology or enzymatic/chemical cleavage), an antigen binding fragment (such as the antibody fragments described above) may be obtained from a given antibody, and screened for specificity in the same manner as for the full antibody.

In the present invention, unless specified otherwise, the term "antibody" refers to not only the intact antibody, but also the antigen binding fragments of the antibody.

As used in this invention, the terms "mAb" and "monoclonal antibodies" refers to an antibody or a fragment of an antibody that is derived from a group of highly homologous antibodies, i.e. from a group of identical antibody molecules, except for mutations that may arise spontaneously. Monoclonal antibody has high specificity against a single epitope on the antigen. Polyclonal antibodies are different from monoclonal antibodies, containing at least 2 or more different antibodies, which usually recognize different epitopes on the antigen. Monoclonal antibodies can be obtained with hybridoma technology reported originally by Kohler et al., (Nature, 256: 495, (1975)), as well as recombinant DNA Technology (see U.S. Pat. No. 4,816,567).

As used in this invention, the term "chimeric antibody" refers to an antibody in which parts of the light chain and/or heavy chain are from one antibody (can be from a particular species or belong to a specific antibody class or subclass), and the other parts of the light chain and/or heavy chain are from another antibody (can be from the same or different species or belong to the same or different antibodies classes or subclass). Nevertheless, it retains antigen binding activity (U.S.P to Cabilly et al., U.S. Pat. No. 4,816,567; Morrison et al., Proc. Natl. Acad. Sci. USA, 81:6851 6855 (1984)).

As used in this invention, the term "humanized antibody" refers to an antibody or its fragments, derived from a human immunoglobulin (receptor antibody), whose CDRs or parts of CDRs are replaced by CDRs from a non-human antibody (donor antibody), where the donor antibody may be a non-human antibody (for example, from mice, rats, or rabbits) with predictable specificity, binding affinity, and reactivity. In addition, to further improve or optimize the performance of the antibody, some amino acid residues in framework regions (FR) of the receptor antibody can also be replaced by the corresponding amino acid residues of non-human species, or replaced by the corresponding amino acid residues of other antibodies. For more details on humanized antibodies, see for example Jones, et al., Nature, 321: 522-525 (1986); Reichmann et al., Nature, 332: 323-329 (1988); Presta, Curr. Op. Struct. Biol., 2: 593-596 (1992); and Clark, Immunol. Today, 21: 397-402 (2000).

As used in this invention, the term "Epitope" refers to a site on the antigen that the immunoglobulin or antibody can specifically bind to. "Epitope" is also known as the "antigenic determinant" in this field. Epitope or antigenic determinants usually consist of chemically active surface groups of molecules, such as amino acids, carbohydrates or glycoside chains, and usually have specific three dimensional structures, as well as specific charge characteristics. For example, epitopes typically consist of at least 3, 4, 5, 6, 7, 8, 9, 11, 12, 13, 14 or 15 consecutive or non-consecutive amino acids in a unique spatial conformation, which can be "linear" or "conformational". See, for example, Epitope Mapping Protocols in Methods in Molecular Biology, volume 66, G. E. Morris, Ed. (1996). In a linear epitope, the interacting points between the protein and interacting molecule (e.g., antibodies) exist linearly along the primary amino acid sequence; while in a conformational epitope, the interacting points are separated along the primary amino acid sequence.

As used in this invention, the term "isolate" or "isolated" refers to obtained by artificial means in the natural state. If there is an "isolated" substance or component in nature, it may be due to the change in its natural environment, or isolated from the natural environment, or both. For example, polynucleotide or polypeptide in a natural existence in a living animal will be called "isolated" if it was separated with high purity in the same natural state. The term "isolate" or "isolated" does not exclude existence of artificial or synthetic material, or other impurities that does not affect the activity.

As used in this invention, the term "*E. coli* expression system" refers to the expression system composed of *Escherichia coli* (strain) and vector, where *E. coli* (strain) is commercially available, including but not limited to: GI698, ER2566, BL21 (DE3), B834 (DE3), and BLR (DE3).

As used in this invention, the term "vector" refers to a nucleic acid delivery vehicle that can be inserted with a polynucleotide. The vector that can have the protein that is encoded by the inserted polynucleotide expressed is called an expression vector. Vectors can be inserted into the host cell by transformation, transduction, or transfection, so that the genetic substances carried by the vector can be expressed in the host cell. Vectors are well known to the technical personnel in the field, including but not limited to: plasmid; phasmid; cosmid; artificial chromosome such as yeast artificial chromosome (YAC), bacterial artificial chromosome (BAC), or P1 derived artificial chromosome (PAC); phage such as λ phage or M13 phage and animal viruses etc. Animal viruses may include but not limited to, reverse transcriptase virus (including lentivirus), adenovirus, adeno-associated virus, herpes virus (e. g. herpes simplex virus), chicken pox virus, baculovirus, papilloma virus, and papova virus (such as SV40). A vector can contain multiple components that control expression, including but not limited to, promoter, transcription initiation factor, enhancer, selection element, and reporter gene. In addition, the vector may also contain replication initiation site.

As used in this invention, the term "host cell" refers to cells that can import vectors, including but not limited to, prokaryotic cells such as *E. coli* and *Bacillus subtilis*, fungal cells such as yeast and *Aspergillus*, insect cells such as S2 drosophila cells and Sf9, or animal cells such as fibroblast cells, CHO cells, COS cells, NSO cells, HeLa cells, BHK cells, HEK293 cells or human cells.

As used in this invention, "Homologous" refers to the sequence similarity or sequence identity between two polypeptides or between two nucleic acid molecules. When a position in the two compared sequences is occupied by the same base or amino acid, e.g., if a position in two DNA molecules is occupied by adenine, then the molecules are homologous at that position. The "percent homology" of two sequences is calculated by the function of the numbers of matched positions of the two sequences divided by the total numbers of positions that are compared multiplied by 100. For example, if 6 out of 10 positions of two sequences are matched, thus the homology of the two squences is 60%. For example, homology of DNA sequences CTGACT and CAGGTT is 50% (3 out of 6 positions are matched). Generally, a comparison is made when two sequences are aligned to give maximum identity. Such alignment can be simply generated using computer programs, for instance, the ALIGN program (DNAstar, Inc.), implemented by the method of Needleman et al. (1970) J. Mol. Biol. 48: 443-453. Or, using the algorithm proposed by E. Meyers and W. Miller (Comput. Appl Biosci. □ 4:11-17 (1988)) that has been integrated into ALIGN program (version 2.0), in whcih the percent homology of two sequences is calculated by using PAM120 residue weight table, a gap length penalty of 12 and gap penalty of 4. In addition, GAP program that has been integrated into the GCG software package (available on www.gcg.com) implemented with algorithm of Needleman and Wunsch (J MoI Biol. 4-453 (1970)), Blossum 62 matrix, PAM250 matrix as well as 16, 14, 12, 10, 8, 6 or 4 GAP weight and 1, 2, 3, 4, 5 or 6 length weight can be used to measure the percent homology of two amino acid sequences.

As used in this invention, the term "specific binding" refers to non-randomly binding between two molecules, i.e., interaction between antibodies and antigen. In some embodiments, the antibody specifically binding to the antigen (or antibody with specifity to an antigen) refers that the antibody binds the antigen with an affinity ($K_D$) smaller approximately than $10^{-5}$ M, such as smaller than $10^{-6}$ M, $10^{-7}$ M, $10^{-8}$ M, $10^{-9}$ M, $10^{-10}$ M or even less. In some embodiments of the invention, the term "target(ed)" refers to specific binding.

As used in this invention, the term "$K_D$" refers to the dissociation equilibrium constant for specific antibody-antigen interactions, to describe the binding affinity between antibodies and antigens. The smaller the equilibrium dissociation constant is, the tighter the antibody binds antigen, the higher the affinity between the antibody and the antigen is. Generally, antibodies bind antigens with a dissociation equilibrium constant ($K_D$) less than approximately $10^{-5}$ M, in particular, less than approximately $10^{-6}$ M, $10^{-7}$ M, $10^{-8}$ M, $10^{-9}$ M, or $10^{-10}$ M, or less, for example, as measured with a BIACORE instrument by surface plasmon resonance (SPR).

As used in this invention, the terms "monoclonal antibodies" and "mAb" have the same meaning and are used interchangeably; the terms "polyclonal antibodies" and "PcAb" have the same meaning and are used interchangeably; the terms "polypeptide" and "protein" have the same meaning and are used interchangeably. Also in the present invention, amino acids are usually represented by single letter or three letter abbreviations known in the field. For example, alanine can be represented by A or Ala.

As used in this invention, the terms "hybridoma" and "hybridoma cell line" are used interchangeably, and when the terms "hybridoma" and "hybridoma cell line" are used, they also include subclones and progenies of the hybridoma cell line. For example, when referring to the hybridoma cell lines LT002 or LT003, it also refers to the subclones and progenies of the hybridoma cell lines LT002 or LT003.

As used in this invention, the term "pharmaceutically acceptable carrier and/or excipient" refers to a carrier and/or excipient that is compatible with the subject and active ingredients in pharmacology and/or physiology and is known to this field (e.g. Remington's Pharmaceutical Sciences. Edited by Gennaro A R, 19th ed. Pennsylvania: Mack Publishing Company, 1995), including but not limited to: pH regulator, surfactant, adjuvant, and ionic strength enhancer. For example, pH regulators include but not limited to phosphate buffers; Surfactants include but not limited to cations, anions or non-ionic surfactants such as Tween 80; Ionic strength enhancers include but not limited to sodium chloride.

As used in this invention, the term "adjuvant" refers to a nonspecific immune booster that, when delivered into the body together or beforehand with an antigen enhances or changes the body's immune response to the antigen. There are many kinds of adjuvants, including but not limited to aluminum adjuvants (such as aluminum hydroxide), freund's adjuvants (such as complete and incomplete freund's adjuvants), *Corynebacterium parvum*, lipopolysaccharides, cytokines, etc. Freund's adjuvant is currently the most commonly used adjuvant in animal experiments. Aluminum hydroxide adjuvant is used mostly in clinical trials.

As used in this invention, the term "effective dose" refers to the quantity that is sufficient to partially or completely achieve the desired effect. For example, effective prevention dose (e.g., diseases associated with CTLA4 binding to B7 or hyperactivity of CTLA4, such as tumors) is defined as the amount of a therapeutic sufficient to prevent, stop, or delay the diseases (e.g., diseases associated with hyperactivity of CTLA4 binding to B7 or diseases associated with hyperactivity of CTLA4, such as tumors); effective treatment dose is the amount of a therapeutic to cure, or at least partially stop, the disease and its complications in sick patients. Determination of such an effective dose is entirely within the scope of the capabilities of the technical personnel in the field. For example, the effective treatment dose will depend on the severity of the disease, the overall state of the patient's own immune system, the general background of patients such as age, weight and sex, administration of drugs, and other treatments at the same time.

Effects of the Invention

The monoclonal antibodies in the present invention, 4G10H1L1 and 4G10H3L3, are capable of binding to CTLA4 specifically, effectively blocking the interaction of CLTA4 and B7, and removing the immunosuppression of CLTA4 specifically to activate T lymphocytes.

The monoclonal antibody 14C12H1L1 is capable of binding to CTLA4 specifically, effectively blocking the interaction of CTLA4 and B7, and removing the immunosuppression of CTLA4 specifically to activate T lymphocytes.

The bispecific antibodies of the present invention have the potential to be prepared for drugs for the prevention and/or treatment of tumors, such as melanoma, renal cancer, prostate cancer, bladder cancer, colorectal cancer, gastrointestinal cancer, liver cancer, non-small cell lung cancer, ovarian cancer and leukemia.

BRIEF DESCRIPTION OF THE DRAWINGS

FIG. 53. Effects of BiAb003 and BiAb004 on IFN-γ Secretion of Mixed Lymphocytes compared with effects of 14C12H1L1 and 4G10H3L3.

FIG. 54. Effect of 4G10H3L3 on IL-2 Secretion of Mixed Lymphocytes.

DESCRIPTION OF THE DEPOSITED BIOLOGICAL MATERIALS

Figure 1:
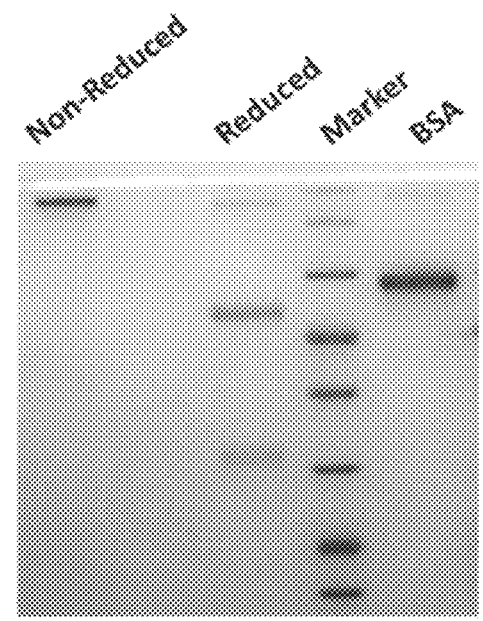
FIG. 1 SDS-PAGE Results of Monoclonal Antibody 4G10. From left to right: 1 antibody in non-reduced loading buffer; 1 μg antibody in reduced loading buffer; 5 μL Marker; 1 μg BSA.

LT002 (CTLA4-4G10), a hybridoma cell line, was preserved in China Center for Type Culture Collection (CCTCC) on Jun. 16, 2015. Deposit Accession NO.: C201587, Depository address: Wuhan university, Wuhan, China, zip code: 430072.

LT003 (PD-1-14C12), a hybridoma cell line, was preserved in China Center for Type Culture Collection (CCTCC) on Jun. 16, 2015. Deposit Accession NO.: C2015105, Depository address: Wuhan university, Wuhan, China, zip code: 430072.

DETAILED DESCRIPTION OF THE INVENTION

The invention will now be described in detail. As will be appreciated by one skilled in the art, the following examples are only used for the description of the invention, and not to be deemed to limit the scope of the invention. The cases without the specific descriptions of techniques or conditions were carried out in accordance with the literature in the field (e.g., Guide to Molecular Cloning, written by J Sambrook, et al, translated by Peitang Huang, et al, third Edition, Science Press) or in accordance with the product instruction manual. The reagents or instruments with no specified manufacturer were all conventional products available commercially.

In the embodiments of the present invention, the T cells used were from Akeso Biopharma, Inc., the BALB/C mice were purchased from the Guangdong Medical Laboratory Animal Center. The PD-1 HuGEMM mice used were from Nanjing Galaxy Biopharma Co., Ltd.; MC38 cells were from Shanghai Fudan IBS Cell Center.

Example 1: Preparation of Anti-CTLA4 Antibody 4G10

1. Establishment of Hybridoma Cell Line LT002

Using CTLA4-mFc (a fusion protein of human CTLA4 protein (GenbankID: NP 005205.2) extracellular region and mouse IgG1Fc protein) as the antigen, the hybridoma cells were obtained by fusing the splenocytes of immunized BALB/C mice (purchased from Guangdong Medical Laboratory Animal Center) and mouse myeloma cells with currently established method (for example, Stewart, S. J., "Monoclonal Antibody Production", in Basic Methods in antibody Production and Characterization, Eds. G. C. Howard and D. R. Bethell, Boca Raton: CRC Press, 2000).

The CTLA4 protein was generated by digesting the fusion protein CTLA4-mFc with TEV protease, and further purified by purification column. Microplate was coated with CTLA4 as the antigen, and the above hybridoma cells were screened by indirect ELISA to select those secreting new antibodies specifically binding to CTLA4. The hybridoma cells screened via indirect ELISA were further screened by competitive ELISA against ligand B7-1 (CD80, NCBI Gene ID: 941) and B7-2 (CD86, NCBI Gene ID: 942) to select those secreting monoclonal antibodies that competitively bind to CTLA4, and then a stable hybridoma cell line was obtained by limited dilution method. This hybridoma cell line was named LT002 (CTLA4-4G10), and its secreted monoclonal antibody is named 4G10.

LT002 (CTLA4-4G10), the hybridoma cell line, was preserved in China Center for Type Culture Collection (CCTCC) on Jun. 16, 2015. Deposit Accession NO.: C201587, Depository address: Wuhan university, Wuhan, China, postcode: 430072.

2. Preparation of Anti-CTLA4 Antibody 4G10

The LT002 cells in the present invention were cultured using IMDM medium containing 10% low IgG fetal bovine serum (IMDM medium containing 1% streptomycin, cultured in cell incubator with 5% $CO_2$, 37° C.), and then the cell culture supernatant was harvested and purified by high-speed centrifugation after 7 days culture, filtration through microporous membrane, and HiTrap protein A HP column to get the antibody 4G10. The purified 4G10 were identified on SDS-PAGE electrophoresis, and the result was shown in FIG. 1.

Example 2: Sequence Analysis of Anti-CTLA4 Antibody 4G10

Sequence Analysis of Antibody 4G10 mRNA was extracted from the hybridoma cell line LT002 prepared in Example 1 above according to the manual of the cell/bacterial total RNA extraction reagent kit (Tiangen, Product No DP430).

cDNA was synthesized using Invitrogen SuperScript® III First—Strand Synthesis System for RT-PCR, and amplified by PCR.

TA cloning was directly carried out on the PCR amplified product according to the instructions of pEASY-T1 Cloning Kit (Transgen CT101).

The products of TA cloning were directly sequenced, and the sequencing results were as follows:

```
Nucleic acid sequence of heavy chain variable
region: (372 bp)
                                    (SEQ ID NO: 1)
CAGGTCAAGCTGCAGGAGTCTGGACCTGAGCTGGTGAAGCCTGGAGCTT

CAATGAAGATATCCTGCAAGGCTTCTGGTTACTCATTCACTGGCTACAC

CATGAACTGGGTGAAGCAGAGCCATGGAAAGAACCTTGAATGGATTGGA

CTTATTAATCCTTACAATAATATTACTAACTACAACCAGAAGTTCATGG

GCAAGGCCACATTTACTGTAGACAAGTCATCCAGCACAGCCTACATGGA

ACTCCTCAGACTGACATCTGAAGACTCTGGAGTCTATTTCTGTGCAAGA

CTCGACTATAGGTCTTATTGGGGCCAAGGGACTCTGGTCACTGTCTCTG

CAGCCAAAACGACACCCCCATCTGTCTAT

Encoded amino acid sequence: (124 aa)
                                    (SEQ ID NO: 2)
QVKLQESGPELVKPGASMKISCKASGYSFTGYTMNWVKQSHGKNLEWIG

LINPYNNITNYNQKFMGKATFTVDKSSSTAYMELLRLTSEDSGVYFCAR

LDYRSYWGQGTLVTVSAAKTTPPSVY

Nucleic acid sequence of the light chain variable
region: (378 bp)
                                    (SEQ ID NO: 3)
CAGGCTGTTGTGACTCAGGAATCTGCACTCACCACATCACCTGGTGAAA

CAGTCACACTCACTTGTCGCTCAAGTACTGGGGCTGTTACAACTAGTAA

CTTTGCCAACTGGGTCCAAGAAAAACCAGATCATTTATTCACTAGTCTA

ATAGGTGGTACCAACAACCGAGCTCCAGGTGTTCCTGCCAGATTCTCAG

GCTCCCTGATTGGAGACAAGGCTGCCCTCACCATCACAGGGGCACAGAC

TGAGGATGAGGCAATATATTTCTGTGCTCTATGGTACAGCAACCATTGG

GTGTTCGGTGGAGGAACCAAACTGACTGTCCTAGGCCAGCCCAAGTCTT

CGCCATCAGTCACCCTGTTTCAAGGGCAATTCTGC
```

-continued

Encoded amino acid sequence: (126 aa)
(SEQ ID NO: 4)
QAVVTQESALTTSPGETVTLTCRSSTGAVTTSNFANWVQEKPDHLFTSL

IGGTNNRAPGVPARFSGSLIGDKAALTITGAQTEDEAIYFCALWYSNHW

VFGGGTKLTVLGQPKSSPSVTLFQGQFC

Example 3: Design and Preparation of Humanized Antibodies 4G10H1L1, 4G10H3L3 and 4G10H4L3 Against CTLA4

1. Design of Light and Heavy Chain Sequences of Anti-CTLA4 Humanized Antibodies 4G10H1L1, 4G10H3L3 and 4G10H4L3

Based on the three-dimensional crystal structure of CTLA4 protein (Nat. Struct. Biol., (1997) 4 p. 527) and the amino acid sequence of antibody 4G10 obtained in the Example 2, antibody in silico modeling was performed and mutations of amino acids from mouse-like to human-like were engineered to obtain the amino acid sequences of variable regions of antibody 4G10H1L1, 4G10H3L3 and 4G10H4L3 (the constant region of heavy chain was Ig gamma-1 chain C region, ACCESSION: P01857 and the constant region of light chain was Ig kappa chain C region, ACCESSION: P01834)

The designed sequences of variable regions are as follows (1) the Heavy Chain and Light Chain Sequences of the Humanized Monoclonal Antibody 4G10H1L1

Nucleic acid sequence of the heavy chain variable region: (345 bp)
(SEQ ID NO: 5)
CAGGTGCAGCTGGTGGAGTCTGGGGCCGAGCTGGTGAAGCCCGGCGCCT

CCATGAAGATCTCTTGCAAGGCCAGCGGATACAGTTTCACTGGCTATAC

CATGAACTGGGTCAAACAGGCTCCAGGACAGGGACTGGAGTGGATCGGG

CTGATTAATCCTTACAACAACATCACCAACTACAACCAGAAGTTCATGG

GAAAAGCAACCTTTACAGTGGACAAGAGCATTTCCACAGCCTACATGGA

ACTGAGCCGGCTGACTTCAGACGATAGCGGGGTCTATTTTTGTGCAAGG

CTGGATTATCGCTCTTACTGGGGGCAGGGAACTCTGGTCACTGTCTCCG

CT

Encoded amino acid sequence: (115 aa)
(SEQ ID NO: 6)
QVQLVESGAELVKPGASMKISCKASGYSFTGYTMNWVKQAPGQGLEWIG

LINPYNNITNYNQKFMGKATFTVDKSISTAYMELSRLTSDDSGVYFCAR

LDYRSYWGQGTLVTVSA

Nucleic acid sequence of the light chain variable region: (327 bp)
(SEQ ID NO: 7)
CAGGCTGTCGTCACTCAGGAACCTTCACTGACTGTGAGCCCAGGAGGAA

CTGTCACCCTGACATGCGGAAGCTCCACCGGAGCAGTGACCACATCCAA

CTTCGCCAATTGGGTCCAGGAAAAGCCAGGCCAGGCATTTCGATCCCTG

ATCGGAGGCACAAACAATCGGGCTTCTTGGGTGCCCGCAAGATTCTCAG

GAAGCCTGCTGGGGGGAAAAGCCGCTCTGACCATTAGTGGCGCTCAGCC

TGAGGACGAAGCCGAGTACTTCTGCGCTCTGTGGTATAGCAACCACTGG

GTGTTTGGCGGGGGAACAAAGCTGACTGTGCTG

Encoded amino acid sequence: (109 aa)
(SEQ ID NO: 8)
QAVVTQEPSLTVSPGGTVTLTCGSSTGAVTTSNFANWVQEKPGQAFRSL

IGGTNNRASWVPARFSGSLLGGKAALTISGAQPEDEAEYFCALWYSNHW

VFGGGTKLTVL (2) The Heavy Chain and Light Chain Sequences of the Humanized Monoclonal Antibody 4G10H3L3

Nucleic acid sequence of the heavy chain variable region: (345 bp)
(SEQ ID NO: 9)
CAGGTGCAGCTGGTCGAGTCTGGGGCCGAAGTGAAGAAACCCGGCGCCT

CAGTGAAGGTCAGCTGCAAGGCCAGCGGGTACAGTTTCACTGGATATAC

CATGAACTGGGTCCGACAGGCCCCTGGCCAGGGGCTGGAGTGGATCGGC

CTGATTAACCCTTACAACAACATCACTAACTACGCACAGAAGTTCCAGG

GGAGAGTGACCTTTACAGTGGACACCAGCATTTCCACAGCCTACATGGA

ACTGTCCCGGCTGAGATCTGACGATACAGGCGTGTACTTCTGCGCTAGG

CTGGATTACCGCAGCTATTGGGGACAGGGCACACTGGTGACTGTCAGCG

CA

Encoded amino acid sequence: (115 aa)
(SEQ ID NO: 10)
QVQLVESGAEVKKPGASVKVSCKASGYSFTGYTMNWVRQAPGQGLEWIG

LINPYNNITNYAQKFQGRVTFTVDTSISTAYMELSRLRSDDTGVYFCAR

LDYRSYWGQGTLVTVSA

Nucleic acid sequence of the light chain variable region: (327 bp)
(SEQ ID NO: 11)
CAGGCTGTCGTCACTCAGGAACCTTCACTGACCGTGTCTCCTGGCGGGA

CTGTCACCCTGACATGCGGCAGCTCCACAGGGGCCGTGACCACAAGTAA

CTTCCCAAATTGGGTCCAGCAGAAGCCAGGACAGGCTCCCCGGAGTCTG

ATCGGAGGCACCAACAACAAGGCCAGCTGGACACCCGCACGGTTCAGCG

GCAGCCTGCTGGGCGGCAAGGCCGCTCTGACAATTAGCGGAGCCCAGCC

TGAGGACGAAGCCGAGTACTATTGCGCTCTGTGGTACTCCAACCACTGG

GTGTTCGGCGGCGGCACCAAGCTGACTGTGCTG

Encoded amino acid sequence: (109 aa)
(SEQ ID NO: 12)
QAVVTQEPSLTVSPGGTVTLTCGSSTGAVTTSNFPNWVQQKPGQAPRSL

IGGTNNKASWTPARFSGSLLGGKAALTISGAQPEDEAEYYCALWYSNHW

VFGGGTKLTVL (3) The Heavy and Light Chain Sequences of the Humanized Monoclonal Antibody 4G10H4L3

Nucleic acid sequence of the heavy chain variable region: (345 bp)
(SEQ ID NO: 13)
CAGGTGCAGCTGGTCGAGTCTGGGGCCGAAGTGAAGAAACCCGGCGCCT

CAGTGAAGGTCAGCTGCAAGGCCAGCGGGTACAGTTTCACTGGATATAC

CATGAACTGGGTCCGACAGGCCCCTGGCCAGGGGCTGGAGTGGATCGGC

-continued
```
CTGATTAACCCTTACAACGACATCACTAACTACGCACAGAAGTTCCAGG

GGAGAGTGACCTTTACAGTGGACACCAGCATTTCCACAGCCTACATGGA

ACTGTCCCGGCTGAGATCTGACGATACAGGCGTGTACTTCTGCGCTAGG

CTGGATTACCGCAGCTATTGGGGACAGGGCACACTGGTGACTGTCAGCG

CA
```

Encoded amino acid sequence: (115 aa)
(SEQ ID NO: 14)
```
QVQLVESGAEVKKPGASVKVSCKASGYSFTGYTMNWVRQAPGQGLEWIG

LINPYNDITNYAQKFQGRVTFTVDTSISTAYMELSRLRSDDTGVYFCAR

LDYRSYWGQGTLVTVSA
```

The nucleic acid and encoded amino acid sequences of the light chain variable region are the same as those of 4G10H3L3.

2. Preparation of Humanized Antibodies 4G10H1L1, 4G10H3L3 and 4G10H4L3

The constant region of heavy chain was Ig gamma-1 chain C region, ACCESSION: P01857. The constant region of light chain was Ig kappa chain C region, ACCESSION: P01834.

Figure 2:
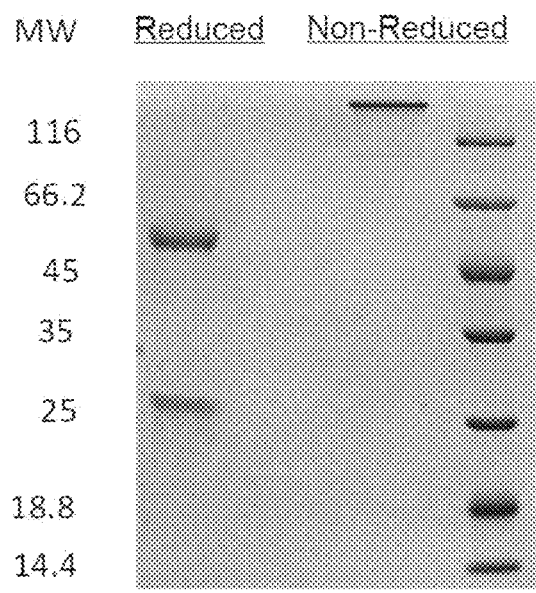
FIG. 2 SDS-PAGE Results of Monoclonal Antibody 4G10H1L1. From left to right: 1 μg antibody in non-reduced loading buffer; 1 μg antibody in reduced loading buffer; 5 μL Marker.
Figure 3:
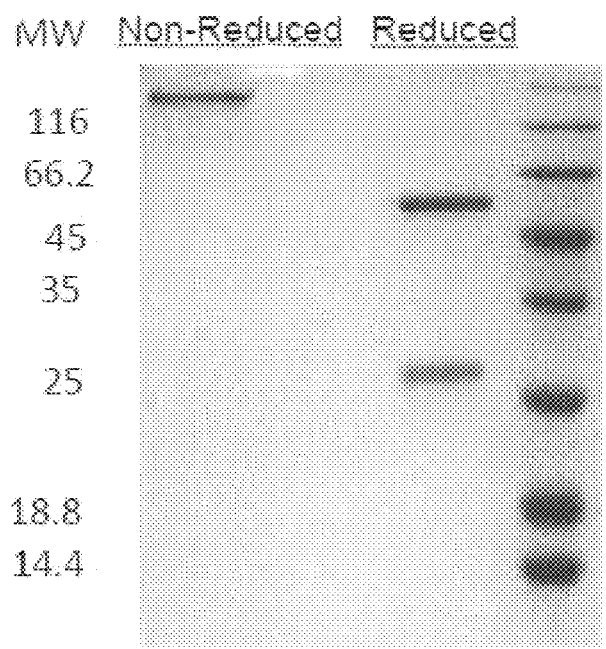
FIG. 3 SDS-PAGE Results of Monoclonal Antibody 4G10H3L3. From left to right: 1 μg antibody in reduced loading buffer; 5 μL Marker.

The heavy chain cDNAs and light chain cDNAs of 4G10H1L1, 4G10H3L3, 4G10H4L3 were separately cloned into pUC57 simple vectors to obtain pUC57simple-4G10H1 and pUC57simple-4G10L1, pUC57simple-4G10H3 and pUC57simple-4G10L3, and pUC57simple-4G10H4 and pUC57simple-4G10L3, repectively. They were subcloned into pcDNA3.1 vectors. The recombinant plasmids were transfected into 293F cells and the culture medium was harvested and purified to obtain humanized antibodies 4G10H1L1, 4G10H3L3 and 4G10H4L3. The purified 4G10H1L1 and 4G10H3L3 were identified by SDS-PAGE electrophoresis, and the result was shown in FIG. 2 and FIG. 3 respectively.

Example 4: Preparation of Anti-PD-1 Antibody 14C12

1. Establishment of Hybridoma Cell Line LT003

Using PD-1-mFc as the antigen, the hybridoma cells were obtained by fusing the splenocytes of immunized BALB/C mice (purchased from Guangdong Medical Laboratory Animal Center) and mice myeloma cells with currently established method (for example, Stewart, S. J., "Monoclonal Antibody Production", in Basic Methods in antibody Production and Characterization, Eds. G. C. Howard and D. R. Bethell, Boca Raton: CRC Press, 2000).

Microplate was coated with PD-1-mFc as the antigen, and indirect ELISA was used to screen those hybridoma cells secreting new antibodies specifically binding to PD-1.

The hybridoma cells were further screened by competitive ELISA to select those secreting antibodies that competitively bind to PD-1 against ligand PDLL-hFc (PDLL Genbank ID:NP_054862.1 and then a stable hybridoma cell line LT003(PD-1-14C12) was obtained by limited dilution method, and its secreted monoclonal antibody is named 14C12.

LT003 (PD-1-14C12), a hybridoma cell line, was deposited in China Center for Type Culture Collection (CCTCC) on Jun. 16, 2015. Deposit Accession NO.: C2015105, depository address: Wuhan university, Wuhan, China, zip code: 430072.

2. Preparation of Anti-PD-1 Antibody 14C12

The LT003 cells in the present invention were cultured using IMDM medium containing 10% low IgG fetal bovine serum (IMDM medium containing 1% streptomycin, cultured in cell incubator with 5% CO2, 37° C. incubator), and after 7 days culture the cell culture supernatant was harvested and purified to get the antibody 14C12.

Example 5: Acquisition of the Sequence of Antibody 14C12

Acquisition of the Sequence of Antibody 14C12 mRNA was extracted from the hybridoma cell line LT003 prepared in Example 4 above according to the manual of the cell/bacterial total RNA extraction reagent kit (Tiangen, Product No. DP430).

cDNA was synthesized using Invitrogen SuperScript® III First—Strand Synthesis System for RT-PCR, and amplified by PCR.

TA cloning was directly carried out on the PCR amplified product according to the instructions of pEASY-T1 Cloning Kit (Transgen CT101).

The products of TA cloning were directly sequenced, and the sequencing results were as follows:

Nucleic acid sequence of heavy chain variable region: (354 bp)
(SEQ ID NO: 15)
```
GAGGTCAAACTGGTGGAGAGCGGCGGCGGGCTGGTGAAGCCCGGCGGGT

CACTGAAACTGAGCTGCGCCGCTTCCGGCTTCGCCTTTAGCTCCTACGA

CATGTCATGGGTGAGGCAGACCCCTGAGAAGCGCCTGGAATGGGTCGCT

ACTATCAGCGGAGGCGGGCGATACACCTACTATCCTGACTCTGTCAAAG

GGAGATTCACAATTAGTCGGGATAACGCCAGAAATACTCTGTATCTGCA

GATGTCTAGTCTGCGGTCCGAGGATACAGCTCTGTACTATTGTGCAAAC

CGGTACGGCGAAGCATGGTTTGCCTATTGGGGACAGGGCACCCTGGTGA

AGTCTCTGCC
```

Encoded amino acid sequence: (118 aa)
(SEQ ID NO: 16)
```
EVKLVESGGGLVKPGGSLKLSCAASGFAFSSYDMSWVRQTPEKRLEWVA

TISGGGRYTYYPDSVKGRFTISRDNARNTLYLQMSSLRSEDTALYYCAN

RYGEAWFAYWGQGTLVTVSA
```

Nucleic acid sequence of the light chain variable region: (318 bp)
(SEQ ID NO: 17)
```
GACATTAAGATGACACAGTCCCCTTCCTCAATGTACGCTAGCCTGGGCG

AGCGAGTGACCTTCACATGCAAAGCATCCCAGGACATCAACACATACCT

GTCTTGGTTTCAGCAGAAGCCAGGCAAAAGCCCCAAGACCCTGATCTAC

CGGGCCAATAGACTGGTGGACGGGGTCCCCAGCAGATTCTCCGGATCTG

GCAGTGGGCAGGATTACTCCCTGACCATCAGCTCCCTGGAGTATGAAGA

CATGGGCATCTACTATTGCCTGCAGTATGATGAGTTCCCTCTGACCTTT

GGAGCAGGCACAAAACTGGAACTG
```

Encoded amino acid sequence: (106 aa)
(SEQ ID NO: 18)
```
DIKMTQSPSSMYASLGERVTFTCKASQDINTYLSWFQQKPGKSPKTLIY

RANRLVDGVPSRFSGSGSGQDYSLTISSLEYEDMGIYYCLQYDEFPLTF

GAGTKLEL
```

Example 6: Design, Preparation and Assay of Humanized Antibody 14C12H1L1 Against PD-1

1. Design of the Light and Heavy Chain Sequences of the Humanized Antibody 14C12H1L1

Based on the three-dimensional crystal structure of PD-1 protein (Shinohara T, et al., Structure and chromosomal localization of the human PD-1 gene (PDCD1). Genomics 1995, 23 (3): 704-6) and the amino acids sequence of antibody 14C12 obtained in the Example 5, antibody in silico modeling was performed and mutations of amino acids from mouse-like to human-like were engineered to obtain the amino acid sequences of variable regions of antibody 14C12H1L1.

The designed sequences of variable regions are as follows:

```
Nucleic acid sequence of the heavy chain variable
region: (354 bp)
                                          (SEQ ID NO: 19)
GAAGTGCAGCTGGTCGAGTCTGGGGGAGGGCTGGTGCAGCCCGGCGGGT

CACTGCGACTGAGCTGCGCAGCTTCCGGATTCGCCTTTAGCTCCTACGA

CATGTCCTGGGTGCGACAGGCACCAGGAAAGGGACTGGATTGGGTCGCT

ACTATCTCAGGAGGCGGGAGATACACCTACTATCCTGACAGCGTCAAGG

GCCGGTTCACAATCTCTAGAGATAACAGTAAGAACAATCTGTATCTGCA

GATGAACAGCCTGAGGGCTGAGGACACCGCACTGTACTATTGTGCCAAC

CGCTACGGGGAAGCATGGTTTGCCTATTGGGGGCAGGGAACCCTGGTGA

CAGTCTCTAGT

Encoded amino acid sequence: (118 aa)
                                          (SEQ ID NO: 20)
EVQLVESGGGLVQPGGSLRLSCAASGFAFSSYDMSWVRQAPGKGLDWVA

TISGGGRYTYYPDSVKGRFTISRDNSKNNLYLQMNSLRAEDTALYYCAN

RYGEAWFAYWGQGTLVTVSS

Nucleic acid sequence of the light chain variable
region: (321 bp)
                                          (SEQ ID NO: 21)
GACATTCAGATGACTCAGAGCCCCTCCTCCATGTCCGCCTCTGTGGGCG

ACAGGGTCACCTTCACATGCCGCGCTAGTCAGGATATCAACACCTACCT

GAGCTGGTTTCAGCAGAAGCCAGGGAAAAGCCCCAAGACACTGATCTAC

CGGGCTAATAGACTGGTGTCTGGAGTCCCAAGTCGGTTCAGTGGCTCAG

GGAGCGGACAGGACTACACTCTGACCATCAGCTCCCTGCAGCCTGAGGA

CATGGCAACCTACTATTGCCTGCAGTATGATGAGTTCCCACTGACCTTT

GGCGCCGGGACAAAACTGGAGCTGAAG

Encoded amino acid sequence: (107 aa)
                                          (SEQ ID NO: 22)
DIQMTQSPSSMSASVGDRVTFTCRASQDINTYLSWFQQKPGKSPKTLIY

RANRLVSGVPSRFSGSGSGQDYTLTISSLQPEDMATYYCLQYDEFPLTF

GAGTKLELK
```

2. Preparation and SDS-PAGE Electrophoresis of Humanized Antibody 14C12H1L1

The constant region of heavy chain is Ig gamma-1 chain C region, ACCESSION: P01857; and the constant region of light chain is Ig kappa chain C region, ACCESSION: P01834.

Figure 4:
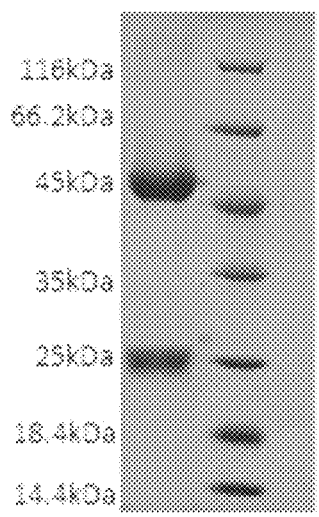
FIG. 4 SDS-PAGE Results of Monoclonal Antibody 14C12H1L1. From left to right: 1 μg antibody in non-reduced loading buffer; 1 µg antibody in reduced loading buffer; 5 µL Marker; 1 µg BSA.

The heavy chain cDNA and light chain cDNA of 14C12H1L1 were separately cloned into pcDNA3.1 vector to obtain the recombinant expression plasmids. The recombinant plasmids were transfected into 293F cells. The 293F cell culture medium was purified and tested. As shown in FIG. 4, the reduced target protein appeared at approximately 24.5 kD and 49 kD, while the non-reduced target protein appeared at approximately 147 kD.

Example 7: Sequence Design, Expression and Assay of Heavy Chains and Light Chains of Bispecific Antibody BiAb001, BiAb002, BiAb003, BiAb004, BiAb007 and BiAb010

1. Sequence Design

Bispecific antibody BiAb001, BiAb002, BiAb003, BiAb004, BiAb007 and BiAb010 in the present invention all belong to Morrison design (IgG-scFv), in which each heavy chain of an IgG antibody are connected with a scFv fragment of another antibody. The configurations of the heavy chains and light chains are shown in Table 1 below.

TABLE 1

The configurations of BiAb001, BiAb002, BiAb003, BiAb004, BiAb007 and BiAb010 heavy chains and light chains

| Bispecific Antibody | Heavy chains | | | Light chains |
|---|---|---|---|---|
| | IgG | Linker fragment | scFv | |
| BiAb001 | 14C12H1 | Linker 1 | 4G10H1v-Linker 2-4G10L1v | 14C12L1 |
| BiAb002 | 14C12H1 | Linker 2 | 4G10H1v-Linker 2-4G10L1v | 14C12L1 |
| BiAb003 | 14C12H1 | Linker 1 | 4G10H3v-Linker 2-4G10L3v | 14C12L1 |
| BiAb004 | 14C12H1 | Linker 2 | 4G10H3v-Linker 2-4G10L3v | 14C12L1 |
| BiAb007 | 14C12H1 | Linker 2 | 4G10H4v-Linker 2-4G10L3v | 14C12L1 |
| BiAb010 | 14C12H1 | Linker 2 | 8D2H14v-Linker 2-8D2L2v | 14C12L1 |

In Table 1:

(1) The antibody sequences marked with subscript "V" refer to the variable region of heavy chains or light chains. Those with no subscript "V" are full-length heavy chains or light chains with constant region. These variable regions or full-length sequences of amino acids and their coding nucleic acid sequences embody the corresponding sequences recorded in the examples above.

```
(2) Linker 1 amino acid sequence is
                                          (SEQ ID NO: 23)
(GGGGS)3

Linker 2 amino acid sequence is
                                          (SEQ ID NO: 24)
(GGGGS)4

(3) Amino acid sequence of the heavy chain
variable region of 8D2H14L2 (8D2H14v):
                                          (SEQ ID NO: 25)
EVQLVESGGGLVQPGGSSRLSCAASGFTFSDNWMNWVRQAPGKGLEWLA

QIRNKPYNYETYYSASVKGRFTISRDDSKNSVYLQMNSLKTEDTGVYYC

TAQFAYWGQGTLVTVSS
```

-continued

Encoded nucleic acid sequence of 8D2H14v:
(SEQ ID NO: 26)
GAGGTGCAGCTGGTCGAATCTGGAGGAGGACTGGTGCAGCCTGGAGGAA

GCTCCCGGCTGTCATGTGCCGCTAGCGGCTTCACCTTTTCCGACAACTG

GATGAATTGGGTGCGACAGGCACCAGGCAAAGGACTGGAGTGGCTGGCT

CAGATCCGGAACAAGCCCTACAATTATGAAACATACTATAGCGCCTCCG

TGAAAGGCCGGTTCACTATTAGTAGAGACGATTCTAAGAACAGCGTGTA

CCTGCAGATGAATAGCCTGAAGACAGAGGATACTGGCGTCTACTATTGC

ACAGCACAGTTTGCCTATTGGGGACAGGGCACCCTGGTGACAGTCTCTA

GT (4) Amino acid sequence of the light chain variable region of 8D2H14L2 (8D2L2v):
(SEQ ID NO: 27)
DIQMTQSPSSLSASVGDRVTITCRTSENIYGGLNWYQRKPGKSPKLLIY

GATNLASGVSSRFSGSGSGTDYTLTISSLQPEDVATYYCQNVLRSPFTF

GSGTKLEIK

Encoded nucleic acid sequence of 8D2L2v:
(SEQ ID NO: 28)
GACATCCAGATGACTCAGAGCCCCTCAAGCCTGTCTGCAAGTGTGGGCG

ATAGGGTCACCATCACATGTCGCACCTCCGAAAACATCTACGGGGGACT

GAATTGGTATCAGCGCAAGCCCGGCAAATCCCCTAAGCTGCTGATCTAC

GGCGCTACCAACCTGGCATCTGGGGTGTCCTCTCGATTTTCAGGGAGCG

GCAGCGGCACCGACTATACTCTGACCATTAGTTCACTGCAGCCTGAGGA

TGTGGCCACATACTATTGCCAGAATGTCCTGAGATCACCATTCACTTTT

GGGAGCGGAACCAAACTGGAAATTAAG

2. Expression and Purification of Antibody BiAb001 cDNAs of heavy chain and light chain of BiAb001 were separately cloned into pUC57simple vectors (provided by GenScript) to obtain plasmids pUC57simple-BiAb001H and pUC57simple-BiAb001L, respectively.

pUC57simple-BiAb001H and pUC57simple-BiAb001L were individually digested with enzymes (HindIII&EcoRI), and genes of heavy chain and light chain recovered via electrophoresis were sub-cloned into pcDNA3.1 vector, respectively. The recombinant plasmids were extracted and co-transfected into 293F cells. After 7 days culture, the culture supernatant was harvested by high-speed centrifugation and concentration, and purified by loading onto HiTrap protein A HP column and eluting with Elution Buffer in one step to obtain the antibody and stored in PBS.

Figure 5:
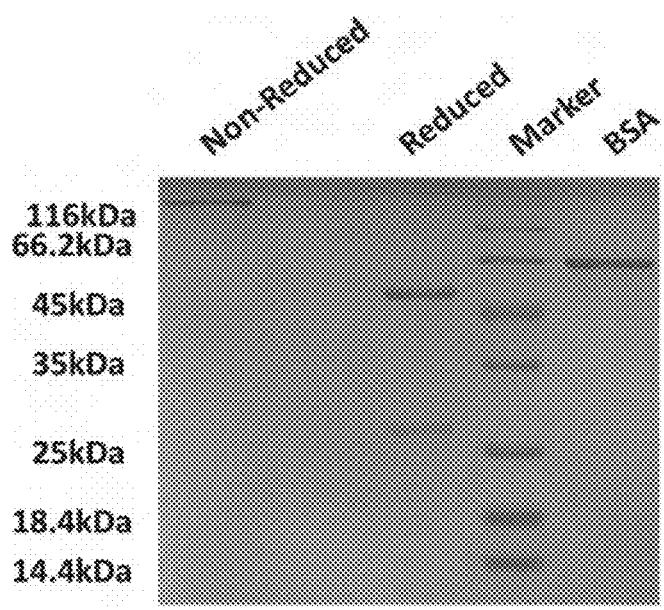
FIG. 5 SDS-PAGE Results of Bispecific Antibody BiAb001. From left to right: 5 µL Marker; 1 µg antibody in non-reduced loading buffer; 1 µg antibody in reduced loading buffer; 1 µg BSA.
Figure 6:
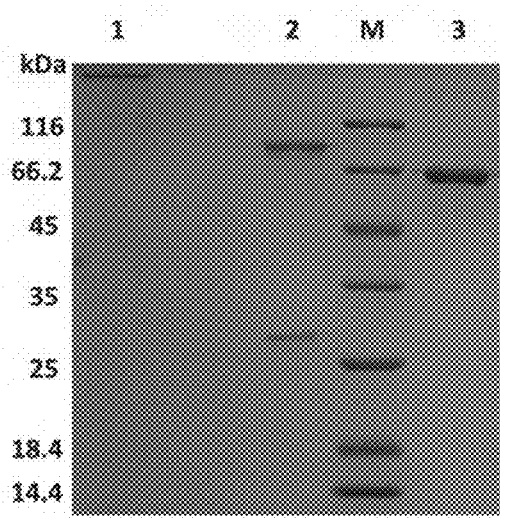
FIG. 6 SDS-PAGE Results of Bispecific Antibody BiAb002. From left to right: 5 µL Marker; 1 µg antibody in non-reduced loading buffer; 1 µg antibody in reduced loading buffer; 1 µg BSA.
Figure 7:
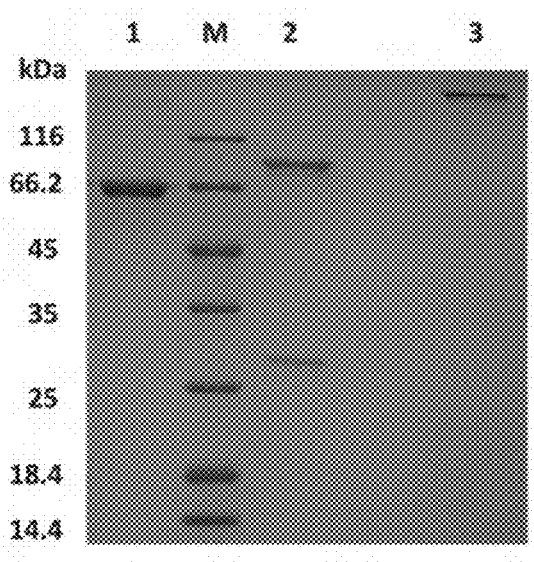
FIG. 7 SDS-PAGE Results of Bispecific Antibody BiAb003. From left to right: 5 µL Marker; 1 µg antibody in non-reduced loading buffer; 1 µg antibody in reduced loading buffer; 1 µg BSA.
Figure 8:
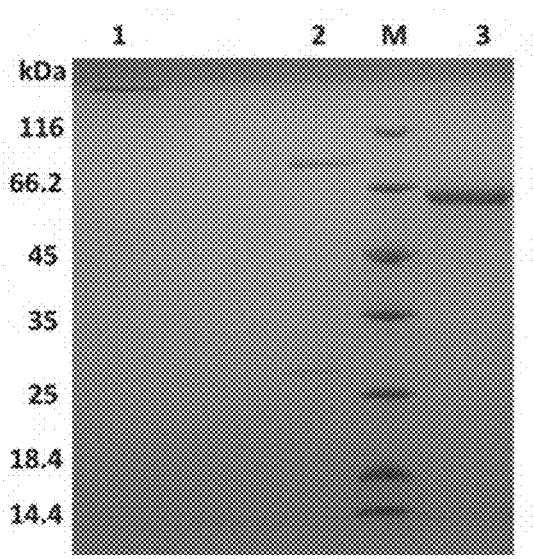
FIG. 8 SDS-PAGE Results of Bispecific Antibody BiAb004. From left to right: 5 µL Marker; 1 µg antibody in non-reduced loading buffer; 1 µg antibody in reduced loading buffer; 1 µg BSA.
Figure 9:
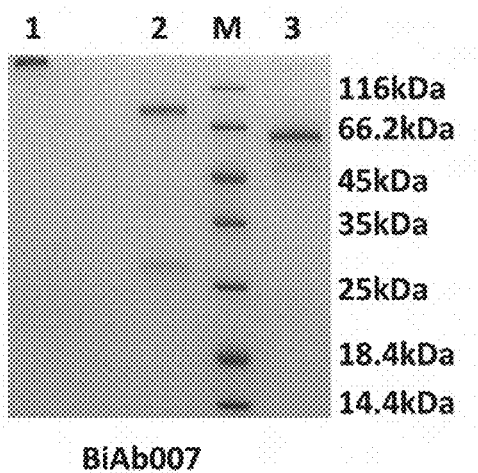
FIG. 9 SDS-PAGE Results of Bispecific Antibody BiAb007. From left to right: 5 µL Marker; 1 µg antibody in non-reduced loading buffer; 1 µg antibody in reduced loading buffer; 1 µg BSA.
Figure 10:
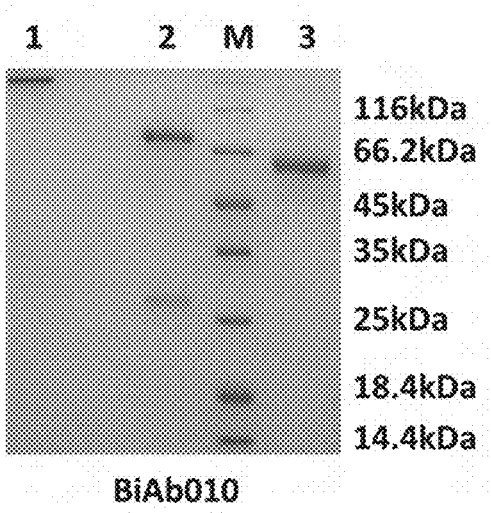
FIG. 10 SDS-PAGE Results of Bispecific Antibody BiAb010. From left to right: 5 µL Marker; 1 µg antibody in non-reduced loading buffer; 1 µg antibody in reduced loading buffer; 1 µg BSA.
Figure 11:
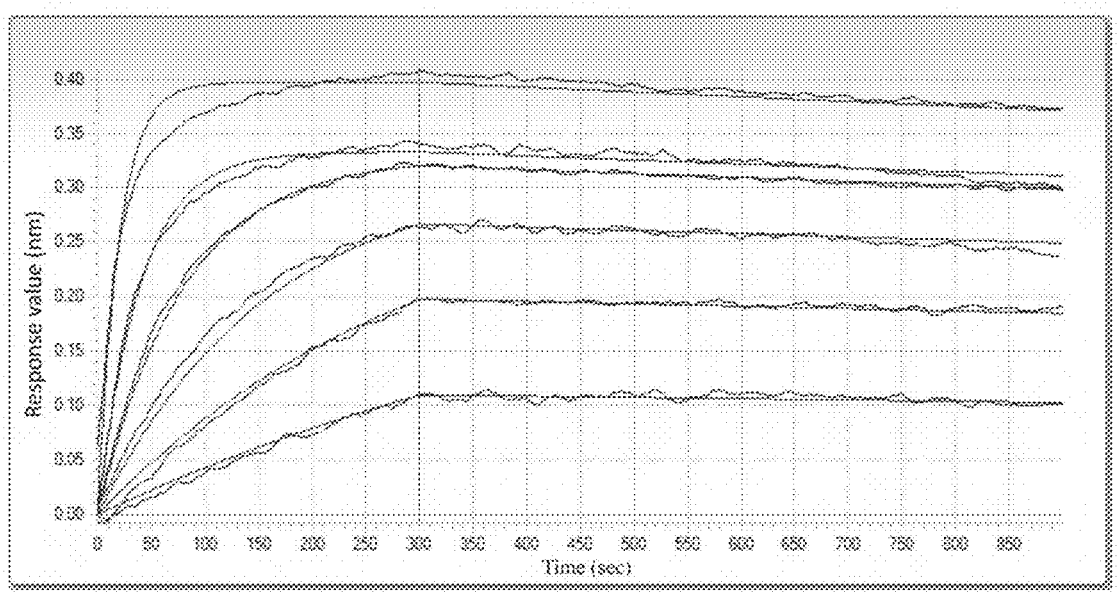
FIG. 11. Binding kinetics of antibody 4G10
Figure 12:
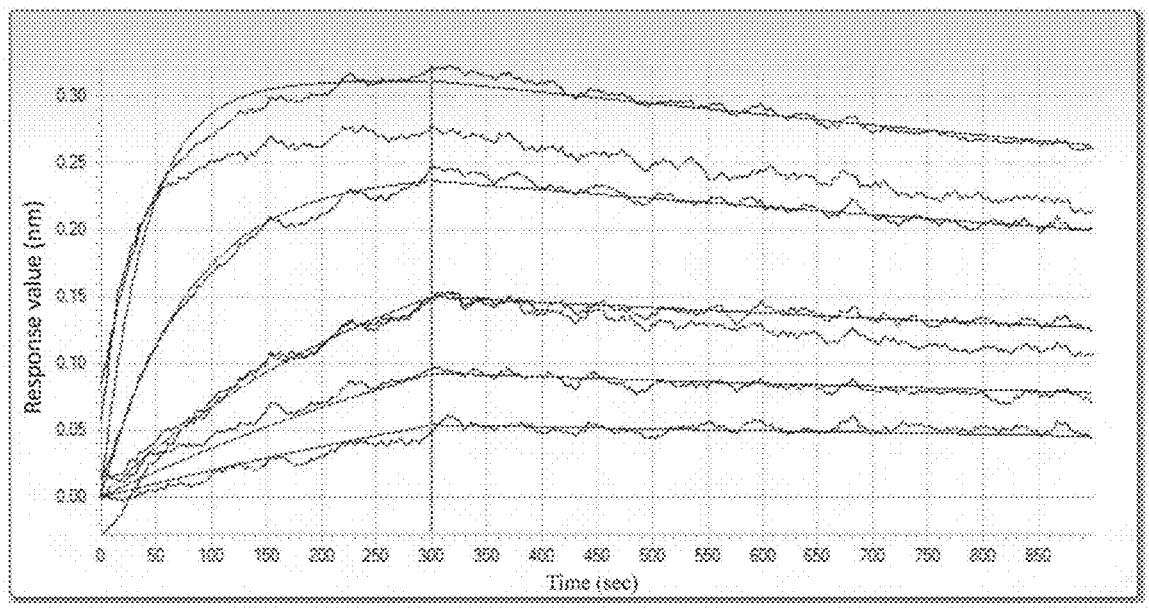
FIG. 12. Binding kinetics of antibody 4G10H1L1
Figure 13:
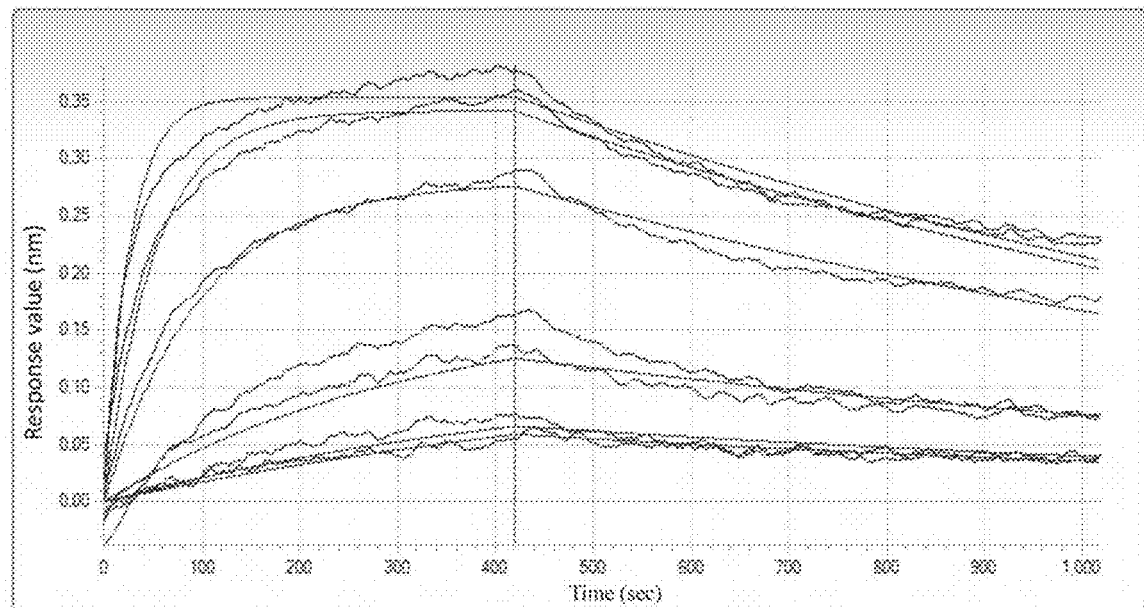
FIG. 13. Binding kinetics of antibody 4G10H3L3
Figure 14:
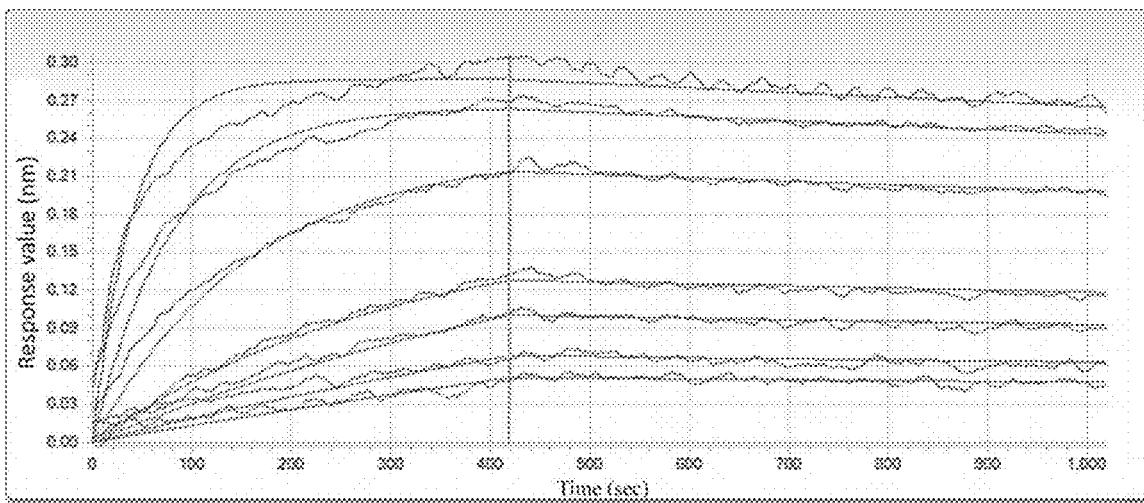
FIG. 14. Binding kinetics of antibody 4G10H4L3

The purified antibody samples were added to reduced protein electrophoresis loading buffer and non-reduced protein electrophoresis loading buffer, respectively. After being boiled, the samples were examined on SDS-PAGE electrophoresis. The results of BiAb001 electrophoresis was shown in FIG. 5, in which the reduced protein sample appeared at 23.6 kD and 75.8 kD, and the non-reduced protein sample (individual antibody) appeared at 199 kD.

3. Expression and Purification of Antibody BiAb002, BiAb003, BiAb004, BiAb007 and BiAb010

Purified antibodies of BiAb002, BiAb003, BiAb004, BiAb007 and BiAb010 were obtained according to the aforementioned methods used for preparation of BiAb001.

The purified antibodies samples were added into of reduced protein electrophoresis loading buffer and non-reduced protein electrophoresis loading buffer, respectively. After being boiled, the samples were examined on SDS-PAGE electrophoresis. The results of BiAb002, BiAb003, BiAb004, BiAb007 and BiAb010 electrophoresis were shown in FIGS. 6, 7, 8, 9 and 10, respectively, in which the reduced protein sample appeared at 23.6 kD and 75.8 kD, and the non-reduced protein sample (individual antibody) appeared at 199 kD.

Example 8: Determination of Antibody Binding Kinetics

The binding kinetics of antigen and antibody were measured by Fortebio molecular interaction instrument.

1. Binding kinetics of antibody 4G10 and its humanized antibody 4G10H1L1, 4G10H3L3, and 4G10H4L3 to antigen CTLA4 were measured 1.1 CTLA4 antigen was obtained by digesting CTLA4-mFc with TEV protease and column purification 1.2 Antibody 4G10 was immobilized to AR2G Biosensors by amine coupling method, and then blocked with ethanolamine and equilibrating in PBST, and then bound to CTLA4. CTLA4 was double gradient diluted with PB ST to the concentrations of 268.1, 134.1, 67, 33.5, 16.8, 8.38, 4.19, and 0 nM. The dissociation was also in PBST. Humanized antibodies 4G10H1L1, 4G10H3L3 and 4G10H4L3 were measured with similar methods to that of 4G10, with antigen concentrations of 180, 90, 45, 22.5, 11.25, 5.625, 2.813 and OnM.

1.3 The binding kinetics of antibody 4G10 and its humanized antibodies 4G10H1L1, 4G10H3L3, and 4G10H4L3 to antigen CTLA4 are shown in Table 1 below, and in FIG. 11, FIG. 12, FIG. 13 and FIG. 14, respectively.

2. Binding kinetics of antibody 14C12 and its humanized antibody 14C12H1L1 to antigen PD-1

2.1 PD-1 antigen was obtained by digesting PD-1-mFc with TEV protease and column purification 2.2 The antigen PD-1 (antigen concentration of 1 μg/ml) was immobilized on the surface of SA sensor after being labeled with biotin, and after equilibrating in PB ST it bind to antibodies 14C12 and 14C12H1L1, respectively. The antibodies were diluted with PBST from 200 nM down three fold each time, and the dissociation was also in PBST.

Figure 15:
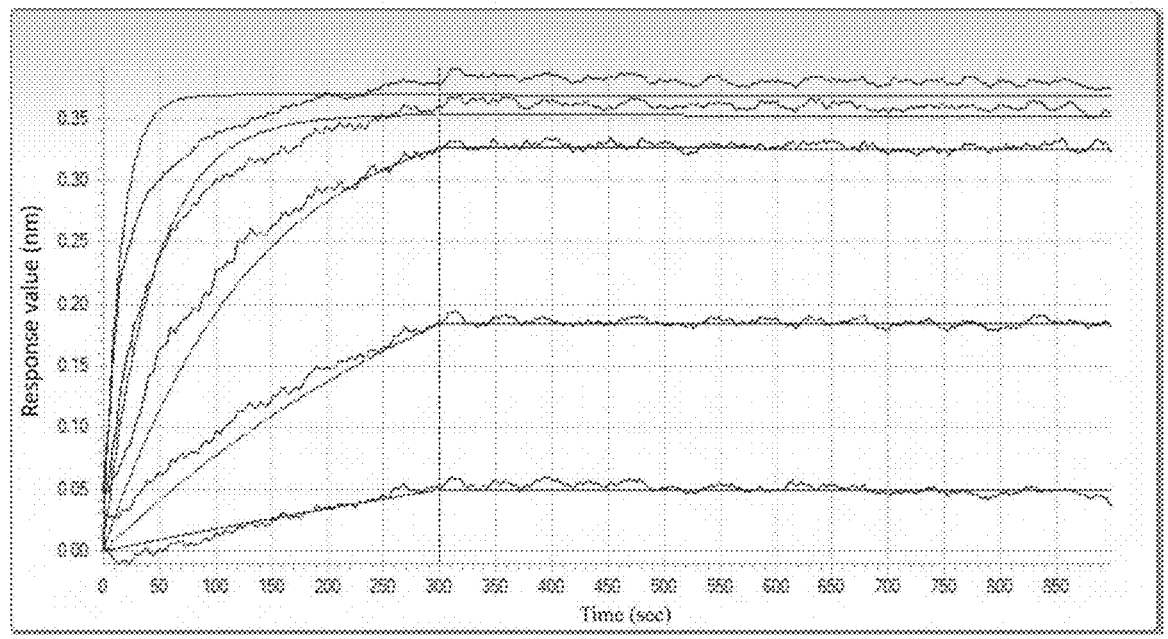
FIG. 15. Binding kinetics of antibody 14C12
Figure 16:
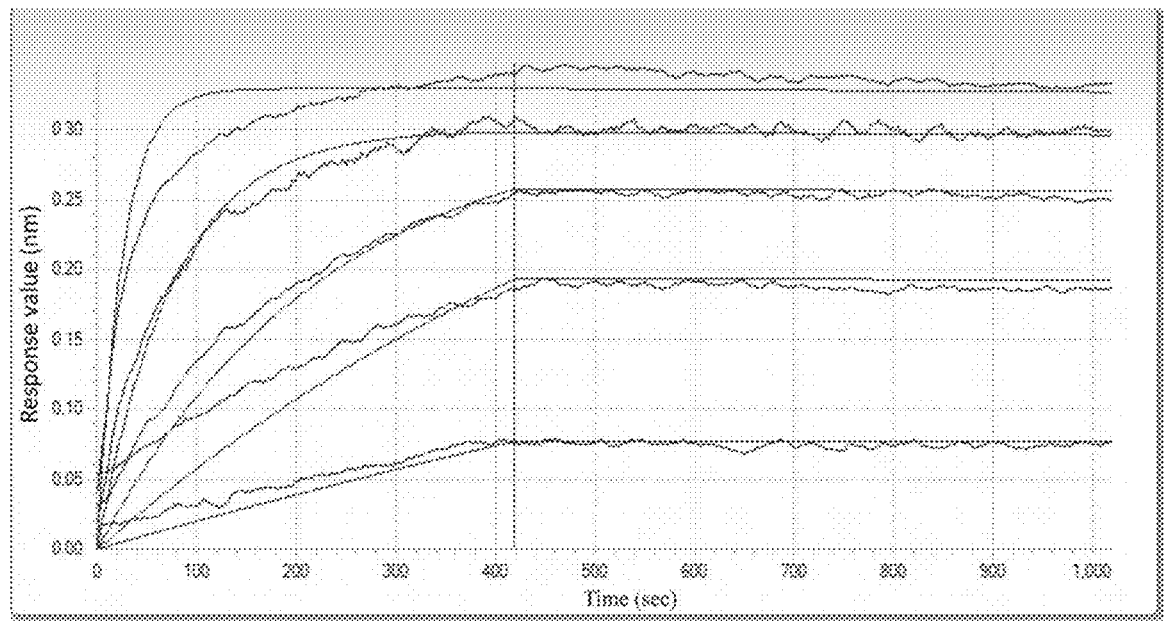
FIG. 16. Binding kinetics of antibody 14C12H1L1
Figure 17:
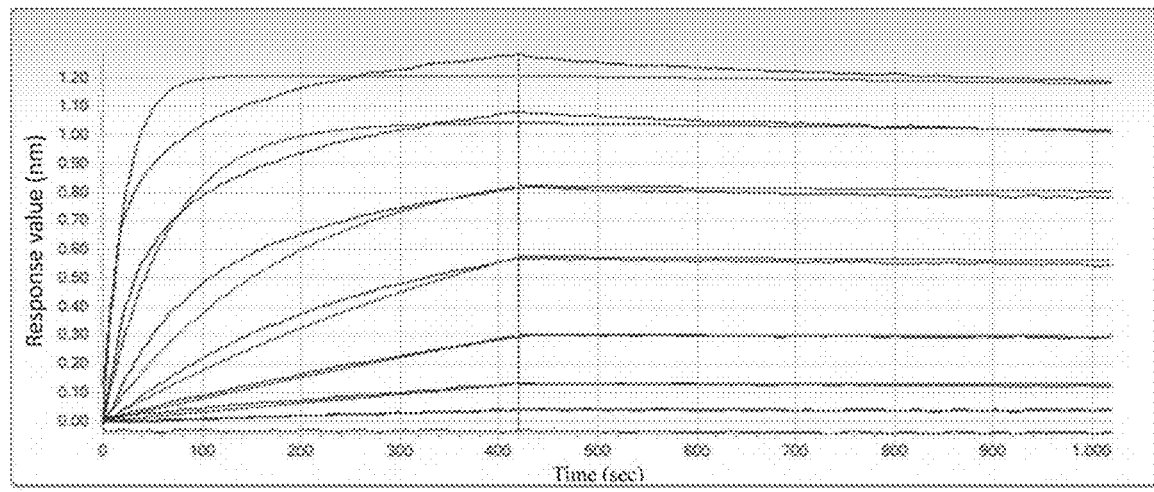
FIG. 17. Binding kinetics of CTLA4 and antibody BiAb001
Figure 18:
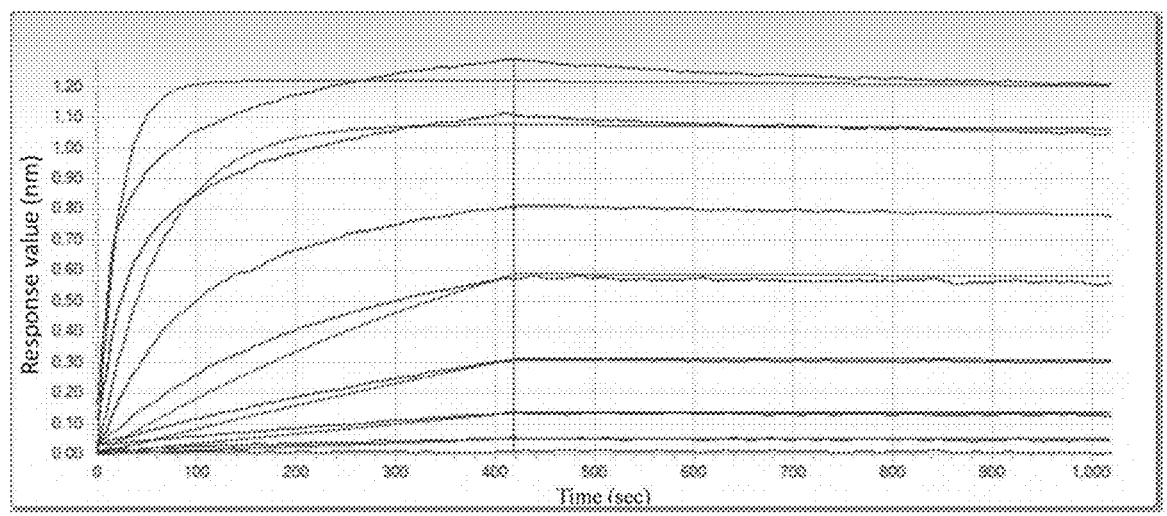
FIG. 18. Binding kinetics of CTLA4 and antibody BiAb002
Figure 19:
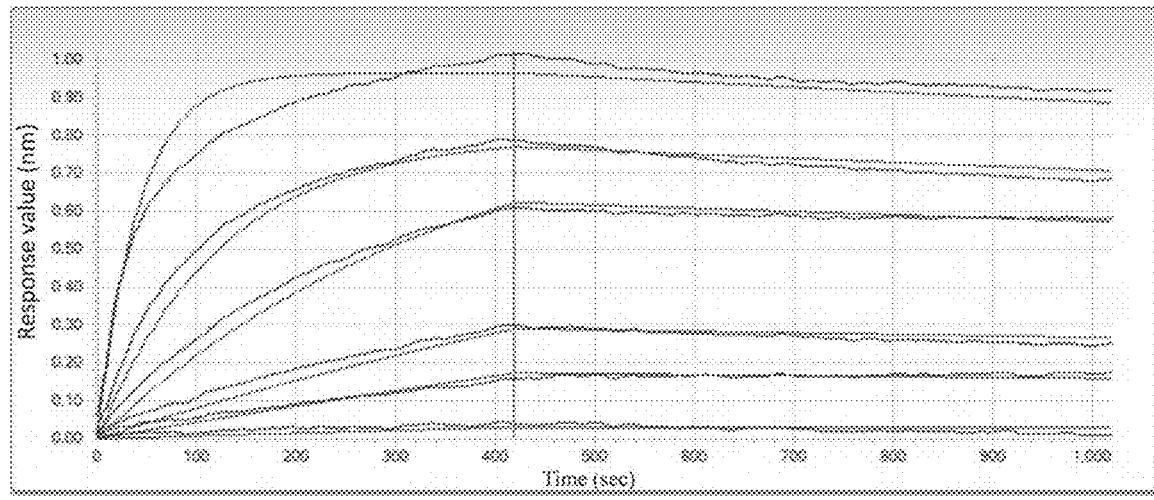
FIG. 19. Binding kinetics of CTLA4 and antibody BiAb003
Figure 20:
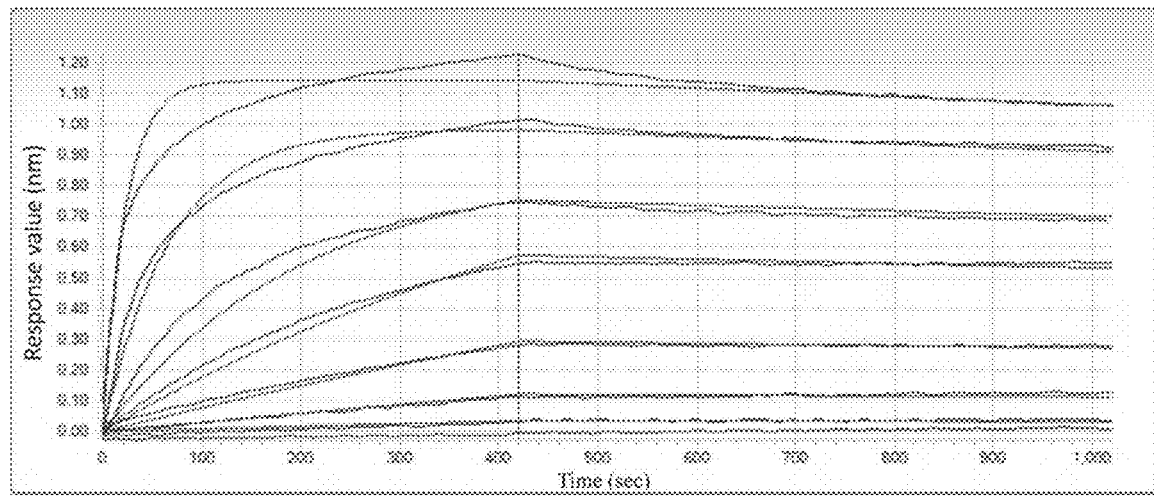
FIG. 20. Binding kinetics of CTLA4 and antibody BiAb004
Figure 21:
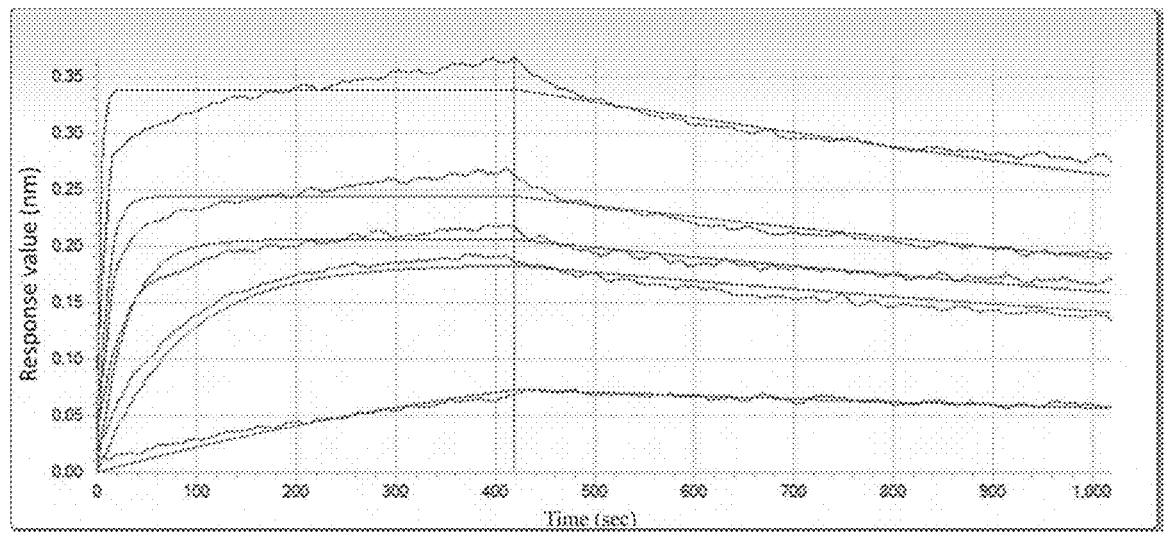
FIG. 21. Binding kinetics of CTLA4 and antibody BiAb007
Figure 22:
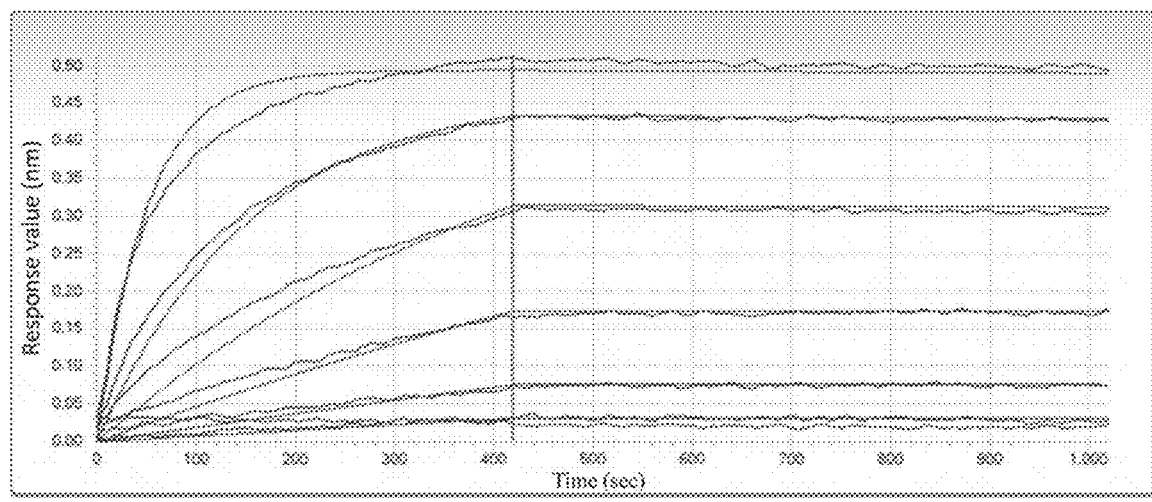
FIG. 22. Binding kinetics of PD-1 and antibody BiAb001
Figure 23:
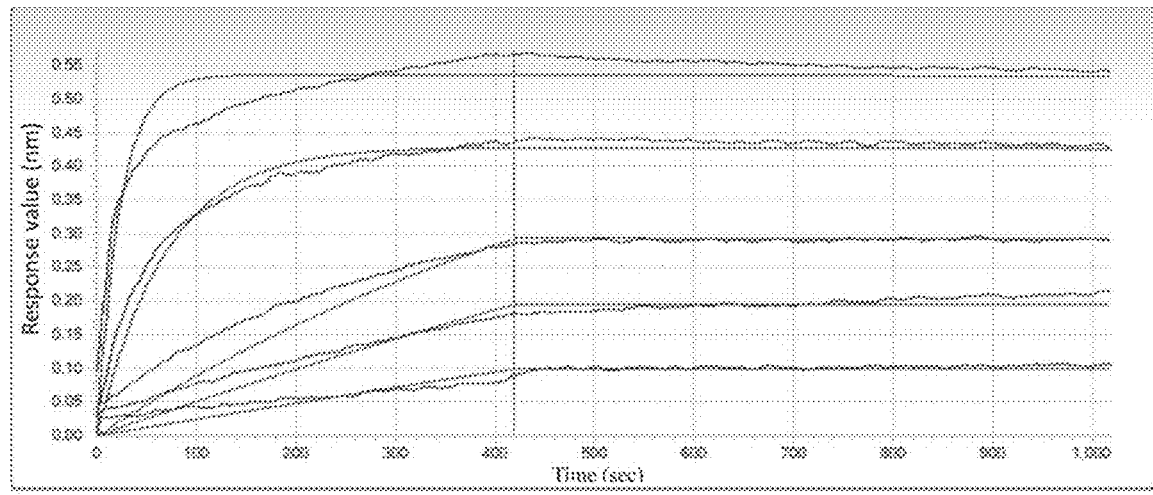
FIG. 23. Binding kinetics of PD-1 and antibody BiAb002
Figure 24:
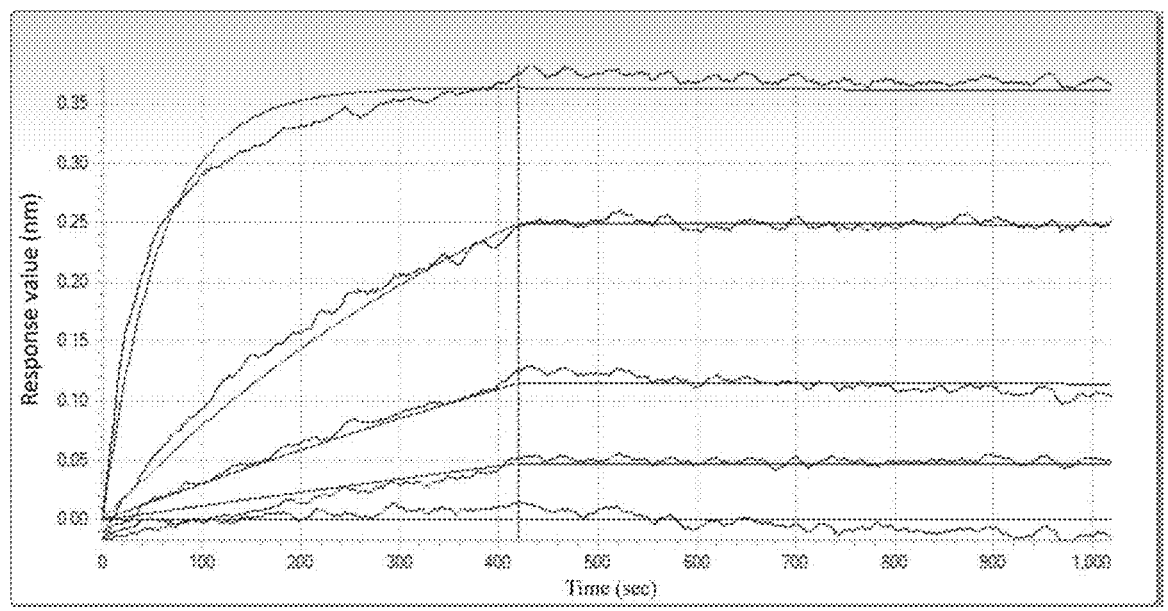
FIG. 24. Binding kinetics of PD-1 and antibody BiAb003
Figure 25:
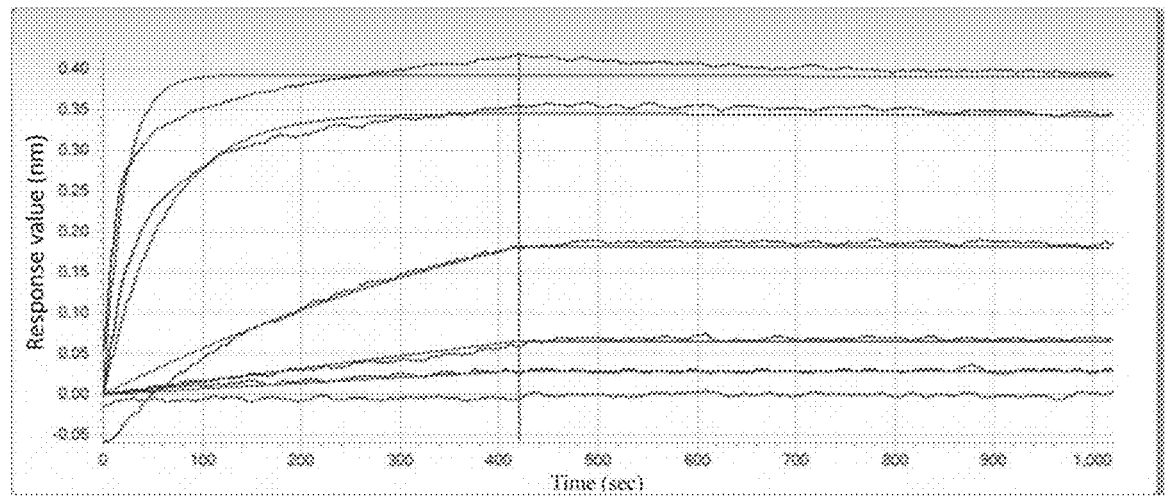
FIG. 25. Binding kinetics of PD-1 and antibody BiAb004
Figure 26:
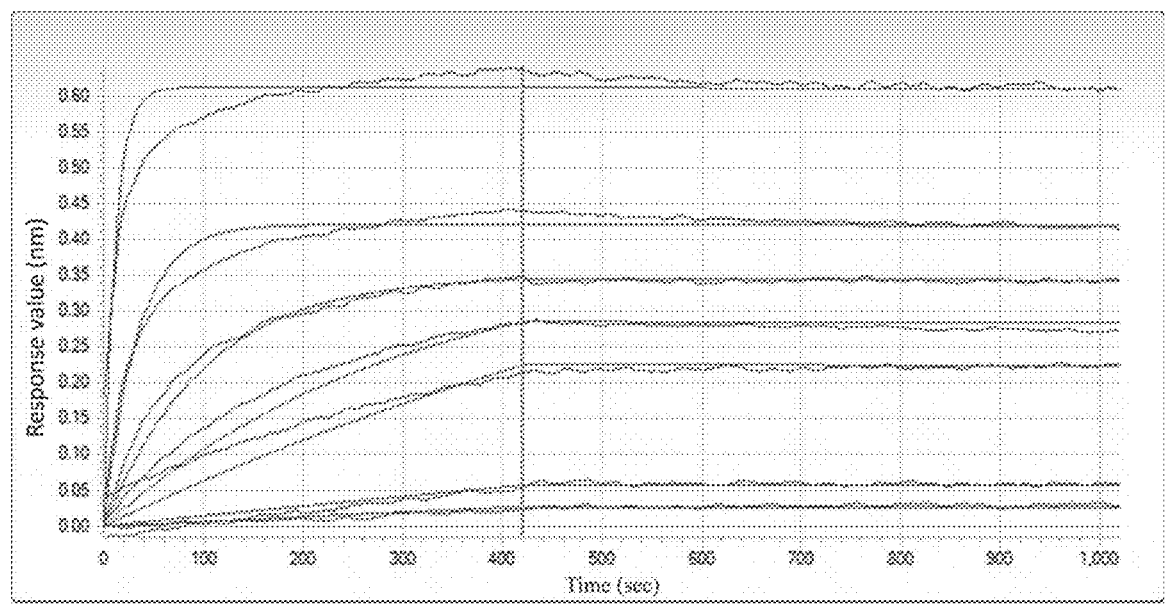
FIG. 26. Binding kinetics of PD-1 and antibody BiAb007
Figure 27:
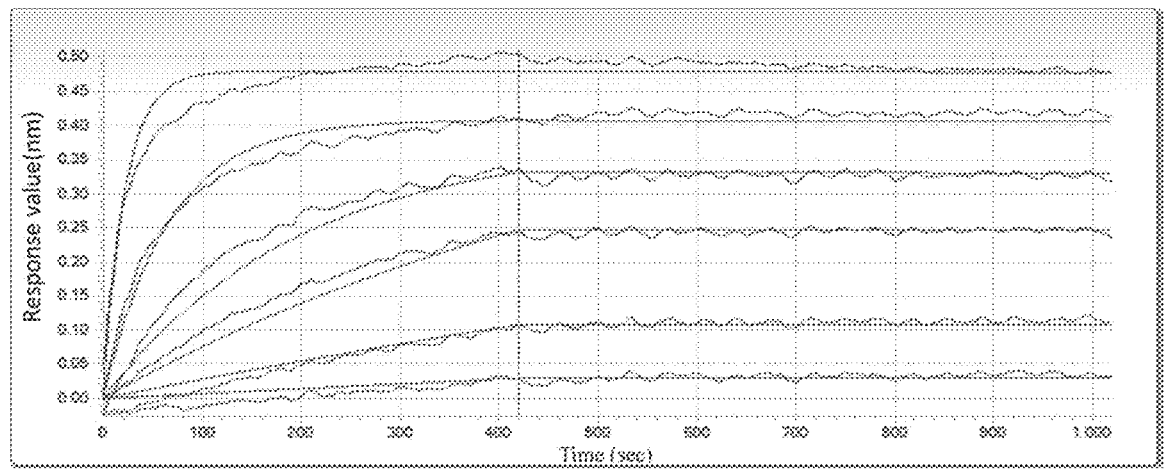
FIG. 27. Binding kinetics of PD-1 and antibody BiAb010

2.3 The binding kinetics of antibodies 14C12 and 14C12H1L1 to antigen are shown in Table 1 below and in FIGS. 15 and 16.

3. Binding kinetics of antibodies BiAb001, BiAb002, BiAb003, BiAb004, BiAb007 and BiAb010 to antigen CTLA4.

3.1 CTLA4 (antigen concentration of 1 μg/ml) was immobilized on the surface of SA sensor after being labeled with biotin, and after equilibrating in PBST, it binds to antibodies BiAb001, BiAb002, BiAb003, BiAb004, BiAb007 and BiAb010, respectively. The antibodies were diluted with PBST from 200 nM down three fold each time. The dissociation was also in PBST.

3.2 Binding kinetics of antibodies BiAb001, BiAb002, BiAb003, BiAb004, BiAb007 and BiAb010 to antigen CTLA4 are shown in Table 1 and in FIGS. 17-21, respectively.

4. Binding kinetics of antibodies BiAb001, BiAb002, BiAb003, BiAb004, BiAb007 and BiAb010 to antigen to antigen PD-1

4.1 The antigen PD-1 (antigen concentration of 1 μg/ml) was immobilized on the surface of SA sensor after being labeled with biotin, and after equilibrating in PBST, it binds to antibodies BiAb001, BiAb002, BiAb003, BiAb004, BiAb007 and BiAb010, respectively. The antibodies were diluted with PBST from 200 nM down three fold each time. The dissociation was also in PBST.

4.2 Binding kinetics of antibodies BiAb001, BiAb002, BiAb003, BiAb004, BiAb007 and BiAb010 to antigen PD-1 are shown in Table 2, and in FIGS. 22-FIG. 27, respectively.

TABLE 2

Kinetic parameters of antibody binding to antigen

| Antibody | Antigen | $K_D$ (M) | Kon(1/Ms) | Kon Error | Kdis(1/s) | Kdis Error |
|---|---|---|---|---|---|---|
| 4G10 | CTLA4 | 3.01E−10 | 3.78E+05 | 4.36E+03 | 1.14E−04 | 5.33E−06 |
| 4G10 H1L1 | 1 μg/ml | 1.52E−09 | 1.86E+05 | 3.26E+03 | 2.82E−04 | 9.23E−06 |
| 4G10 H3L3 | | 4.14E−09 | 2.09E+05 | 3.81E+03 | 8.64E−04 | 1.11E−05 |
| 4G10H4L3 | | 9.67E−10 | 1.37E+05 | 2.22E+03 | 1.32E−04 | 8.69E−06 |
| 14C12 | PD-1 | 1.81E−11 | 3.38E+05 | 8.23E+03 | 6.12E−06 | 1.04E−05 |
| 14C12H1L1 | 1 μg/ml | 2.42E−11 | 3.17E+05 | 5.90E+03 | 7.66E−06 | 8.70E−06 |
| BIAb001 | CTLA4 | 1.67E−10 | 2.33E+05 | 4.45E+03 | 3.89E−05 | 8.75E−06 |
| BIAb002 | 1 μg/ml | 9.69E−11 | 2.37E+05 | 5.32E+03 | 2.30E−05 | 9.97E−06 |
| BIAb003 | | 3.95E−10 | 3.60E+05 | 7.10E+03 | 1.42E−04 | 9.99E−06 |
| BIAb004 | | 5.66E−10 | 2.20E+05 | 3.89E+03 | 1.24E−04 | 8.27E−06 |
| BiAb007 | | 2.72E−10 | 1.58E+06 | 5.17E+04 | 4.28E−04 | 1.12E−05 |
| BiAb010 | | 3.22E−10 | 1.08E+06 | 1.99E+04 | 3.47E−04 | 7.28E−06 |
| BIAb001 | PD-1 | 4.16E−11 | 2.97E+05 | 4.96E+03 | 1.24E−05 | 8.36E−06 |
| BIAb002 | 1 μg/ml | 3.33E−11 | 2.20E+05 | 5.93E+03 | 7.32E−06 | 1.15E−05 |
| BIAb003 | | 4.12E−11 | 2.64E+05 | 5.49E+03 | 1.09E−05 | 9.82E−06 |
| BIAb004 | | 4.82E−11 | 2.47E+05 | 5.45E+03 | 1.19E−05 | 9.61E−06 |
| BiAb007 | | 1.40E−11 | 4.52E+05 | 9.23E+03 | 6.30E−06 | 7.85E−06 |
| BiAb010 | | 2.97E−11 | 2.28E+05 | 4.40E+03 | 6.79E−06 | 8.70E−06 |

$K_D$ Is the affinity constant;
$K_{on}$ is the association rate of antigen-antibody.
$K_{dis}$ is the dissociation rate of antigen-antibody;
$K_D = K_{dis}/K_{on}$.

The results showed that:

the antibody 4G10 and its humanized antibodies have good affinity to the antigen CTLA4. Both antibodies 14C12 and 14C12H1L1 have good affinity to antigen PD-1.

Bispecific antibodies have good affinity to antigen CTLA4 and PD-1.

Example 9: The Binding Activity of Antibody to Antigen Measured by ELISA

1. The binding activity of humanized antibodies 4G10H1L1 and 4G10H3L3 to antigen CTLA4

1.1 The binding activity of humanized antibodies 4G10H1L1 and 4G10H3L3 to CTLA4 was determined by indirect ELISA.

After incubated with antigen at 4° C. overnight, the microplate was blocked with 1% BSA at 37° C. for 2 h, and then the antibodies were added and incubated at 37° C. for 30 min, and then HRP-labeled secondary antibody (goat anti-human IgG (H+L)) (Jackson, 109-035-088) was added and incubated at 37° C. for 30 min. TMB (Neogen, 308177) was added to react for 5 mins. The absorbance was read at the wavelength of 450 nm in a microplate reader.

Figure 28:
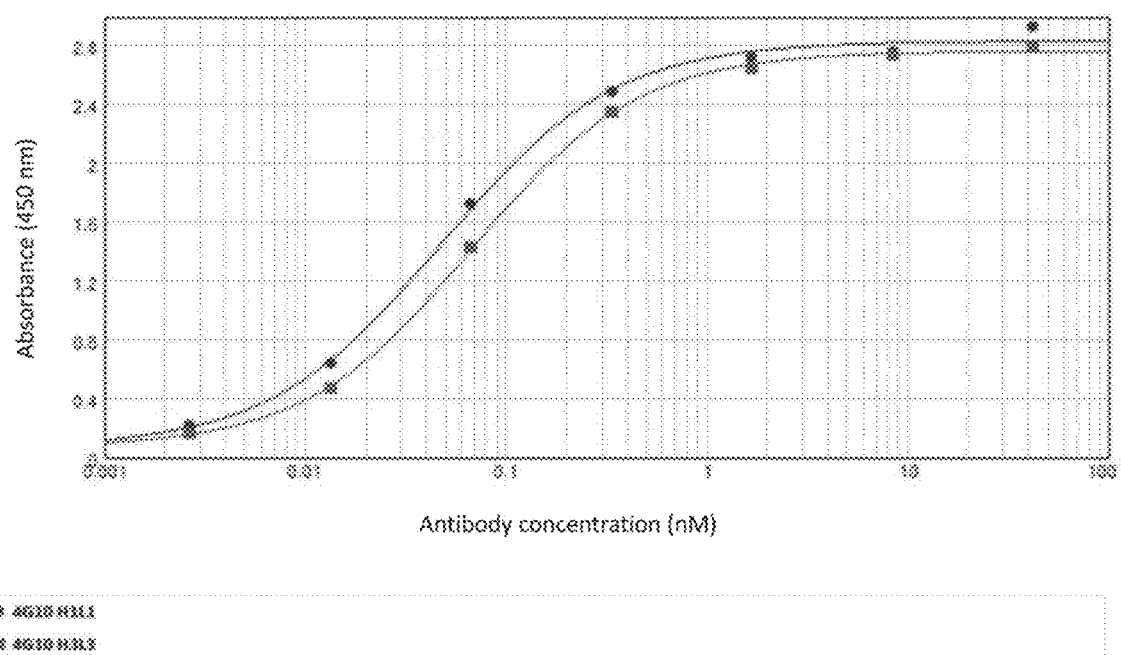
FIG. 28. Indirect ELISA results of 4G10H1L1 and 4G10H3L3 binding to CTLA4.

The binding results were shown in FIG. 28. As shown in the figure, both 4G10H1L1 and 4G10H3L3 can bind to CTLA4 protein effectively with dose-dependency. The absorbance intensities at different doses were shown in Table 3. Through Curve Simulation using quantitative analyses of absorbance values, EC50 of 4G10H1L1 and 4G10H3L3 were then determined to be 0.048 nM and 0.067 nM, respectively.

TABLE 3

The binding activity of 4G10H1L1 and 4G10H3L3 to CTLA4 was measured by indirect ELISA
Coating Antigen: CTLA4 0.5 μg/ml

| Serial dilution of antibody | 4G10 H1L1 | | 4G10 H3L3 | |
|---|---|---|---|---|
| 6 μg/ml | 2.926 | 2.946 | 2.809 | 2.764 |
| 1:5 | 2.784 | 2.732 | 2.729 | 2.739 |

TABLE 3-continued

The binding activity of 4G10H1L1 and 4G10H3L3 to CTLA4 was measured by indirect ELISA
Coating Antigen: CTLA4 0.5 μg/ml

| Serial dilution of antibody | 4G10 H1L1 | | 4G10 H3L3 | |
|---|---|---|---|---|
| 1:25 | 2.729 | 2.688 | 2.668 | 2.617 |
| 1:125 | 2.490 | 2.469 | 2.367 | 2.309 |
| 1:625 | 1.736 | 1.709 | 1.498 | 1.357 |
| 1:3126 | 0.607 | 0.663 | 0.513 | 0.432 |
| 1:16525 | 0.198 | 0.225 | 0.175 | 0.149 |
| 1:78125 | 0.096 | 0.115 | 0.089 | 0.087 |
| 1:390625 | 0.075 | 0.087 | 0.075 | 0.072 |
| 1:1953125 | 0.071 | 0.090 | 0.066 | 0.077 |
| 1:9765625 | 0.066 | 0.087 | 0.078 | 0.089 |
| 0 | 0.073 | 0.079 | 0.079 | 0.068 |
| Secondary antibody | Goat anti-Human IgG, HRP (1:5000) | | | |

1.2. The binding activity of humanized antibodies 4G10H1L1 and 4G10H3L3 to CTLA4 by competition ELISA against B7

Coating antigen to microplate with B7/1-hFc (B7/1 genbank ID: NP 005182.1) 4° C. overnight, and then after blocked with 1% BSA for 2 hours, mixtures of antibodies and CTLA4-mFc antibody were added (dilute concentrations are shown in table 4) and incubate for 30 min at 37° C.; and then secondary antibody labeled with enzyme was added and then incubated for 30 mins at 37° C. The absorption value of 450 nm was measured on the enzyme-labeled instrument (see table 4).

Figure 29:
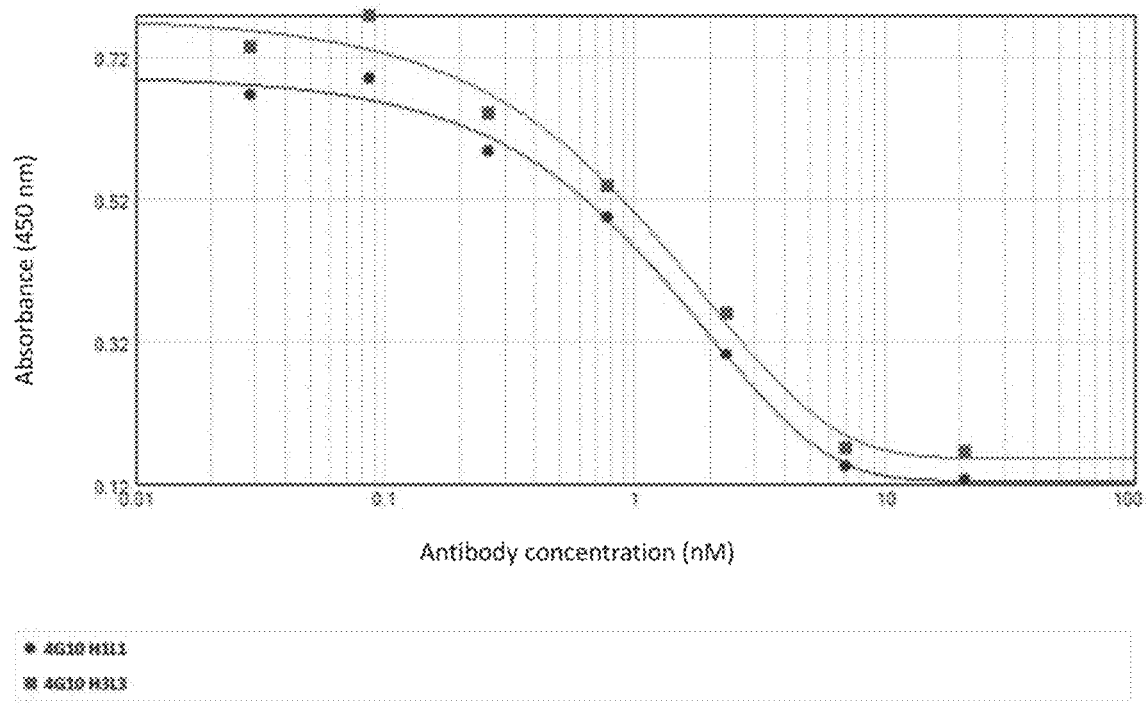
FIG. 29. Competition ELISA results of 4G10H1L1 and 4G10H3L3 binding to CTLA4 against B7.

The binding results of antibodies to CTLA4 competing against B7-1 were shown in FIG. 29. As shown in the figure, the antibodies 4G10H1L1 and 4G10H3L3 can compete against B7-1 and bind to CTLA4 protein effectively with dose-dependency. The absorbance at different doses were shown in Table 4. Through Curve Simulation using quantitative analyses of absorbance values, EC50 of 4G10H1L1 and 4G10H3L3 binding with CTLA4 were then determined to be 1.297 nm and 1.229 nm, respectively.

TABLE 4

The binding activity of humanized antibodies 4G10H1L1 and 4G10H3L3 to CTLA4 by competition ELISA against B7
Coating Antigen: B7/1-hFc 0.5 µg/ml

| Serial dilution of Antibody | 4G10H1L1 | | 4G10H3L3 | | receptor |
|---|---|---|---|---|---|
| 3 µg/ml | 0.132 | 0.121 | 0.146 | 0.185 | CTLA4-mFc 0.3 µg/ml |
| 1:3 | 0.120 | 0.170 | 0.159 | 0.182 | |
| 1:9 | 0.260 | 0.343 | 0.382 | 0.340 | |
| 1:27 | 0.399 | 0.593 | 0.570 | 0.507 | |
| 1:81 | 0.565 | 0.614 | 0.642 | 0.642 | |
| 1:243 | 0.628 | 0.753 | 0.784 | 0.773 | |
| 1:729 | 0.573 | 0.760 | 0.768 | 0.702 | |
| 1:2187 | 0.553 | 0.824 | 0.741 | 0.788 | |
| 1:6561 | 0.661 | 0.844 | 0.824 | 0.679 | |
| 1:19683 | 0.555 | 0.834 | 0.742 | 0.699 | |
| 1:59049 | 0.552 | 0.725 | 0.773 | 0.770 | |
| 0 | 0.610 | 0.665 | 0.822 | 0.717 | |
| Secondary antibody | Goat anti-Mouse IgG, HRP (1:5000) | | | | |

2. The binding activities of monoclonal antibody 14C12 and its humanized antibody 14C12H1L1 to antigen PD-1 measured by ELISA 2.1 The binding activity of monoclonal antibodies 14C12 and 14C12H1L1 to antigen PD-1 was determined by indirect ELISA as follows:

After incubated with PD-1-mFc at 4° C. overnight, the microplate was blocked with 1% BSA at 37° C. for 2 h, and the antibodies were added, incubated at 37° C. for 30 min, and HRP-labeled secondary antibody (goat anti-human IgG (H+L)) (Jackson, 109-035-088) was added and incubated at 37° C. for 30 min. TMB (Neogen, 308177) was added to react for 5 mins. The absorbance was read at the wavelength of 450 nm in a microplate reader.

Figure 30:
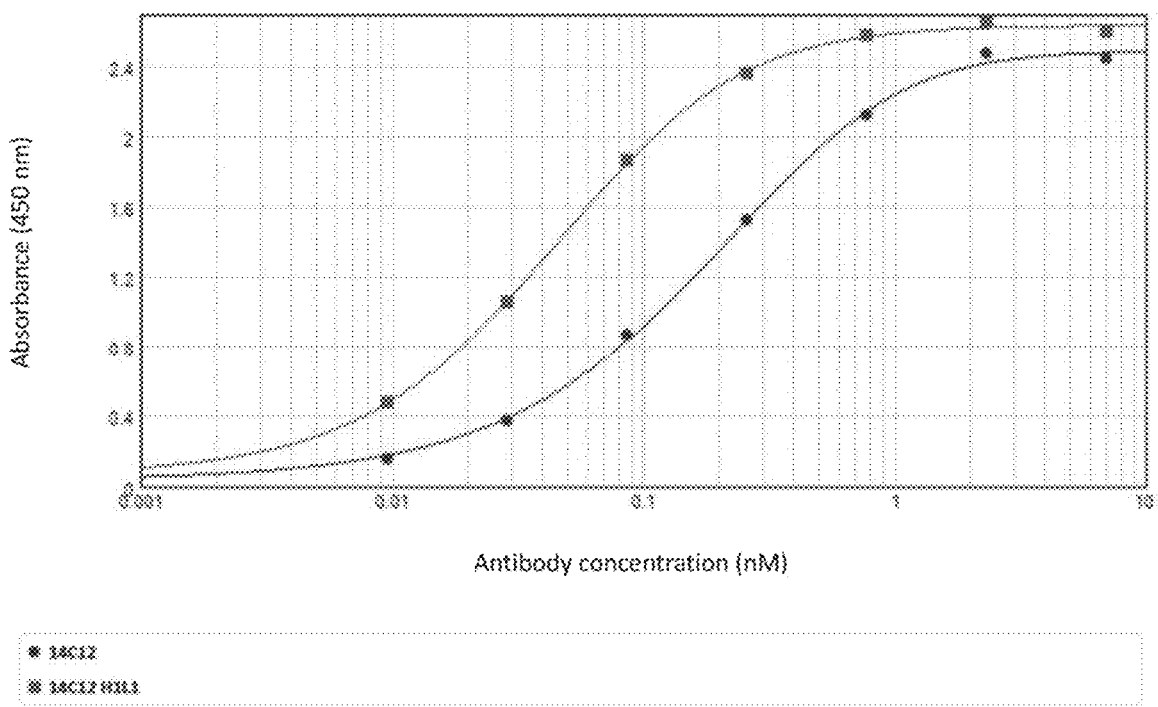
FIG. 30. Indirect ELISA results of 14C12 and 14C12H1L1 binding to PD-1.

The binding results of antibodies 14C12 and 14C12H1L1 to PD-1 were shown in FIG. 30. Evidently, both 14C12 and 14C12H1L1 can bind to PD-1 protein effectively with dose-dependency. The absorbance at different doses were shown in Table 5. Through Curve Simulation using quantitative analyses of absorbance values, EC50 of 14C12 and 14C12H1L1 binding to PD-1 were then determined to be 0.175 nM and 0.043 nM, respectively.

TABLE 5

The binding activities of antibodies 14C12 and 14C12H1L1 to PD-1, respectively
Coating Antigen: PD-1-mFc (0.5 µg/mL)

| Antibody concentration (µg/mL) | 14C12 | | 14C12H1L1 | |
|---|---|---|---|---|
| 1 | 2.463 | 2.439 | 2.643 | 2.557 |
| 0.3 | 2.572 | 2.380 | 2.734 | 2.586 |
| 0.1 | 2.118 | 2.126 | 2.633 | 2.535 |
| 0.03 | 1.607 | 1.438 | 2.384 | 2.335 |
| 0.01 | 0.930 | 0.809 | 1.892 | 1.839 |

TABLE 5-continued

The binding activities of antibodies 14C12 and 14C12H1L1 to PD-1, respectively
Coating Antigen: PD-1-mFc (0.5 µg/mL)

| Antibody concentration (µg/mL) | 14C12 | | 14C12H1L1 | |
|---|---|---|---|---|
| 0.003 | 0.407 | 0.346 | 1.115 | 1.011 |
| 0.001 | 0.167 | 0.150 | 0.503 | 0.455 |
| 0 | 0.062 | 0.047 | 0.068 | 0.064 |
| Secondary antibody | Goat anti-Mouse secondary antibody, HRP Conjugate | | | |

2.2. The binding activity of monoclonal antibody 14C12 produced by hybridoma and its humanized antibody 14C12H1L1 to antigen PD-1 by competition ELISA against PDL1 was measured as follows:

After incubated with PD-1-hFc or PD-1-mFc at 4° C. overnight, the microplate was blocked with 1% BSA at 37° C. for 2 h; and then mixtures of individual antibody, 14C12 or 14C12H1L1, at different concentrations (see Table 6 for dilution gradient) and PDL1-hFc or PDL-1-mFc were added into the microplate to react for 10 mins; and then HRP-labeled secondary antibody was added and incubated at 37° C. for 30 min. The absorbance was read at the wavelength of 450 nm in a microplate reader (see Table 6).

Figure 31:
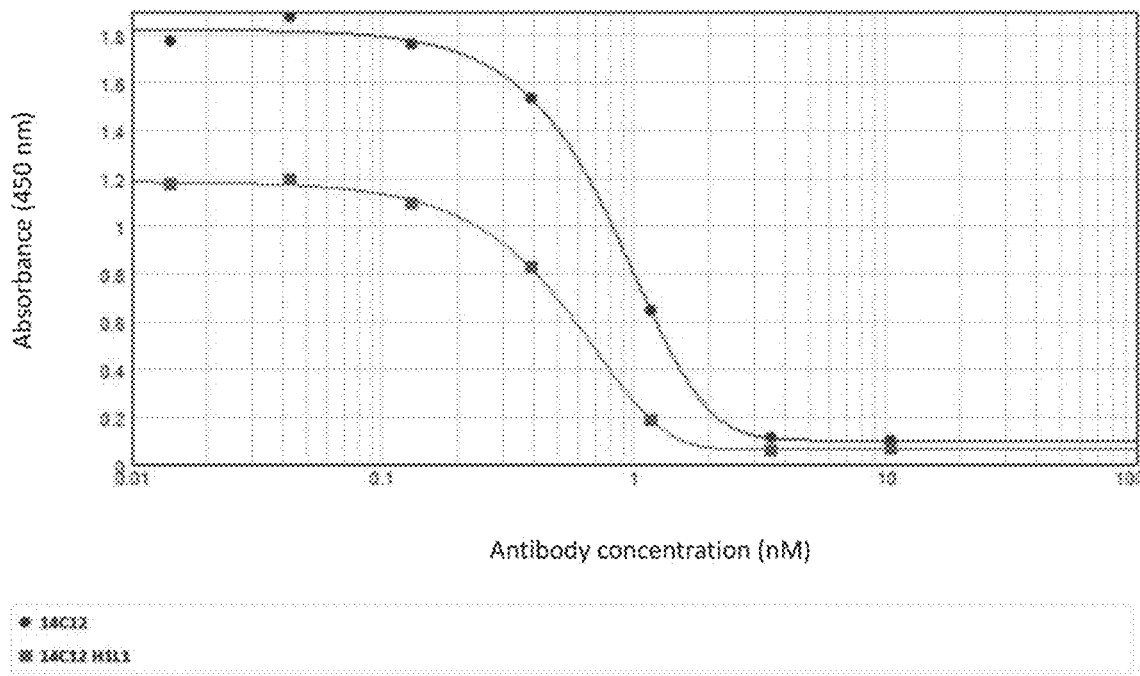
FIG. 31. Competition ELISA results of 14C12 and 14C12H1L1 binding to PD-1 against PDL1.

The binding results of antibodies to PD-1 competing against PDL1 were shown in FIG. 31. the antibody 14C12 and its humanized antibody 14C12H1L1 can compete against PDL1 to bind to PD-1 protein effectively with dose-dependency. The absorbance intensities at different doses were shown in Table 6. By using quantitative analyses of absorbance values, EC50 of 14C12 and 14C12H1L1 binding with PD-1 that were calculated via Curve Simulation were then determined to be 0.853 nM and 0.37 nM, respectively.

TABLE 6

The binding activity of 14C12 and 14C12H1L1 to PD-1 by competition ELISA against PDL1

| Antibody concentration (µg/mL) | Coating antigen: PD-1-mFc 0.2 µg/mL | | | |
|---|---|---|---|---|
| | 14C12 | | 14C12H1L1 | |
| 1.5 µg/ml | 0.111 | 0.088 | 0.135 | 0.113 |
| 1:3 | 0.100 | 0.116 | 0.130 | 0.131 |
| 1:9 | 0.645 | 0.643 | 0.260 | 0.185 |
| 1:27 | 1.463 | 1.614 | 0.257 | 0.218 |
| 1:81 | 1.841 | 1.686 | 0.355 | 0.350 |
| 1:243 | 1.983 | 1.769 | 0.399 | 0.364 |
| 1:729 | 1.789 | 1.770 | 0.417 | 0.411 |
| 0 | 1.791 | 1.790 | 0.430 | 0.402 |
| | PDL1-hFc 2 µg/ml | | | |
| Secondary antibody | Goat anti-Mouse secondary antibody HRP Conjugate | | | |

3. The binding activity of antibodies BiAb001 □BiAb002 □BiAb003 and BiAb004 to antigens measured by ELISA 3.1 The binding activity of antibodies BiAb001, BiAb002, BiAb003, and BiAb004 to antigen CTLA-4 was determined by indirect ELISA (Refer to methods described in 1.1 of the present Example)

Figure 32:
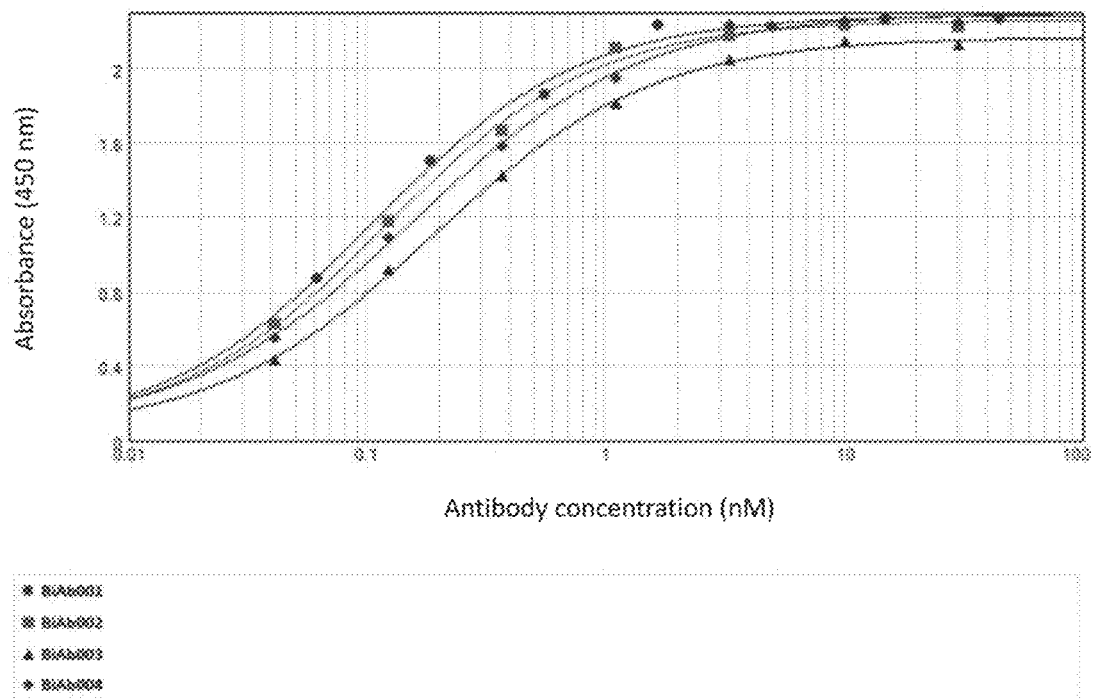
FIG. 32. Indirect ELISA results of BiAb001, BiAb002, BiAb003, and BiAb004 binding to CTLA4.

The binding results of antibodies BiAb001, BiAb002, BiAb003 and BiAb004 to antigen CTLA4 were shown in FIG. 32. Evidently, antibodies BiAb001, BiAb002, BiAb003 and BiAb004 can bind to CTLA4 protein effectively with dose-dependency. The absorbance at different doses were shown in Table 7. Through Curve Simulation using quantitative analyses of absorbance values, EC50 of antibodies BiAb001, BiAb002, BiAb003 and BiAb004 binding to CTLA4 were then determined as shown in Table 7 below.

TABLE 7

The binding activity of bispecific antibodies BiAb001, BiAb002, BiAb003, and BiAb004 to antigen CTLA4 (Indirect ELISA)

| Serial dilution of Antibody | Coating Antigen: CTLA4 0.5 µg/ml | | | | | | | |
|---|---|---|---|---|---|---|---|---|
| | BiAb001 | | BiAb002 | | BiAb003 | | BiAb004 | |
| 6 µg/ml | 2.425 | 2.098 | 2.334 | 2.120 | 2.179 | 2.076 | 2.243 | 2.251 |
| 1:3 | 2.299 | 2.234 | 2.204 | 2.257 | 2.141 | 2.138 | 2.198 | 2.319 |
| 1:9 | 2.265 | 2.188 | 2.168 | 2.186 | 2.012 | 2.086 | 2.207 | 2.254 |
| 1:27 | 2.245 | 2.215 | 2.174 | 2.043 | 1.814 | 1.811 | 1.982 | 1.907 |
| 1:81 | 1.859 | 1.856 | 1.717 | 1.609 | 1.438 | 1.410 | 1.534 | 1.640 |
| 1:243 | 1.494 | 1.511 | 1.221 | 1.136 | 0.933 | 0.899 | 1.070 | 1.108 |
| 1:729 | 0.818 | 0.922 | 0.644 | 0.610 | 0.451 | 0.414 | 0.567 | 0.548 |
| 0 | 0.048 | 0.048 | 0.048 | 0.047 | 0.047 | 0.045 | 0.049 | 0.050 |

Secondary antibody: Goat anti-human IgG, HRP(1:5000)

| EC50 (nM) | 0.105 | 0.12 | 0.189 | 0.154 |
|---|---|---|---|---|

3.2 The binding activity of antibodies BiAb001, BiAb002, BiAb003, and BiAb004 to antigen PD-1 was determined by indirect ELISA. (Refer to methods described in 2.1 of the present Example)

Figure 33:
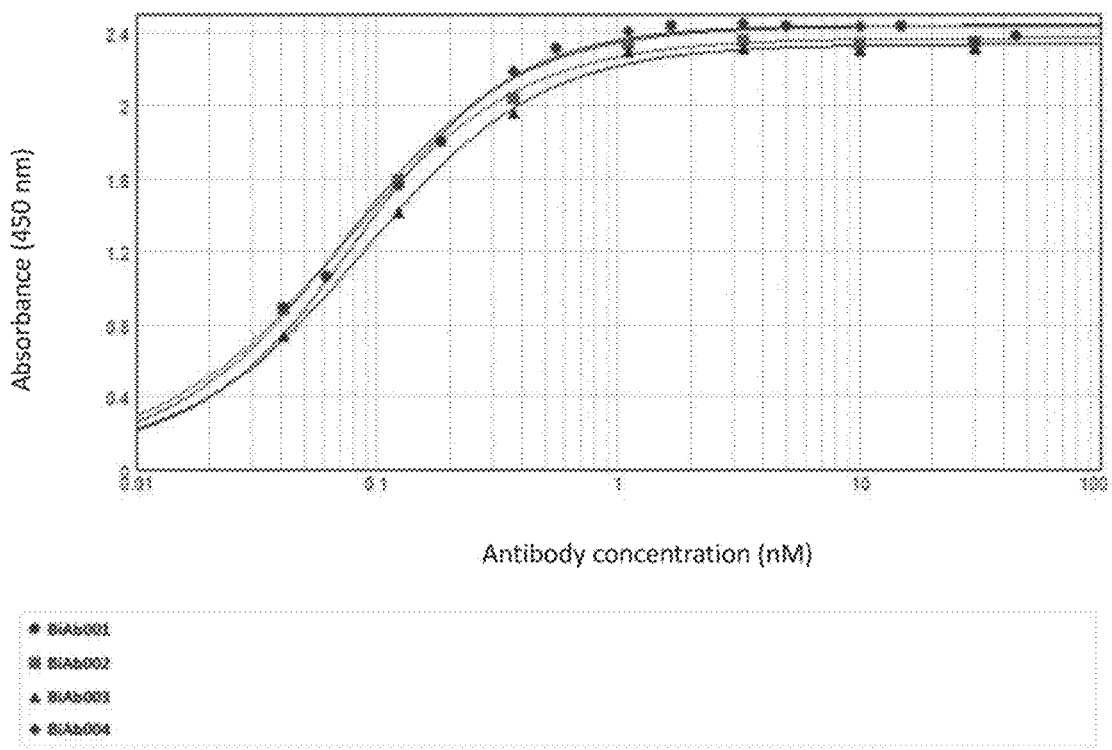
FIG. 33. Indirect ELISA results of BiAb001, BiAb002, BiAb003, and BiAb004 binding to PD-1.

The binding results of antibodies BiAb001, BiAb002, BiAb003, and BiAb004 to antigen PD-1 were shown in FIG. 33. Evidently, antibodies BiAb001, BiAb002, BiAb003, and BiAb004 can bind to PD-1 protein effectively with dose-dependency. The absorbance intensities at different doses were shown in Table 7. Through Curve Simulation using quantitative analyses of absorbance values, EC50 of antibodies BiAb001, BiAb002, BiAb003 and BiAb004 binding to PD-1 were then determined as shown in Table 8 below.

TABLE 8

The binding activity of bispecific antibodies to antigen CTLA4 (Indirect ELISA)

| Serial dilution of Antibody | Coating Antigen: PD-1-mFc 0.5 µg/ml | | | | | | | |
|---|---|---|---|---|---|---|---|---|
| | BiAb001 | | BiAb002 | | BiAb003 | | BiAb004 | |
| 6 µg/ml | 2.400 | 2.360 | 2.370 | 2.314 | 2.332 | 2.290 | 2.347 | 2.343 |
| 1:3 | 2.450 | 2.426 | 2.290 | 2.388 | 2.271 | 2.326 | 2.410 | 2.458 |
| 1:9 | 2.402 | 2.457 | 2.372 | 2.346 | 2.279 | 2.351 | 2.390 | 2.505 |
| 1:27 | 2.409 | 2.467 | 2.332 | 2.348 | 2.350 | 2.243 | 2.414 | 2.396 |
| 1:81 | 2.375 | 2.254 | 2.084 | 1.990 | 1.996 | 1.928 | 2.197 | 2.175 |
| 1:243 | 1.871 | 1.725 | 1.627 | 1.544 | 1.414 | 1.419 | 1.573 | 1.560 |
| 1:729 | 1.067 | 1.047 | 0.954 | 0.814 | 0.746 | 0.719 | 0.920 | 0.865 |
| 0 | 0.085 | 0.067 | 0.065 | 0.068 | 0.055 | 0.055 | 0.056 | 0.058 |

Secondary antibody: Goat anti-human IgG, HRP (1:5000)

3.3 The binding activity of the antibodies BiAb001, BiAb002, BiAb003, and BiAb004 to CTLA4 respectively by competition ELISA against B7/1-hFc (Refer to methods described in 1.2 of the present Example).

Figure 34:
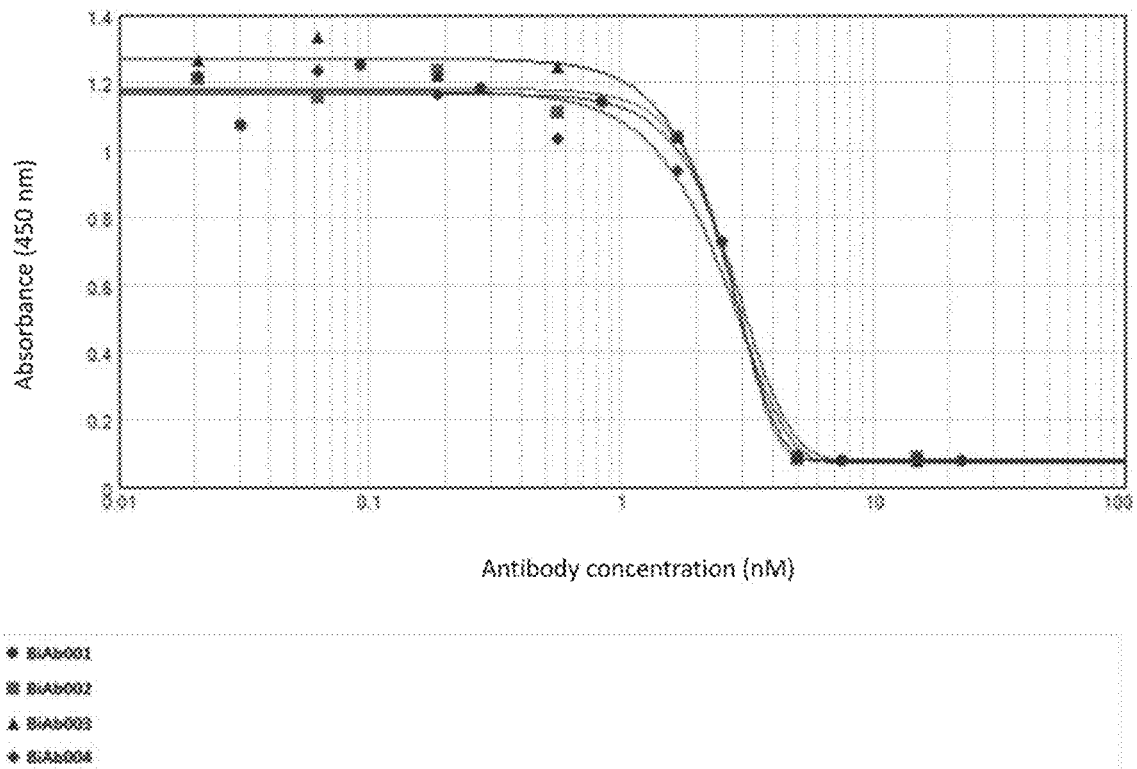
FIG. 34. Competition ELISA results of BiAb001, BiAb002, BiAb003, and BiAb004 binding to CTLA4 against B7.

The binding results were shown in FIG. 34. As shown in the figure, the antibodies BiAb001, BiAb002, BiAb003, and BiAb004 can effectively bind antigen CTLA4 and inhibit CTLA4 binding to B7/1 with dose-dependency. The absorbance intensities at different doses were shown in Table 9. Through Curve Simulation using quantitative analyses of absorbance values, EC50 of antibodies BiAb001, BiAb002, BiAb003 and BiAb004 were then determined as shown in Table 9 below.

TABLE 9

The binding activity of antibodies to CTLA4 by competition ELISA against B7/1-hFc

| Serial dilution of Antibody | Coating Antigen:B7/1-hFc 0.5 µg/ml | | | | | | | |
|---|---|---|---|---|---|---|---|---|
| | BiAb001 | | BiAb002 | | BiAb003 | | BiAb004 | |
| 3 µg/ml | 0.076 | 0.072 | 0.078 | 0.095 | 0.074 | 0.080 | 0.095 | 0.076 |
| 1:3 | 0.081 | 0.076 | 0.079 | 0.079 | 0.095 | 0.086 | 0.097 | 0.100 |
| 1:9 | 0.748 | 0.706 | 1.040 | 1.031 | 1.029 | 1.049 | 0.907 | 0.973 |
| 1:27 | 1.153 | 1.129 | 1.076 | 1.152 | 1.125 | 1.361 | 1.010 | 1.056 |
| 1:81 | 1.121 | 1.241 | 1.153 | 1.315 | 1.241 | 1.198 | 1.121 | 1.206 |
| 1:243 | 1.261 | 1.236 | 1.047 | 1.266 | 1.333 | 1.335 | 1.231 | 1.235 |
| 1:729 | 1.063 | 1.077 | 1.085 | 1.337 | 1.210 | 1.323 | 1.157 | 1.287 |
| 0 | 1.0476 | 0.9808 | 0.9131 | 1.0762 | 1.067 | 1.074 | 1.032 | 0.966 |

Receptor: CTLA4-mFc 0.3 µg/ml
Secondary antibody: Goat anti-Mouse IgG, HRP Conjugate (1:5000)

| EC50 (nM) | 2.758 | 1.797 | 2.197 | 2.256 |
|---|---|---|---|---|

3.4 The binding activity of antibodies BiAb001, BiAb002, BiAb003, and BiAb004 to antigen PD-1 by competition ELISA against PDL1 (Refer to methods described in 2.2 of the present Example)

Figure 35:
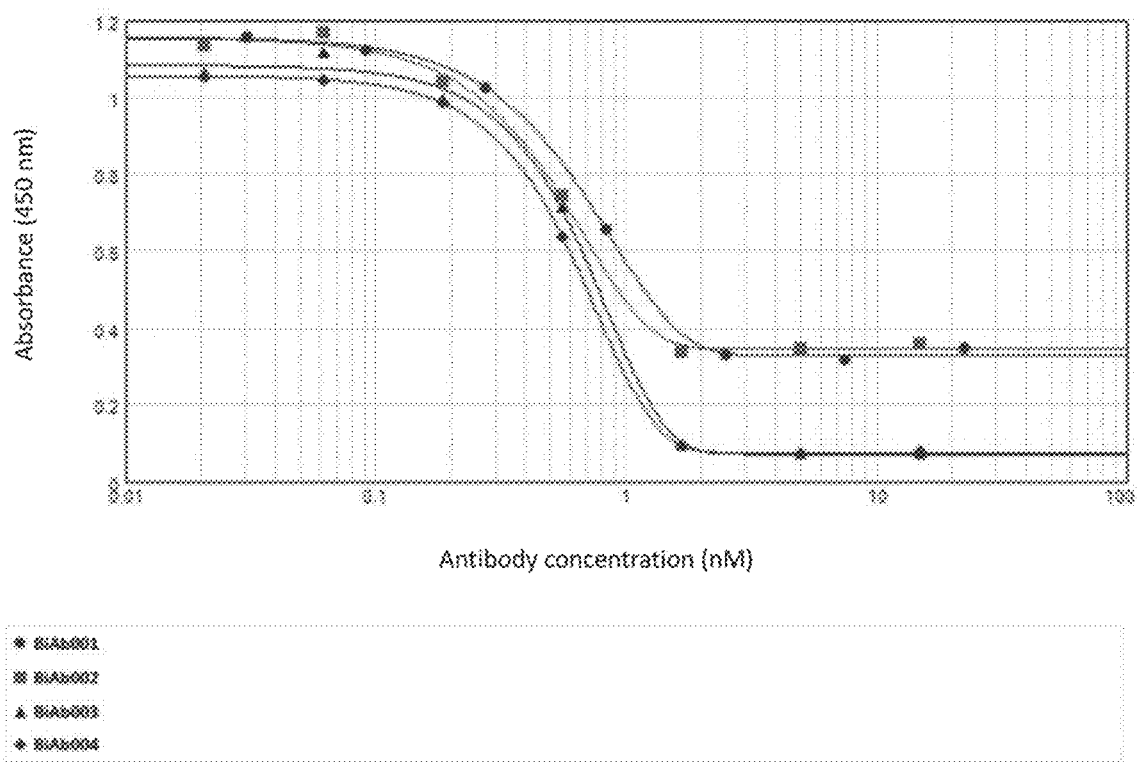
FIG. 35. Competition ELISA results of BiAb001, BiAb002, BiAb003, and BiAb004 binding to PD-1 against PDL1.

The binding results were shown in FIG. 35. Evidently, the antibodies BiAb001, BiAb002, BiAb003, and BiAb004 can effectively bind antigen PD-1 and inhibit PD-1 binding to PDL1 with dose-dependency. The absorbance intensities at different doses were shown in Table 10. Through Curve Simulation using quantitative analyses of absorbance values, EC50 of antibodies BiAb001, BiAb002, BiAb003 and BiAb004 to CTLA4 were then determined as shown in Table 10 below.

TABLE 10

The binding activity of antibodies to PD-1 by competition ELISA against PDL1.

| Antibody concentration | Coating antigen: PD-1-hFc 0.5 µg/ml | | | | | | | |
|---|---|---|---|---|---|---|---|---|
| | BiAb001 | | BiAb002 | | BiAb003 | | BiAb004 | |
| 3 µg/ml | 0.347 | 0.348 | 0.369 | 0.353 | 0.074 | 0.075 | 0.078 | 0.075 |
| 1:3 | 0.314 | 0.326 | 0.348 | 0.350 | 0.071 | 0.081 | 0.073 | 0.074 |
| 1:9 | 0.332 | 0.330 | 0.340 | 0.340 | 0.095 | 0.095 | 0.093 | 0.095 |
| 1:27 | 0.542 | 0.775 | 0.758 | 0.733 | 0.695 | 0.737 | 0.639 | 0.643 |
| 1:81 | 1.041 | 1.009 | 1.018 | 1.063 | 0.983 | 1.010 | 0.954 | 1.019 |
| 1:243 | 1.131 | 1.117 | 1.149 | 1.186 | 1.070 | 1.165 | 1.009 | 1.082 |
| 1:729 | 1.186 | 1.129 | 1.072 | 1.199 | 1.093 | 1.029 | 1.032 | 1.080 |
| 0 | 1.2345 | 1.1091 | 1.1243 | 1.1759 | 1.101 | 1.140 | 1.178 | 1.153 |

Receptor: PDL1-mFc 0.3 µg/ml
Secondary antibody: Goat anti-human IgG, HRP (1:5000)

| EC50 (nM) | 0.685 | 0.543 | 0.665 | 0.62 |
|---|---|---|---|---|

Example 10: The Binding Activity of Antibodies to Cell Surface Antigen by Flow Cytometry Method Host cells 293T expressing CTLA4 or PD-1 antigens were constructed respectively, and labeled with the humanized antibodies prepared in the present invention. The ability of the antibodies to bind specifically to corresponding cell surface antigens in its native conformation was analyzed and validated by flow cytometry.

1. Construction of 293T Host Cell Expressing CTLA4 or PD-1

293T cells were transfected with the CTLA4-containing plasmid pLenti6.3-CTLA4 or PD-1-containing plasmid pLenti6.3-PD-1 (vector pLenti6.3 was purchased from Invitrogen Corporation) and screened to obtain the stable pools of 293T-CTLA4 or 293T-PD-1 expressing CTLA4 or PD-1, respectively.

2. Antibody binding to cell surface antigens

The host cells obtained above that express individual antigen were digested by using trypsin, and distributed into tubes each containing $2 \times 10^5$ cells. Antibodies were diluted in gradient using PBSA buffer (1% BSA) and incubated with 293T cells that express corresponding antigens on ice for 2 h. 100 µL of FITC-labeled goat anti-human IgG (1:500) was added into each tube and incubated on ice for 1 h. After being washed with PBS for 3 times, cells were re-suspended in 300 µL of PBS, and fluorescence signals were measured on the flow cytometer using the FITC channel.

2.1 Binding activity of antibodies to cell surface antigens

Figure 36:
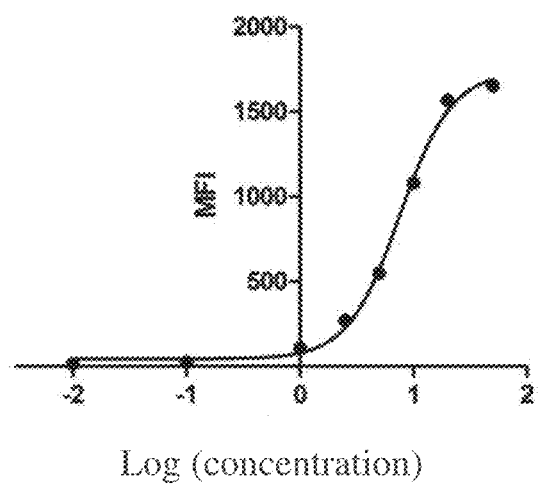
FIG. 36. EC50 of 4G10H1L1 binding to CTLA4 on the Surface of 293T-CTLA4 Cells.
Figure 37:
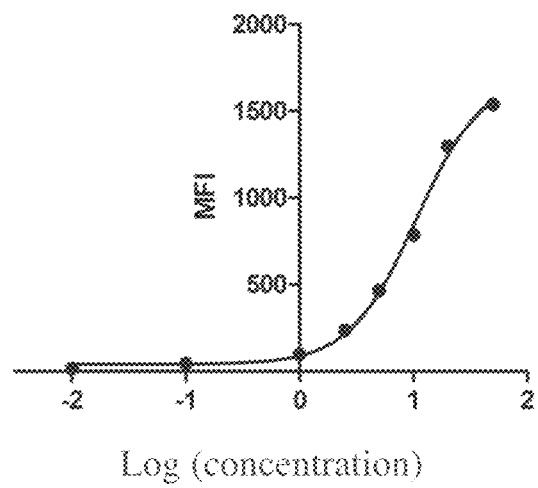
FIG. 37. EC50 of 4G10H3L3 binding to CTLA4 on the Surface of 293T-CTLA4 Cells.

The binding results of humanized antibodies 4G10H1L1 and 4G10H3L3 to 293T-CTLA4 cells were shown in FIG. 36 and FIG. 37. As shown in the figure, the antibodies 4G10H1L1 and 4G10H3L3 can effectively bind to target protein CTLA4 expressed on the surface of host cells 293T-CTLA4 with dose-dependency. The fluorescence intensities at different doses were shown in Table 11. Through Curve Simulation using quantitative analyses of absorbance values, EC50 of 4G10H1L1 and 4G10H3L3 binding to CTLA4 were determined to be 7.58 nM and 10.54 nM, respectively.

TABLE 11

The fluorescence intensities of antibodies 4G10H1L1 and 4G10H3L3 binding to CTLA4 expressed on 293T-CTLA4 cell surface by Flow Cytometry

| Antibody concentration (nM) | 4G10H1L1 | 4G10H2L2 |
|---|---|---|
| | fluorescence intensity | |
| 0.01 | 14.93 | 15.13 |
| 0.1 | 24.79 | 47.05 |
| 1 | 106.77 | 97.27 |
| 2.5 | 272.24 | 236.66 |
| 5 | 547.76 | 465.54 |
| 10 | 1080.91 | 788 |
| 20 | 1568.19 | 1296.95 |
| 50 | 1652.26 | 1539.24 |

Figure 38:
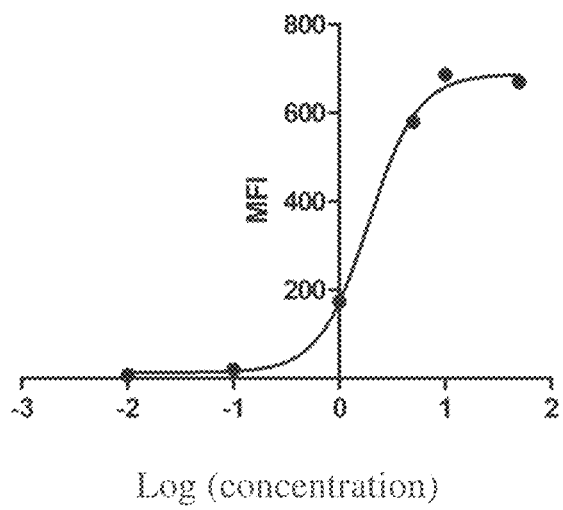
FIG. 38. EC50 of 14C12H1L1 binding to PD-1 on the Surface of 293T-PD-1 Cells.
Figure 39:
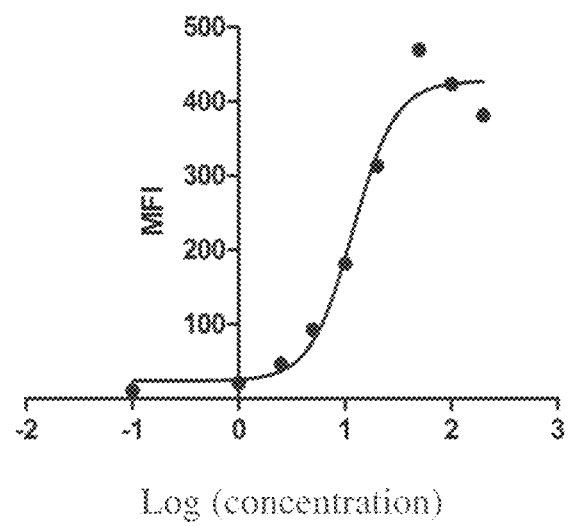
FIG. 39. EC50 of BiAb001 binding to CTLA4 on the Surface of 293T-CTLA4 Cells.
Figure 40:
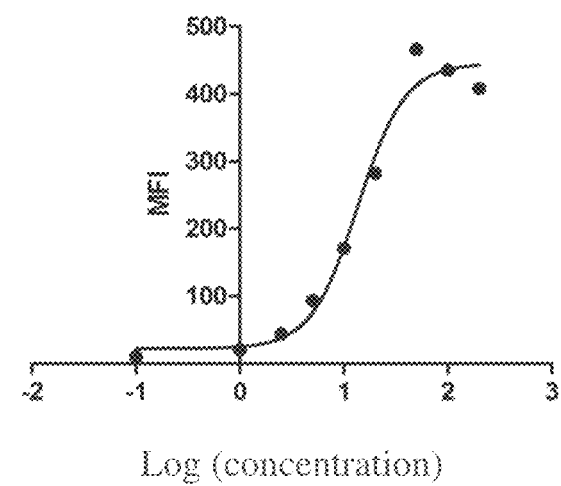
FIG. 40. EC50 of BiAb002 binding to CTLA4 on the Surface of 293T-CTLA4 Cells.
Figure 41:
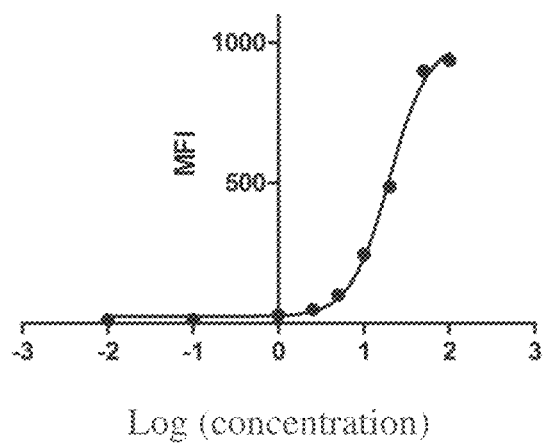
FIG. 41. EC50 of BiAb003 binding to CTLA4 on the Surface of 293T-CTLA4 Cells.
Figure 42:
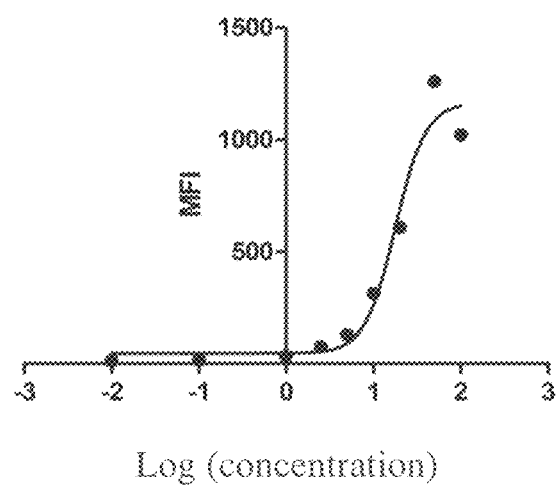
FIG. 42. EC50 of BiAb004 binding to CTLA4 on the Surface of 293T-CTLA4 Cells.
Figure 43:
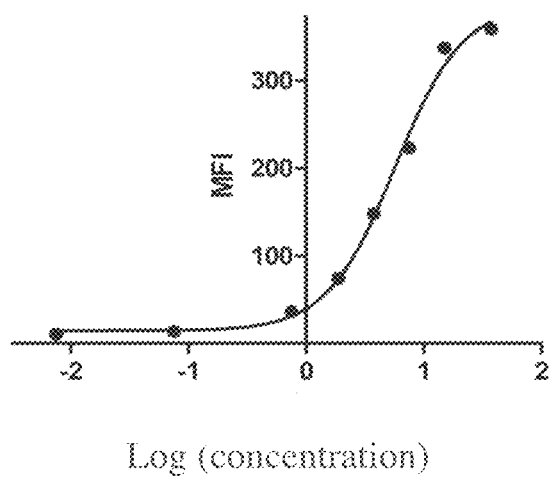
FIG. 43. EC50 of BiAb001 binding to PD-1 on the Surface of 293T-PD-1 Cells.
Figure 44:
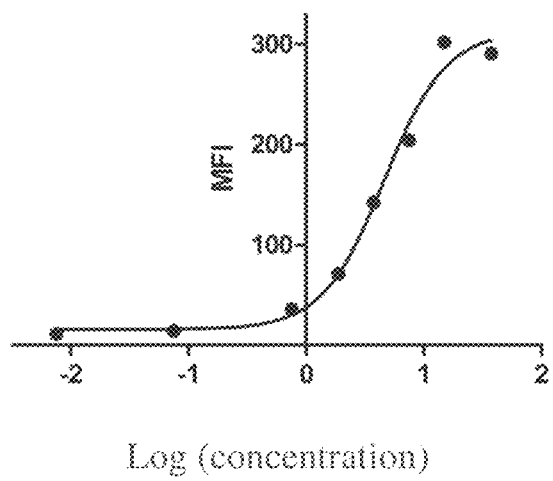
FIG. 44. EC50 of BiAb002 binding to PD-1 on the Surface of 293T-PD-1 Cells.
Figure 45:
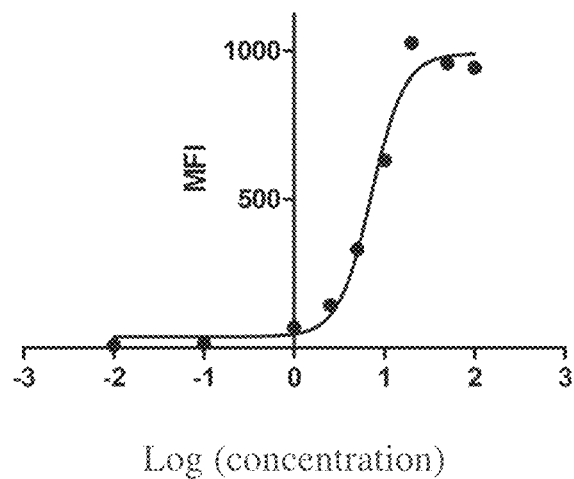
FIG. 45. EC50 of BiAb003 binding to PD-1 on the Surface of 293T-PD-1 Cells.
Figure 46:
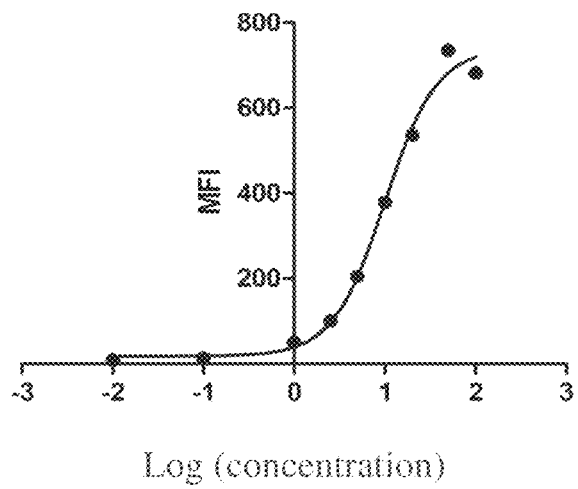
FIG. 46. EC50 of BiAb004 binding to PD-1 on the Surface of 293T-PD-1 Cells.

2.2 The binding results of humanized antibody 14C12H1L1 to 293T-PD-1 cells were shown in FIG. 38. As shown in the figure, the antibody 14C12H1L1 can effectively bind to target protein PD-1 expressed on the surface of host cells 293T-PD-1 with dose-dependency. The fluorescence intensities at different doses were shown in Table 12. Through Curve Simulation using quantitative analyses of fluorescence intensity, $EC_{50}$ of 14C12H1L1 binding to PD-1 was determined to be 1.89 nM.

TABLE 12

The fluorescence intensity of antibody 14C12H1L1 binding to PD-1 expressed on 293T-PD-1 cell surface by Flow Cytometry.

| | Antibody concentration (nM) | | | | | |
|---|---|---|---|---|---|---|
| | 0.01 | 0.1 | 1 | 5 | 10 | 50 |
| fluorescence intensity | 8.32 | 20.31 | 174.62 | 579.41 | 686.49 | 669.54 |

2.3 The binding results of the antibodies BiAb001, BiAb002, BiAb003, and BiAb004 to 293T-CTLA4 cells were shown in FIGS. 39-42. As shown in the figures, the antibodies BiAb001, BiAb002, BiAb003, and BiAb004 can effectively bind to target protein CTLA4 expressed on the surface of host cell 293T-CTLA4 with dose-dependency. The fluorescence intensities at different doses were shown in Table 13. Through Curve Simulation using quantitative analyses of fluorescence intensities, $EC_{50}$ of BiAb001, BiAb002, BiAb003, and BiAb004 were determined as shown in Table 13 below.

TABLE 13

The fluorescence intensities and $EC_{50}$ of the antibodies BiAb001, BiAb002, BiAb003, and BiAb004 binding to CTLA4 expressed on 293T-CTLA4 cell surface by Flow Cytometry

| Antibody concentration (nM) | BIAb001 | BIAb002 | BIAb003 | BIAb004 |
|---|---|---|---|---|
| | | MFI (fluorescence intensity) | | |
| 0.0 | — | — | 12.9 | 13.0 |
| 0.1 | 10.5 | 10.5 | 14.2 | 15.6 |
| 1.0 | 21.2 | 20.4 | 28.7 | 34.8 |
| 2.5 | 46.8 | 43.8 | 49.6 | 77.4 |
| 5.0 | 92.9 | 93.5 | 101.0 | 129.6 |
| 10.0 | 181.9 | 171.2 | 245.3 | 313.0 |
| 20.0 | 312.8 | 282.1 | 487.4 | 608.6 |
| 50.0 | 469.5 | 466.5 | 899.8 | 1260.8 |
| 100.0 | 423.0 | 435.3 | 937.5 | 1020.6 |
| 200.0 | 381.6 | 408.2 | — | — |
| EC50 (nM) | 11.9 | 13.7 | 19.9 | 17.8 |

2.4 The binding results of the antibodies BiAb001, BiAb002, BiAb003, and BiAb004 to 293T-PD-1 cells are shown in FIGS. 43-46. Evidently, the antibodies BiAb001, BiAb002, BiAb003, and BiAb004 can effectively bind to PD-1 expressed on the surface of host cell 293T-PD-1 with dose-dependency. The fluorescence intensities at different doses were shown in Table 14. Through Curve Simulation using quantitative analyses of absorbance values, EC50 of BiAb001, BiAb002, BiAb003, and BiAb004 were determined as shown in Table 14 below.

TABLE 14

The fluorescence intensities of the antibodies BiAb001, BiAb002, BiAb003, and BiAb004 binding to PD-1 expressed on 293T-PD-1 cell surface by Flow Cytometry

| Antibody concentration/nM | BIAb001 MFI (fluorescence intensity) | BIAb002 | Antibody concentration/nM | BIAb003 MFI (fluorescence intensity) | BIAb004 |
|---|---|---|---|---|---|
| 0.01 | 10.18 | 11 | 0.01 | 8.56 | 8.89 |
| 0.08 | 13.92 | 14.09 | 0.1 | 14.57 | 13.46 |
| 0.75 | 36.44 | 36.11 | 1 | 70.76 | 50.8 |
| 1.88 | 74.27 | 70.97 | 2.5 | 143.24 | 100.83 |
| 3.75 | 148.28 | 142.37 | 5 | 332.5 | 204.83 |
| 7.5 | 223.29 | 204.22 | 10 | 632.57 | 378.31 |
| 15 | 337.03 | 302.05 | 20 | 1026.03 | 535.69 |
| 37.5 | 358.78 | 290.92 | 50 | 958.92 | 734.73 |
| | | | 100 | 943.77 | 682.25 |
| EC50 (nM) | 5.69 | 4.61 | | 7.18 | 10 |

3. The binding activity of antibodies to T cell surface antigens CTLA4 and PD-1 PBMC was isolated by Ficoll-Paque Plus (GE Healthcare LOT No.:171440-02), and further isolated to get CD4+ cells, and then cells were stimulated with PHA for three days and then cells were washed once with PBS and mixed with antibodies at different concentrations, and then incubated on ice for 1.5 h. The cells were then washed with PBS once after incubation, and the FITC-labeled anti-human IgG (Jackson immunoresearch lot. 102155). Then the cells were incubated on ice in the dark for 1 h, washed with PBS for once, and then the fluorescence signals were measured on the flow cytometer.

The control anti-PD-1 antibody Nivolumab is commercially available, and its information could also be found in http://www.drugbank.ca/drugs/DB09035;

The control anti-CTLA4 antibody Ipilimumab is commercially available, and its information can be found in http://www.drugbank.ca/drugs/DB06186.

Figure 47:
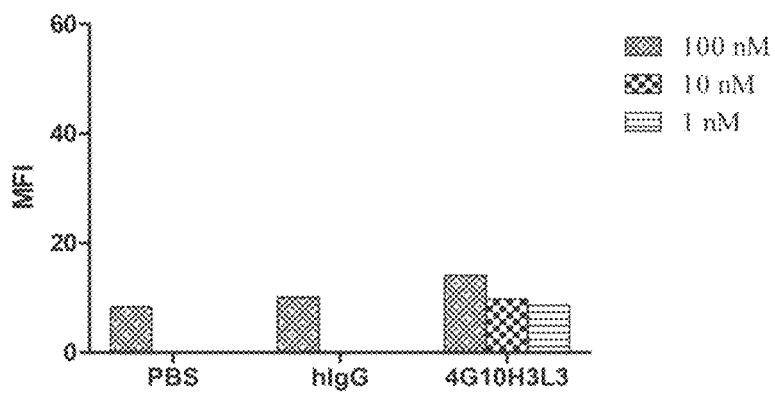
FIG. 47. Binding activity of 4G10H3L3 to T Cell Surface Antigen CTLA4.

3.1 The binding results of humanized antibody 4G10H3L3 to T cells were shown in FIG. 47. As shown in figure, the antibody 4G10H3L3 can effectively bind to the target protein CTLA4 expressed on the surface of T cells with dose-dependency.

Figure 48:
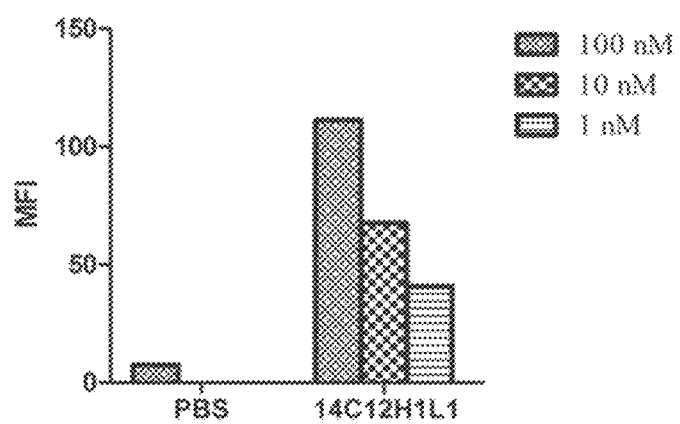
FIG. 48. Binding activity of 14C12H1L1 to T Cell Surface Antigen PD-1.

3.2 The binding results of humanized antibody 14C12H1L1 to T cells were shown in FIG. 48. As shown in figure, the antibody 14C12H1L1 can effectively bind to the target PD-1 expressed on the surface of T cells with dose-dependency.

Figure 49:
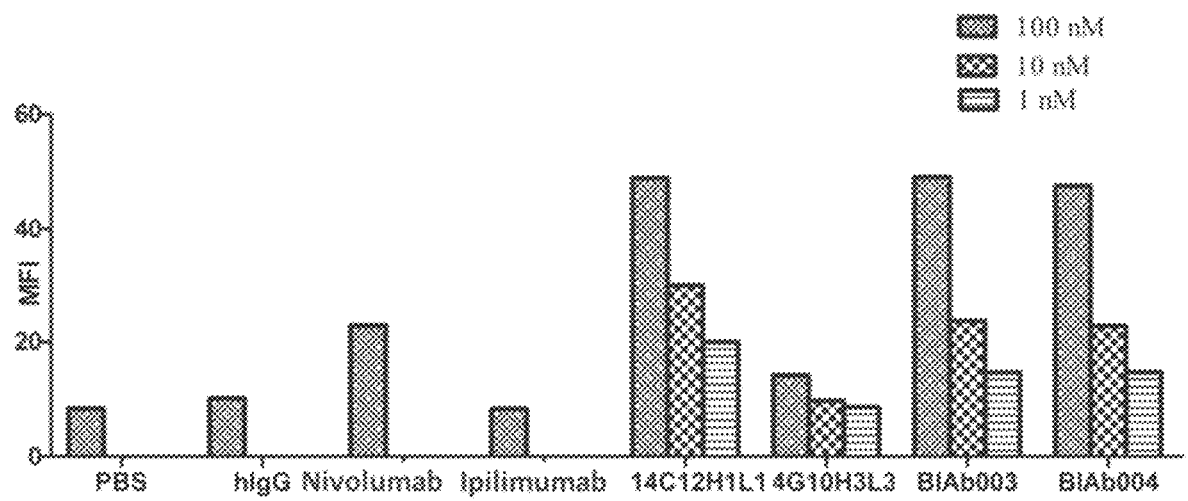
FIG. 49. Binding activity of BiAb003 and BiAb004 to T Cell Surface Antigens compared with those of 14C12H1L1 and 4G10H3L3.
Figure 50:
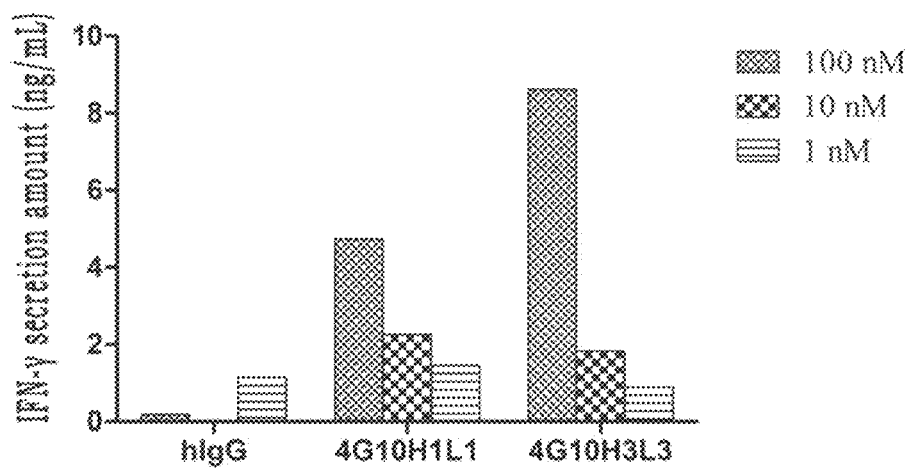
FIG. 50. Effects of 4G10H1L1 and 4G10H3L3 on IFN-γ Secretion of Mixed Lymphocytes.
Figure 51:
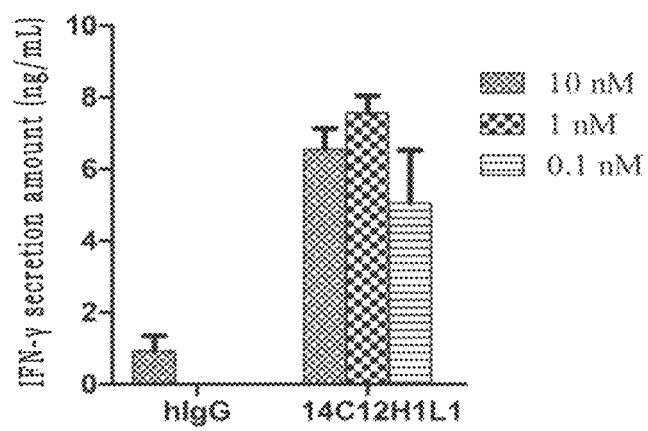
FIG. 51. Effect of 14C12H1L1 on IFN-γ Secretion of Mixed Lymphocytes.

3.3 The binding activity to T cells of the antibodies BiAb003 and BiAb004 compared with that of 14C12H1L1 and 4G10H3L3 were shown in FIG. 49. As shown in figure, the antibodies BiAb003, BiAb004, 14C12H1L1, and 4G10H3L3 can effectively bind to the target protein PD-1 expressed on the surface of T cells with dose-dependency. Furthermore, the binding activity of the antibodies BiAb003, BiAb004, and 14C12H1L1 to T cells were stronger than those of the antibodies 4G10H3L3, Nivolumab, and Ipilimumab. The fluorescence intensity was shown in Table 15.

TABLE 15

The fluorescence intensities of the antibodies 14C12H1L1, 4G10H3L3, BiAb003, and BiAb004 binding to T cells

| Antibody concentration/nM Name of antibody | 100 | 10 | 1 |
|---|---|---|---|
| | MFI (fluorescence intensity) | | |
| PBS | 8.39 | — | — |
| hIgG | 10.15 | — | — |
| Nivolumab | 22.88 | — | — |
| Ipilimumab | 8.35 | — | — |
| 14C12H1L1 | 48.94 | 29.93 | 19.97 |
| 4G10H3L3 | 14.11 | 9.78 | 8.62 |
| BIAb003 | 49.09 | 23.67 | 14.65 |
| BIAb004 | 47.54 | 22.85 | 14.66 |

Example 11: Mixed Lymphocyte Reaction: Secretion of Cytokine IFN-γ and IL-2

PBMC was isolated by Ficoll-Paque Plus (GE Healthcare LOT No.: 171440-02), then mixed with IL-4 (Peprotech K2513, 1000 U/ml) and GM-CSF (Peprotech H1513, 1000 U/ml) to induce for 6 days, and then TNF-α (Peprotech G1513, 200 U/ml) was added to induce for 3 days to obtain DC cells.

T cells were isolated from PBMC and mixed with the DC cells ousedbtained above in the ratio of 1:10 to culture together with each antibody (hIgG wa as control) in different ratios for 5-6 days. The secretions of IFN-γ or IL-2 were measured with ELISA reagent kits (both purchased from Dakewe), respectively.

Figure 55:
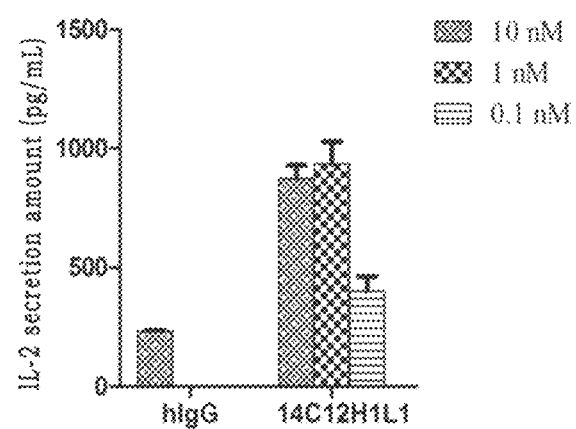
FIG. 55. Effect of 14C12H1L1 on IL-2 Secretion of Mixed Lymphocytes.
Figure 56:
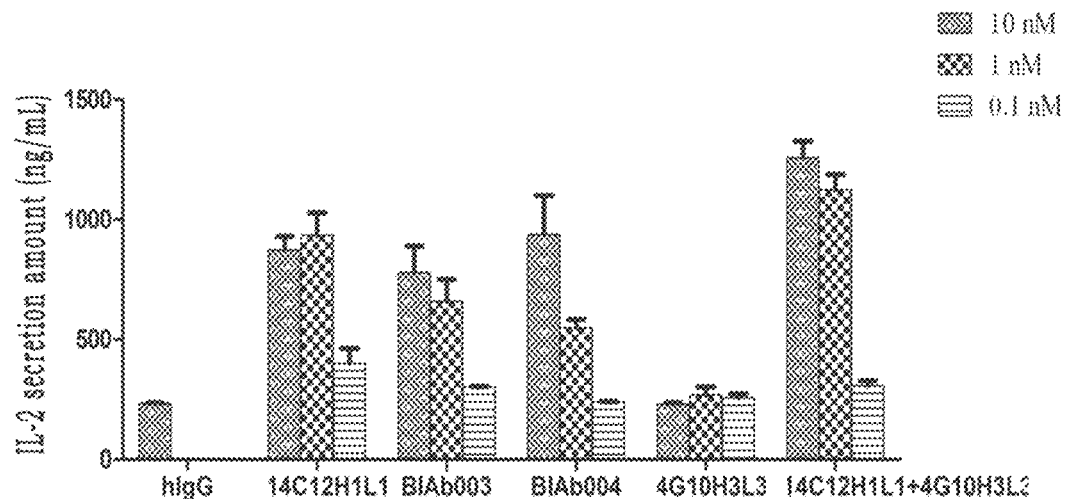
FIG. 56. Effects of BiAb003 and BiAb004 on IL-2 Secretion of Mixed Lymphocytes compared with those of 14C12H1L1 and 4G10H3L3.

The secretions of IFN-γ after mixed culture of DC cells and T cells were shown in FIGS. 50-FIG. 53. The secretions of IL-2 after mixed culture of DC cells and T cells were shown in FIGS. 54-56.

Figure 52:
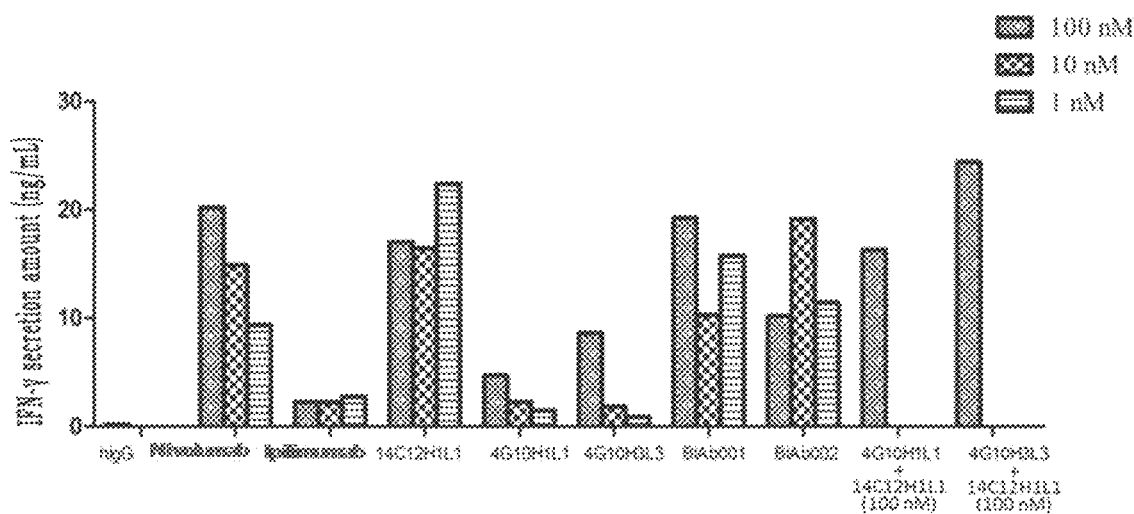
FIG. 52. Effects of BiAb001 and BiAb002 on IFN-γ Secretion of Mixed Lymphocytes compared with those of 14C12H1L1 and 4G10H1L1.

As shown in figures, the antibodies 4G10H1L1, 4G10H3L3, and 14C12H1L1, as well as bispecific antibodies BiAb001, BiAb002, BiAb003, and BiAb004 all can effectively induce the secretion of IFN-γ and IL-2 in mixed lymphocytes. The IFN-γ secretion induced by 1 nM or 10 nM anti-PD-1 antibody 14C12H1L1 were comparable with that of 100 nM control antibody Nivolumab. The IFN-γ secretion induced by 100 nM anti-CTLA4 antibodies 4G10H1L1 and 4G10H3L3 were better than that of 100 nM control antibody Ipilimumab (FIG. 52).

Example 12: Induced IL-2 Secretion

The isolated PBMCs (the same method as in Example) was stimulated with PHA (Shanghai Shenqi Biotech Co., Ltd, 50 μl/ml) for 3 days, and then PBMCs (from volunteer blood donors, 5×10$^4$ cells/well) mixed with Raji cells (from ATCC, 5×10$^4$ cells/well) and MDA-MB-231 cells (from ATCC, 1×10$^4$ cells/well) in a 96-well plate. Antibodies (100 nM) were added and mixed and cultured together. After co-culture for 3 days, secretion of IL-2 was measured with ELISA reagent kit (purchased from Dakewe) according to the instructions.

Figure 57:
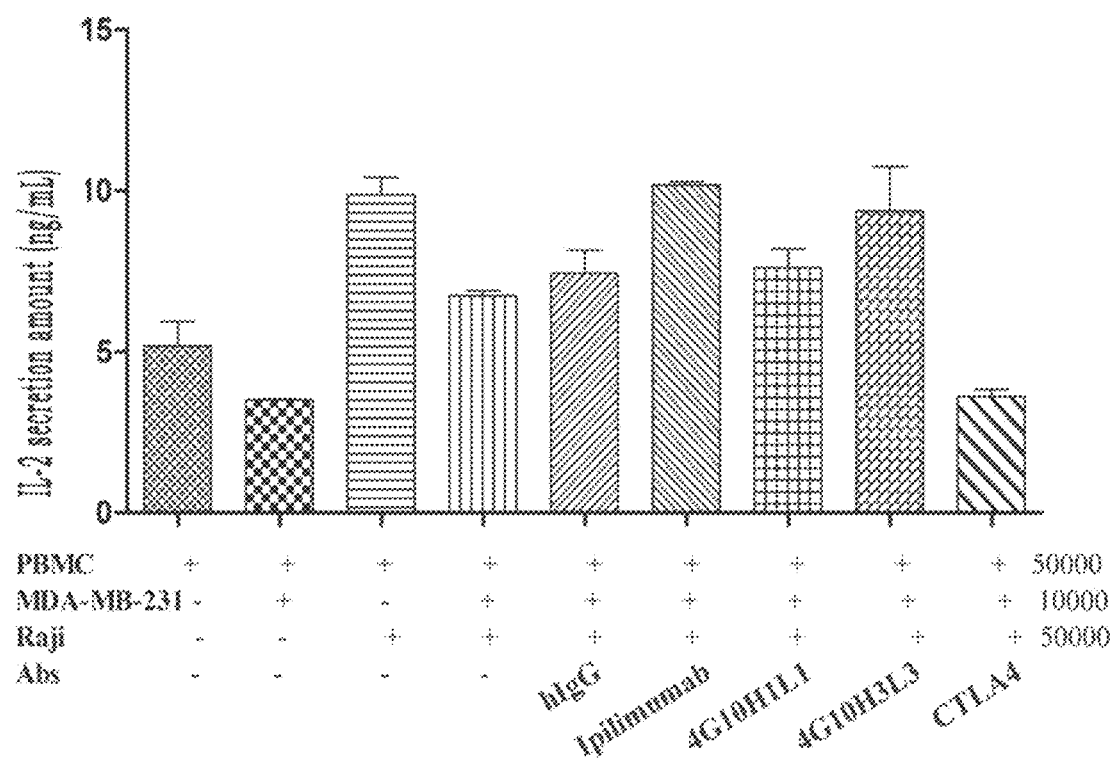
FIG. 57. Effects of 4G10H1L1 and 4G10H3L3 on IL-2 Secretion induced by co-culturing of PBMC, MDA-MB-231 and Raji cells.
Figure 58:
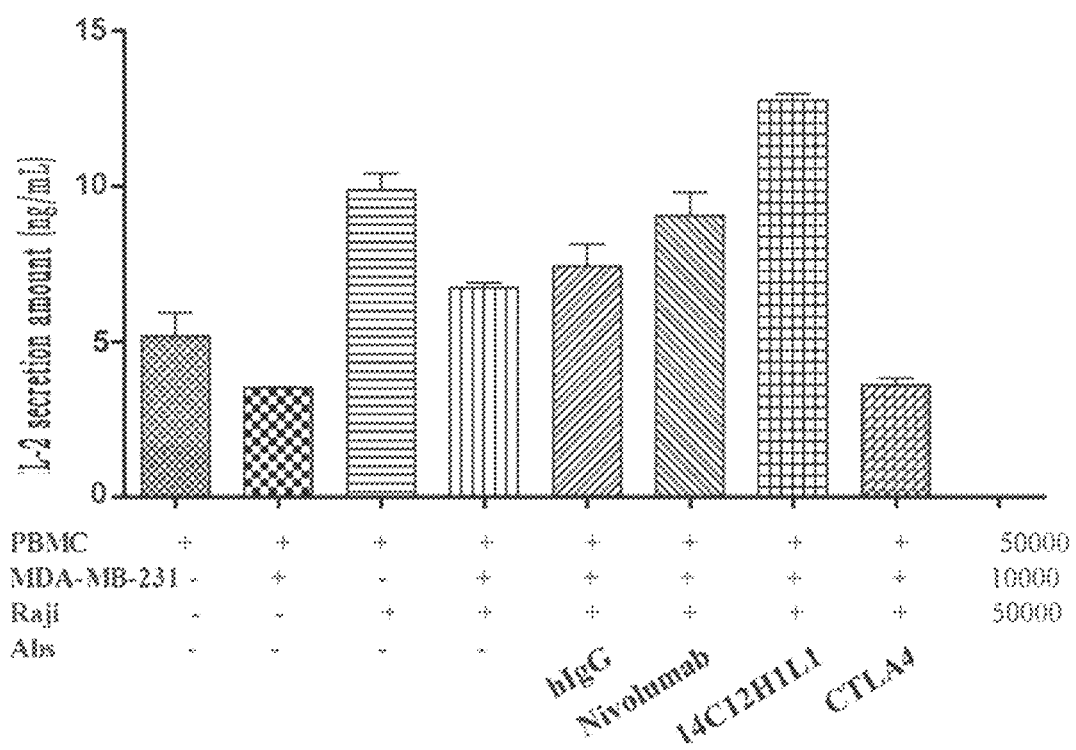
FIG. 58. Effect of 14C12H1L1 on IL-2 Secretion induced by co-culturing of PBMC, MDA-MB-231 and Raji cells.
Figure 59:
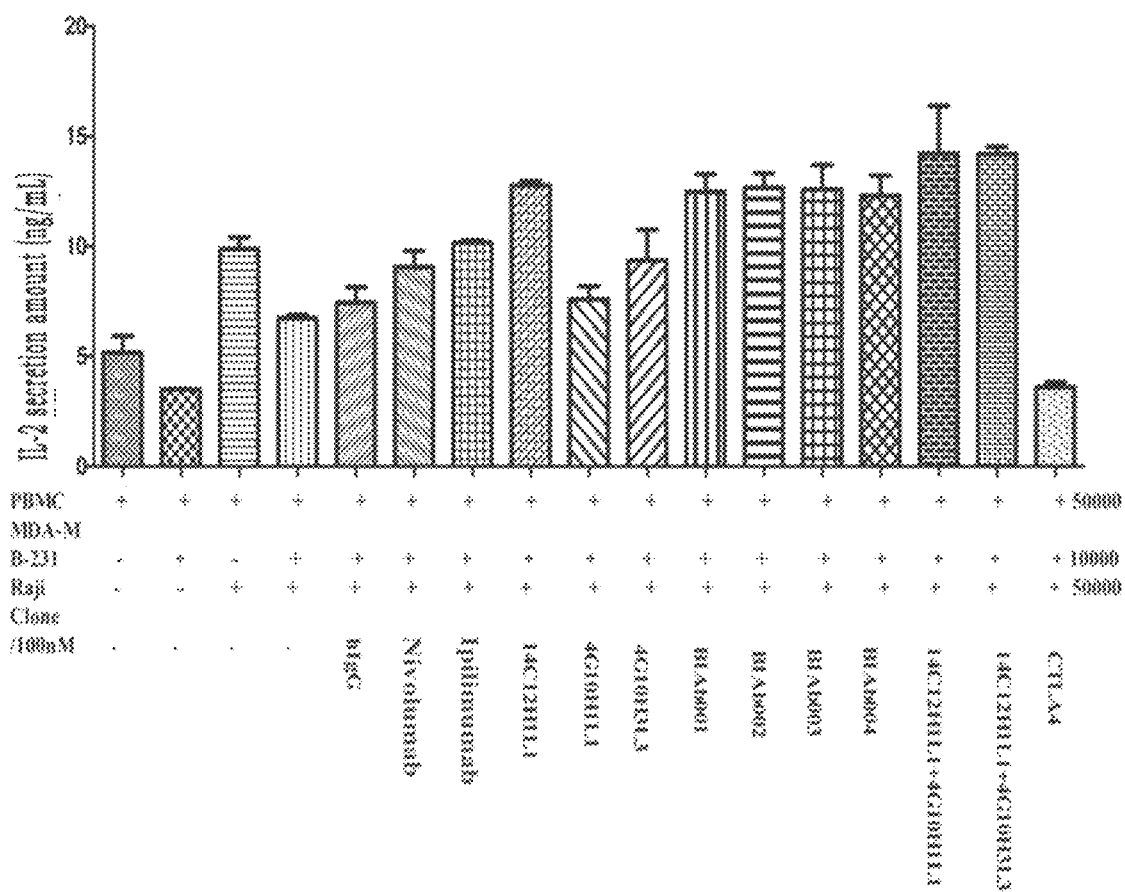
FIG. 59. Effect of BiAb001, BiAb002, BiAb003, and BiAb004 on IL-2 Secretion induced by co-culturing of PBMC, MDA-MB-231 and Raji cells, compared with those of 4G10H1L1, 4G10H3L3, and 14C12H1L1.

The IL-2 secretion after mixed cell culture was shown in FIG. 57, FIG. 58, and FIG. 59, respectively. As shown in the figures, the antibodies 4G10H1L1, 4G10H3L3, and 14C12H1L1, as well as bispecific antibodies BiAb001, BiAb002, BiAb003, and BiAb004 can effectively induce the secretion of IL-2 by PBMCs. The anti-PD-1 antibody 14C12H1L1 can induce a higher IL-2 secretion than the control antibody Nivolumab (FIG. 58), and bispecific antibodies BiAb001, BiAb002, BiAb003, and BiAb004 have the same effects on IL-2 secretion as 14C, 12H1L1+4G10H1L1 or 14C12H1L1+4G10H3L3 (FIG. 59).

Example 13: Impact of Antibody BiAb004 on the Tumor Growth of MC38 Tumor Model in PD-1 HuGEMM Mice MC38 tumor cells were inoculated subcutaneously on the right side of PD-1 HuGEMM mice (1×10$^6$ cells/mouse, human PD-1 transgenic mice). When the mean tumor volume reached approximately 144 mm$^3$, the mice were randomly divided into 4 experimental groups per tumor volume with 8 mice in each group. Antibodies were given through abdominal administration, the specific grouping and dosages were as follows:

Isotype Control group (dose: 2.67 mg/kg),
BiAb004 high-dose group (dose: 2.67 mg/kg),
BiAb004 low-dose group (dose: 0.267 mg/kg), The above 3 groups were injected with antibodies twice weekly, 5 times in total. After injection, the tumor sizes were measured twice weekly.

Figure 60:
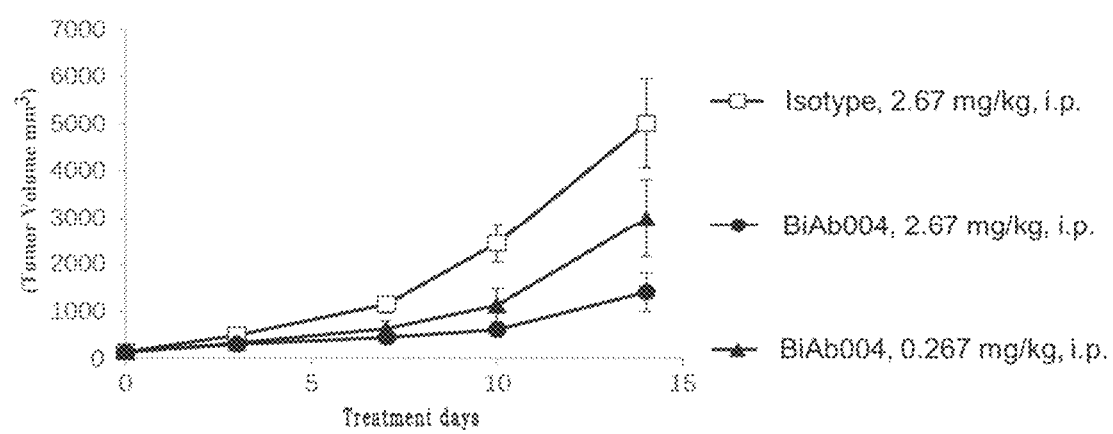
FIG. 60. Effect of BiAb004 on the Tumor Growth of MC38 Tumor Model in PD-1 HuGEMM Mice.

The results were presented in FIG. 60. Evidently:

The tumor sizes in the BiAb004 high-dose, and BiAb004 low-dose groups were all significantly smaller than those in the Isotype control group statistically (P<0.001, P<respectively). BiAb004 low-dose groups showed a statistically significant antitumor effect on the MC38 tumor model in the PD-1 HuGEMM mice.

Although specific embodiments of the present invention have been described in detail, as will be appreciated by one skilled in the art, these details may incur various modifications and substitutions according to all the teachings we have disclosed. These changes are all covered by the scope of the present invention. The full scope of the present invention is given by the appended claims and any equivalents.

The invention claimed is:

1. A bispecific antibody, comprising:
an immunoglobulin comprising a heavy chain and a light chain,
wherein the heavy chain comprises a first heavy chain variable region comprising heavy chain complementarity determining region (HCDR) 1 of SEQ ID NO: 29, HCDR2 of SEQ ID NO: 30, and HCDR3 of SEQ ID NO: 31, and a heavy chain constant region,
wherein the light chain comprises a first light chain variable region comprising light chain complementarity determining region (LCDR) 1 of SEQ ID NO: 32, LCDR2 of SEQ ID NO: 33, and LCDR3 of SEQ ID NO:34, and a light chain constant region,
wherein a C-terminus of the heavy chain is attached to at least one single-chain antibody via a first linker fragment,
wherein the at least one single-chain antibody comprises,
(i) a second heavy chain variable region comprising HCDR1 of SEQ ID NO: 35, HCDR2 of SEQ ID NO: 36, and HCDR3 of SEQ ID NO: 37, and a second light chain variable region comprising LCDR1 of SEQ ID NO: 38, LCDR2 of SEQ ID NO: 39, and LCDR3 of SEQ ID NO: 40;
(ii) a second heavy chain variable region comprising HCDR1 of SEQ ID NO: 35, HCDR2 of SEQ ID NO: 41, and HCDR3 of SEQ ID NO: 37, and a second light chain variable region comprising LCDR1 of SEQ ID NO: 38, LCDR2 of SEQ ID NO: 39, and LCDR3 of SEQ ID NO: 40; or
(iii) a second heavy chain variable region comprising HCDR1 of SEQ ID NO: 42, HCDR2 of SEQ ID NO: 43, and HCDR3 of SEQ ID NO: 44, and a second light chain variable region comprising LCDR1 of SEQ ID NO: 45, LCDR2 of SEQ ID NO: 46, and LCDR3 of SEQ ID NO: 47.

2. The bispecific antibody of claim 1, wherein the at least one single-chain antibody comprises a second heavy chain variable region comprising HCDR1 of SEQ ID NO: 35, HCDR2 of SEQ ID NO: 36, and HCDR3 of SEQ ID NO: 37, and a second light chain variable region comprising LCDR1 of SEQ ID NO: 38, LCDR2 of SEQ ID NO: 39, and LCDR3 of SEQ ID NO: 40.

3. The bispecific antibody of claim 1, wherein the at least one single-chain antibody comprises a second heavy chain variable region comprising HCDR1 of SEQ ID NO: 35, HCDR2 of SEQ ID NO: 41, and HCDR3 of SEQ ID NO: 37, and a second light chain variable region comprising LCDR1 of SEQ ID NO: 38, LCDR2 of SEQ ID NO: 39, and LCDR3 of SEQ ID NO: 40.

4. The bispecific antibody of claim 1, wherein the at least one single-chain antibody comprises a second heavy chain variable region comprising HCDR1 of SEQ ID NO: 42, HCDR2 of SEQ ID NO: 43, and HCDR3 of SEQ ID NO: 44, and a second light chain variable region comprising LCDR1 of SEQ ID NO: 45, LCDR2 of SEQ ID NO: 46, and LCDR3 of SEQ ID NO: 47.

5. The bispecific antibody of claim 1, wherein the first linker fragment comprises SEQ ID NO: 23 or SEQ ID NO: 24.

6. The bispecific antibody of claim 1, wherein the second heavy chain variable region and the second light chain variable region are connected via a second linker fragment.

7. The bispecific antibody of claim 6, wherein the second linker fragment comprises SEQ ID NO: 24.

8. The bispecific antibody of claim 1, wherein the first heavy chain variable region comprises SEQ ID NO: 16 or SEQ ID NO: 20; and wherein the first light chain variable region comprises SEQ ID NO: 18 or SEQ ID NO: 22.

9. The bispecific antibody of claim 1, wherein the second heavy chain variable region comprises SEQ ID NO: 2, SEQ ID NO: 6, SEQ ID NO: 10, SEQ ID NO: 14, or SEQ ID NO: 25; and wherein the second light chain variable region comprises SEQ ID NO: 4, SEQ ID NO: 8, SEQ ID NO: 12, or SEQ ID NO: 27.

10. The bispecific antibody of claim 1,
wherein the first heavy chain variable region comprises SEQ ID NO: 20, and the first light chain variable region comprises SEQ ID NO: 22; and
wherein the second heavy chain variable region comprises SEQ ID NO: 6, and the second light chain variable region comprises SEQ ID NO: 8.

11. The bispecific antibody of claim 10,
wherein the first linker fragment comprises SEQ ID NO: 23 or SEQ ID NO: 24, and
wherein the second heavy chain variable region and the second light chain variable region are connected via a second linker fragment, wherein the second linker fragment comprises SEQ ID NO: 24.

12. The bispecific antibody of claim 1,
wherein the first heavy chain variable region comprises SEQ ID NO: 20, and the first light chain variable region comprises SEQ ID NO: 22; and
wherein the second heavy chain variable region comprises SEQ ID NO: 10, and the second light chain variable region comprises SEQ ID NO: 12.

13. The bispecific antibody of claim 12,
wherein the first linker fragment comprises SEQ ID NO: 23 or SEQ ID NO: 24, and
wherein the second heavy chain variable region and the second light chain variable region are connected via a second linker fragment, wherein the second linker fragment comprises SEQ ID NO: 24.

14. The bispecific antibody of claim 1,
wherein the first heavy chain variable region comprises SEQ ID NO: 20, and the first light chain variable region comprises SEQ ID NO: 22; and
wherein the second heavy chain variable region comprises SEQ ID NO: 14, and the second light chain variable region comprises SEQ ID NO: 12.

15. The bispecific antibody of claim 14,
wherein the first linker fragment comprises SEQ ID NO: 23 or SEQ ID NO: 24, and
wherein the second heavy chain variable region and the second light chain variable region are connected via a second linker fragment, wherein the second linker fragment comprises SEQ ID NO: 24.

16. The bispecific antibody of claim 1,
wherein the first heavy chain variable region comprises SEQ ID NO: 20, and the first light chain variable region comprises SEQ ID NO: 22; and
wherein the second heavy chain variable region comprises SEQ ID NO: 25, and the second light chain variable region comprises SEQ ID NO: 27.

17. The bispecific antibody of claim 16,
wherein the first linker fragment comprises SEQ ID NO: 23 or SEQ ID NO: 24, and
wherein the second heavy chain variable region and the second light chain variable region are connected via a second linker fragment, wherein the second linker fragment comprises SEQ ID NO: 24.

18. The bispecific antibody of claim 1,
wherein the first heavy chain variable region comprises SEQ ID NO: 16, and the first light chain variable region comprises SEQ ID NO: 18; and
wherein the second heavy chain variable region comprises SEQ ID NO: 2, and the second light chain variable region comprises SEQ ID NO: 4.

19. The bispecific antibody of claim 18,
wherein the first linker fragment comprises SEQ ID NO: 23 or SEQ ID NO: 24, and
wherein the second heavy chain variable region and the second light chain variable region are connected via a second linker fragment, wherein the second linker fragment comprises SEQ ID NO: 24.

20. A pharmaceutical composition comprising the bispecific antibody of claim 1 and a pharmaceutically acceptable carrier or excipient.

21. A method for treating cancer in a subject, the method comprises administering to the subject of the bispecific antibody of claim 1.

22. The method of claim 21, wherein the cancer is melanoma, renal cancer, prostate cancer, bladder cancer, colorectal cancer, gastrointestinal cancer, liver cancer, non-small cell lung cancer, ovarian cancer or leukemia.

* * * * *

SEQUENCE LISTING

```
Sequence total quantity: 47
SEQ ID NO: 1            moltype = DNA  length = 372
FEATURE                 Location/Qualifiers
misc_feature            1..372
                        note = Nucleic acid sequence of 4G10 heavy chain variable
                        region
source                  1..372
                        mol_type = other DNA
                        organism = synthetic construct
SEQUENCE: 1
caggtcaagc tgcaggagtc tggacctgag ctggtgaagc ctggagcttc aatgaagata   60
tcctgcaagg cttctggtta ctcattcact ggctacacca tgaactgggt gaagcagagc  120
catggaaaga accttgaatg gattggactt attaatcctt acaataatat tactaactac  180
aaccagaagt tcatgggcaa ggccacattt actgtagaca agtcatccag cacagcctac  240
atggaactcc tcagactgac atctgaagac tctggagtct atttctgtgc aagactcgac  300
tataggtctt attggggcca agggactctg gtcactgtct ctgcagccaa aacgacaccc  360
ccatctgtct at                                                      372

SEQ ID NO: 2            moltype = AA  length = 124
FEATURE                 Location/Qualifiers
REGION                  1..124
                        note = The amino acid sequence of 4G10 heavy chain variable
                        region
source                  1..124
                        mol_type = protein
                        organism = synthetic construct
SEQUENCE: 2
QVKLQESGPE LVKPGASMKI SCKASGYSFT GYTMNWVKQS HGKNLEWIGL INPYNNITNY   60
NQKFMGKATF TVDKSSSTAY MELLRLTSED SGVYFCARLD YRSYWGQGTL VTVSAAKTTP  120
PSVY                                                               124

SEQ ID NO: 3            moltype = DNA  length = 378
FEATURE                 Location/Qualifiers
misc_feature            1..378
                        note = Nucleic acid sequence of 4G10 light chain variable
```

```
                              region
source                        1..378
                              mol_type = other DNA
                              organism = synthetic construct
SEQUENCE: 3
caggctgttg tgactcagga atctgcactc accacatcac ctggtgaaac agtcacactc   60
acttgtcgct caagtactgg ggctgttaca actagtaact ttgccaactg ggtccaagaa  120
aaaccagatc atttattcac tagtctaata ggtggtacca caaccgagc tccaggtgtt  180
cctgccagat tctcaggctc cctgattgga gacaaggctg ccctcaccat cacagggca  240
cagactgagg atgaggcaat atatttctgt gctctatgct acagcaacca ttgggtgttc  300
ggtggaggaa ccaaactgac tgtcctaggc cagcccaagt cttcgccatc agtcaccctg  360
tttcaagggc aattctgc                                                378

SEQ ID NO: 4              moltype = AA  length = 126
FEATURE                   Location/Qualifiers
REGION                    1..126
                          note = The amino acid sequence of 4G10 light chain variable
                            region
source                    1..126
                          mol_type = protein
                          organism = synthetic construct
SEQUENCE: 4
QAVVTQESAL TTSPGETVTL TCRSSTGAVT TSNFANWVQE KPDHLFTSLI GGTNNRAPGV   60
PARFSGSLIG DKAALTITGA QTEDEAIYFC ALWYSNHWVF GGGTKLTVLG QPKSSPSVTL  120
FQGQFC                                                              126

SEQ ID NO: 5              moltype = DNA  length = 345
FEATURE                   Location/Qualifiers
misc_feature              1..345
                          note = Nucleic acid sequence of 4G10H1L1 heavy chain
                            variable region
source                    1..345
                          mol_type = other DNA
                          organism = synthetic construct
SEQUENCE: 5
caggtgcagc tggtggagtc tggggccgag ctggtgaagc ccggcgcctc catgaagatc   60
tcttgcaagg ccagcggata cagtttcact ggctatacca tgaactgggt caaacaggct  120
ccaggacagg gactggagtg gatcgggctg attaatcctt acaacaacat caccaactac  180
aaccagaagt tcatgggaaa agcaaccttt acagtggaca gagccatttc cacagcctac  240
atggaactga ccggctgac ttcagacgat agcggggtct attttgtgc aaggctggat  300
tatcgctctt actgggggca gggaactctg gtcactgtct ccgct                   345

SEQ ID NO: 6              moltype = AA  length = 115
FEATURE                   Location/Qualifiers
REGION                    1..115
                          note = The amino acid sequence of 4G10H1L1 heavy chain
                            variable region
source                    1..115
                          mol_type = protein
                          organism = synthetic construct
SEQUENCE: 6
QVQLVESGAE LVKPGASMKI SCKASGYSFT GYTMNWVKQA PGQGLEWIGL INPYNNITNY   60
NQKFMGKATF TVDKSISTAY MELSRLTSDD SGVYFCARLD YRSYWGQGTL VTVSA       115

SEQ ID NO: 7              moltype = DNA  length = 327
FEATURE                   Location/Qualifiers
misc_feature              1..327
                          note = Nucleic acid sequence of 4G10H1L1 light chain
                            variable region
source                    1..327
                          mol_type = other DNA
                          organism = synthetic construct
SEQUENCE: 7
caggctgtcg tcactcagga accttcactg actgtgagcc caggaggaac tgtcaccctg   60
acatgcggaa gctccaccgg agcagtgacc acatccaact cgccaattg ggtccaggaa  120
aagccaggcc aggcatttcg atccctgatc ggaggcacaa acaatcgggc ttcttgggtg  180
cccgcaagat tctcaggaag cctgctgggg ggaaaagccg ctctgaccat tagtggcgct  240
cagcctgagg acgaagccga gtacttctgc gctctgtggt atagcaacca ctgggtgttt  300
ggcgggggaa caaagctgac tgtgctg                                       327

SEQ ID NO: 8              moltype = AA  length = 109
FEATURE                   Location/Qualifiers
REGION                    1..109
                          note = The amino acid sequence of 4G10H1L1 light chain
                            variable region
source                    1..109
                          mol_type = protein
                          organism = synthetic construct
SEQUENCE: 8
```

```
QAVVTQEPSL TVSPGGTVTL TCGSSTGAVT TSNFANWVQE KPGQAFRSLI GGTNNRASWV   60
PARFSGSLLG GKAALTISGA QPEDEAEYFC ALWYSNHWVF GGGTKLTVL             109

SEQ ID NO: 9              moltype = DNA  length = 345
FEATURE                   Location/Qualifiers
misc_feature              1..345
                          note = Nucleic acid sequence of 4G10H3L3 heavy chain
                             variable region
source                    1..345
                          mol_type = other DNA
                          organism = synthetic construct
SEQUENCE: 9
caggtgcagc tggtcgagtc tgggcccgaa gtgaagaaac ccggcgcctc agtgaaggtc    60
agctgcaagg ccagcgggta cagtttcact ggatatacca tgaactgggt ccgacaggcc   120
cctggccagg gctggagtg gatcggcctg attaaccctt acaacaacat cactaactac   180
gcacagaagt tccaggggag agtgaccttt acagtggaca ccagcatttc cacagcctac   240
atggaactgt cccggctgag atctgacgat acaggcgtgt acttctgcgc taggctggat   300
taccgcagct attggggaca gggcacactg gtgactgtca gcgca                  345

SEQ ID NO: 10             moltype = AA  length = 115
FEATURE                   Location/Qualifiers
REGION                    1..115
                          note = The amino acid sequence of 4G10H3L3 heavy chain
                             variable region
source                    1..115
                          mol_type = protein
                          organism = synthetic construct
SEQUENCE: 10
QVQLVESGAE VKKPGASVKV SCKASGYSFT GYTMNWVRQA PGQGLEWIGL INPYNNITNY   60
AQKFQGRVTF TVDTSISTAY MELSRLRSDD TGVYFCARLD YRSYWGQGTL VTVSA       115

SEQ ID NO: 11             moltype = DNA  length = 327
FEATURE                   Location/Qualifiers
misc_feature              1..327
                          note = Nucleic acid sequence of 4G10H3L3 light chain
                             variable region
source                    1..327
                          mol_type = other DNA
                          organism = synthetic construct
SEQUENCE: 11
caggctgtcg tcactcagga accttcactg accgtgtctc ctggcgggac tgtcaccctg    60
acatgcggca gctccacagg ggccgtgacc acaagtaact ccccaaattg ggtccagcag   120
aagccaggac aggctcccg gagtctgatc ggaggcacca acaacaaggc cagctggaca   180
cccgcacggt tcagcggcag cctgctgggc ggcaaggccg ctctgacaat tagcggagcc   240
cagcctgagg acgaagccga gtactattgc gctctgtggt actccaacca ctgggtgttc   300
ggcggcggca ccaagctgac tgtgctg                                      327

SEQ ID NO: 12             moltype = AA  length = 109
FEATURE                   Location/Qualifiers
REGION                    1..109
                          note = The amino acid sequence of 4G10H3L3 light chain
                             variable region
source                    1..109
                          mol_type = protein
                          organism = synthetic construct
SEQUENCE: 12
QAVVTQEPSL TVSPGGTVTL TCGSSTGAVT TSNFPNWVQQ KPGQAPRSLI GGTNNKASWT   60
PARFSGSLLG GKAALTISGA QPEDEAEYYC ALWYSNHWVF GGGTKLTVL              109

SEQ ID NO: 13             moltype = DNA  length = 345
FEATURE                   Location/Qualifiers
misc_feature              1..345
                          note = Nucleic acid sequence of 4G10H4L3 heavy chain
                             variable region
source                    1..345
                          mol_type = other DNA
                          organism = synthetic construct
SEQUENCE: 13
caggtgcagc tggtcgagtc tgggcccgaa gtgaagaaac ccggcgcctc agtgaaggtc    60
agctgcaagg ccagcgggta cagtttcact ggatatacca tgaactgggt ccgacaggcc   120
cctggccagg gctggagtg gatcggcctg attaaccctt acaacgacat cactaactac   180
gcacagaagt tccaggggag agtgaccttt acagtggaca ccagcatttc cacagcctac   240
atggaactgt cccggctgag atctgacgat acaggcgtgt acttctgcgc taggctggat   300
taccgcagct attggggaca gggcacactg gtgactgtca gcgca                  345

SEQ ID NO: 14             moltype = AA  length = 115
FEATURE                   Location/Qualifiers
REGION                    1..115
                          note = The amino acid sequence of 4G10H4L3 heavy chain
```

```
                        variable region
source                  1..115
                        mol_type = protein
                        organism = synthetic construct
SEQUENCE: 14
QVQLVESGAE VKKPGASVKV SCKASGYSFT GYTMNWVRQA PGQGLEWIGL INPYNDITNY   60
AQKFQGRVTF TVDTSISTAY MELSRLRSDD TGVYFCARLD YRSYWGQGTL VTVSA       115

SEQ ID NO: 15           moltype = DNA   length = 354
FEATURE                 Location/Qualifiers
misc_feature            1..354
                        note = Nucleic acid sequence of 14C12 heavy chain variable
                        region
source                  1..354
                        mol_type = other DNA
                        organism = synthetic construct
SEQUENCE: 15
gaggtcaaac tggtggagag cggcggcggg ctggtgaagc ccggcgggtc actgaaactg   60
agctgcgccg cttccggctt cgcctttagc tcctacgaca tgtcatgggt gaggcagacc  120
cctgagaagc gcctggaatg ggtcgctact atcagcggag cgggcgata cacctactat   180
cctgactctg tcaaagggag attcacaatt agtcggata acgccagaaa tactctgtat   240
ctgcagatgt ctagtctgcg gtccgaggat acagctctgt actattgtgc aaaccggtac  300
ggcgaagcat ggtttgccta ttggggacag ggcaccctg tgacagtctc tgcc         354

SEQ ID NO: 16           moltype = AA   length = 118
FEATURE                 Location/Qualifiers
REGION                  1..118
                        note = The amino acid sequence of 14C12 heavy chain
                        variable region
source                  1..118
                        mol_type = protein
                        organism = synthetic construct
SEQUENCE: 16
EVKLVESGGG LVKPGGSLKL SCAASGFAFS SYDMSWVRQT PEKRLEWVAT ISGGGRYTYY   60
PDSVKGRFTI SRDNARNTLY LQMSSLRSED TALYYCANRY GEAWFAYWGQ GTLVTVSA    118

SEQ ID NO: 17           moltype = DNA   length = 318
FEATURE                 Location/Qualifiers
misc_feature            1..318
                        note = Nucleic acid sequence of 14C12 light chain variable
                        region
source                  1..318
                        mol_type = other DNA
                        organism = synthetic construct
SEQUENCE: 17
gacattaaga tgacacagtc cccttcctca atgtacgcta gcctgggcga gcgagtgacc   60
ttcacatgca agcatccca ggacatcaac acatacctga cttggtttca gcagaagcca   120
ggcaaaagcc ccaagaccct gatctaccgg gccaatagac tggtggacgg ggtccccagc  180
agattctccg gatctggcag tgggcaggat tactcctga ccatcagctc cctggagtat   240
gaagacatgg gcatctacta ttgcctgcag tatgatgagt ccctctctga ctttggagca  300
ggcacaaaac tggaactg                                               318

SEQ ID NO: 18           moltype = AA   length = 106
FEATURE                 Location/Qualifiers
REGION                  1..106
                        note = The amino acid sequence of 14C12 light chain
                        variable region
source                  1..106
                        mol_type = protein
                        organism = synthetic construct
SEQUENCE: 18
DIKMTQSPSS MYASLGERVT FTCKASQDIN TYLSWFQQKP GKSPKTLIYR ANRLVDGVPS   60
RFSGSGSGQD YSLTISSLEY EDMGIYYCLQ YDEFPLTFGA GTKLEL                 106

SEQ ID NO: 19           moltype = DNA   length = 354
FEATURE                 Location/Qualifiers
misc_feature            1..354
                        note = Nucleic acid sequence of 14C12H1L1 heavy chain
                        variable region
source                  1..354
                        mol_type = other DNA
                        organism = synthetic construct
SEQUENCE: 19
gaagtgcagc tggtcgagtc tggggaggg ctggtgcagc ccggcgggtc actgcgactg    60
agctgcgcag cttccggatt cgcctttagc tcctacgaca tgtcctgggt gcgacaggca  120
ccaggaaagg gactggattg ggtcgctact atctcaggag cgggagata cacctactat   180
cctgacagcg tcaaggggcg gttcacaatc tctagagata cagtaagaa caatctgtat   240
ctgcagatga acagcctgag gctgaggac accgcactgt actattgtgc aaccggtac   300
ggggaagcat ggtttgccta ttgggggcag ggaaccctg tgacagtctc tagt         354
```

```
SEQ ID NO: 20              moltype = AA   length = 118
FEATURE                    Location/Qualifiers
REGION                     1..118
                           note = The amino acid sequence of 14C12H1L1 heavy chain
                            variable region
source                     1..118
                           mol_type = protein
                           organism = synthetic construct
SEQUENCE: 20
EVQLVESGGG LVQPGGSLRL SCAASGFAFS SYDMSWVRQA PGKGLDWVAT ISGGGRYTYY   60
PDSVKGRFTI SRDNSKNNLY LQMNSLRAED TALYYCANRY GEAWFAYWGQ GTLVTVSS    118

SEQ ID NO: 21              moltype = DNA   length = 321
FEATURE                    Location/Qualifiers
misc_feature               1..321
                           note = Nucleic acid sequence of 14C12H1L1 light chain
                            variable region
source                     1..321
                           mol_type = other DNA
                           organism = synthetic construct
SEQUENCE: 21
gacattcaga tgactcagag ccccctcctcc atgtccgcct ctgtgggcga cagggtcacc   60
ttcacatgcc gcgctagtca ggatatcaac acctacctga ctggtttca gcagaagcca   120
gggaaaagcc ccaagacact gatctaccgg gctaatagac tggtgtctgg agtcccaagt  180
cggttcagtg gctcagggag cggacaggac tacactctga ccatcagctc cctgcagcct  240
gaggacatgg caacctacta ttgcctgcag tatgatgagt tcccactgac ctttggcgcc  300
gggacaaaac tggagctgaa g                                             321

SEQ ID NO: 22              moltype = AA   length = 107
FEATURE                    Location/Qualifiers
REGION                     1..107
                           note = The amino acid sequence of 14C12H1L1 light chain
                            variable region
source                     1..107
                           mol_type = protein
                           organism = synthetic construct
SEQUENCE: 22
DIQMTQSPSS MSASVGDRVT FTCRASQDIN TYLSWFQQKP GKSPKTLIYR ANRLVSGVPS   60
RFSGSGSGQD YTLTISSLQP EDMATYYCLQ YDEFPLTFGA GTKLELK                 107

SEQ ID NO: 23              moltype = AA   length = 15
FEATURE                    Location/Qualifiers
REGION                     1..15
                           note = Linker 1
source                     1..15
                           mol_type = protein
                           organism = synthetic construct
SEQUENCE: 23
GGGGSGGGGS GGGGS                                                    15

SEQ ID NO: 24              moltype = AA   length = 20
FEATURE                    Location/Qualifiers
REGION                     1..20
                           note = Linker 2
source                     1..20
                           mol_type = protein
                           organism = synthetic construct
SEQUENCE: 24
GGGGSGGGGS GGGGSGGGGS                                               20

SEQ ID NO: 25              moltype = AA   length = 115
FEATURE                    Location/Qualifiers
REGION                     1..115
                           note = The amino acid sequence of 8D2H14L2 heavy chain
                            variable region
source                     1..115
                           mol_type = protein
                           organism = synthetic construct
SEQUENCE: 25
EVQLVESGGG LVQPGGSSRL SCAASGFTFS DNWMNWVRQA PGKGLEWLAQ IRNKPYNYET   60
YYSASVKGRF TISRDDSKNS VYLQMNSLKT EDTGVYYCTA QFAYWGQGTL VTVSS        115

SEQ ID NO: 26              moltype = DNA   length = 345
FEATURE                    Location/Qualifiers
misc_feature               1..345
                           note = Nucleic acid sequence of 8D2H14L2 heavy chain
                            variable region
source                     1..345
```

```
                         mol_type = other DNA
                         organism = synthetic construct
SEQUENCE: 26
gaggtgcagc tggtcgaatc tggaggagga ctggtgcagc ctggaggaag ctcccggctg      60
tcatgtgccg ctagcggctt cacctttttcc gacaactgga tgaattgggt gcgacaggca   120
ccaggcaaag gactggagtg gctggctcag atccggaaca agccctacaa ttatgaaaca    180
tactatagcg cctccgtgaa aggccggttc actattagta gagacgattc taagaacagc    240
gtgtacctgc agatgaatag cctgaaagaca gaggatactg gcgtctacta ttgcacagca   300
cagtttgcct attggggaca gggcaccctg gtgacagtct ctagt                   345

SEQ ID NO: 27           moltype = AA  length = 107
FEATURE                 Location/Qualifiers
REGION                  1..107
                        note = The amino acid sequence of 8D2H14L2 light chain
                         variable region
source                  1..107
                        mol_type = protein
                        organism = synthetic construct
SEQUENCE: 27
DIQMTQSPSS LSASVGDRVT ITCRTSENIY GGLNWYQRKP GKSPKLLIYG ATNLASGVSS     60
RFSGSGSGTD YTLTISSLQP EDVATYYCQN VLRSPFTFGS GTKLEIK                  107

SEQ ID NO: 28           moltype = DNA  length = 321
FEATURE                 Location/Qualifiers
misc_feature            1..321
                        note = Nucleic acid sequence of 8D2H14L2 light chain
                         variable region
source                  1..321
                        mol_type = other DNA
                        organism = synthetic construct
SEQUENCE: 28
gacatccaga tgactcagag ccccctcaagc ctgtctgcaa gtgtgggcga tagggtcacc    60
atcacatgtc gcacctccga aaacatctac gggggactga attggtatca gcgcaagccc   120
ggcaaatccc ctaagctgct gatctacggc gctaccaacc tggcatctgg ggtgtcctct   180
cgattttcag ggagcggcag cggcaccgac tatactctga ccattagttc actgcagcct   240
gaggatgtgg ccacatacta ttgccagaat gtcctgagat caccattcac ttttgggagc   300
ggaaccaaac tggaaattaa g                                             321

SEQ ID NO: 29           moltype = AA  length = 8
FEATURE                 Location/Qualifiers
REGION                  1..8
                        note = 14C12HCDR1
source                  1..8
                        mol_type = protein
                        organism = synthetic construct
SEQUENCE: 29
GFAFSSYD                                                              8

SEQ ID NO: 30           moltype = AA  length = 8
FEATURE                 Location/Qualifiers
REGION                  1..8
                        note = 14C12HCDR2
source                  1..8
                        mol_type = protein
                        organism = synthetic construct
SEQUENCE: 30
ISGGGRYT                                                              8

SEQ ID NO: 31           moltype = AA  length = 11
FEATURE                 Location/Qualifiers
REGION                  1..11
                        note = 14C12HCDR3
source                  1..11
                        mol_type = protein
                        organism = synthetic construct
SEQUENCE: 31
ANRYGEAWFA Y                                                         11

SEQ ID NO: 32           moltype = AA  length = 6
FEATURE                 Location/Qualifiers
REGION                  1..6
                        note = 14C12LCDR1
source                  1..6
                        mol_type = protein
                        organism = synthetic construct
SEQUENCE: 32
QDINTY                                                                6

SEQ ID NO: 33           moltype =     length =
```

```
SEQUENCE: 33
000

SEQ ID NO: 34            moltype = AA   length = 9
FEATURE                  Location/Qualifiers
REGION                   1..9
                         note = 14C12LCDR3
source                   1..9
                         mol_type = protein
                         organism = synthetic construct
SEQUENCE: 34
LQYDEFPLT                                                                  9

SEQ ID NO: 35            moltype = AA   length = 8
FEATURE                  Location/Qualifiers
REGION                   1..8
                         note = 4G10HCDR1
source                   1..8
                         mol_type = protein
                         organism = synthetic construct
SEQUENCE: 35
GYSFTGYT                                                                   8

SEQ ID NO: 36            moltype = AA   length = 8
FEATURE                  Location/Qualifiers
REGION                   1..8
                         note = 4G10HCR2
source                   1..8
                         mol_type = protein
                         organism = synthetic construct
SEQUENCE: 36
INPYNNIT                                                                   8

SEQ ID NO: 37            moltype = AA   length = 8
FEATURE                  Location/Qualifiers
REGION                   1..8
                         note = 4G10HCDR3
source                   1..8
                         mol_type = protein
                         organism = synthetic construct
SEQUENCE: 37
ARLDYRSY                                                                   8

SEQ ID NO: 38            moltype = AA   length = 9
FEATURE                  Location/Qualifiers
REGION                   1..9
                         note = 4G10LCDR1
source                   1..9
                         mol_type = protein
                         organism = synthetic construct
SEQUENCE: 38
TGAVTTSNF                                                                  9

SEQ ID NO: 39            moltype =     length =
SEQUENCE: 39
000

SEQ ID NO: 40            moltype = AA   length = 9
FEATURE                  Location/Qualifiers
REGION                   1..9
                         note = 4G10LCDR3
source                   1..9
                         mol_type = protein
                         organism = synthetic construct
SEQUENCE: 40
ALWYSNHWV                                                                  9

SEQ ID NO: 41            moltype = AA   length = 8
FEATURE                  Location/Qualifiers
REGION                   1..8
                         note = 4G10H4L3HCDR2
source                   1..8
                         mol_type = protein
                         organism = synthetic construct
SEQUENCE: 41
INPYNDIT                                                                   8

SEQ ID NO: 42            moltype = AA   length = 8
FEATURE                  Location/Qualifiers
```

```
REGION                  1..8
                        note = 8D2H14L2HCDR1
source                  1..8
                        mol_type = protein
                        organism = synthetic construct
SEQUENCE: 42
GFTFSDNW                                                                        8

SEQ ID NO: 43           moltype = AA  length = 10
FEATURE                 Location/Qualifiers
REGION                  1..10
                        note = 8D2H14L2HCDR2
source                  1..10
                        mol_type = protein
                        organism = synthetic construct
SEQUENCE: 43
IRNKPYNYET                                                                     10

SEQ ID NO: 44           moltype = AA  length = 6
FEATURE                 Location/Qualifiers
REGION                  1..6
                        note = 8D2H14L2HCDR3
source                  1..6
                        mol_type = protein
                        organism = synthetic construct
SEQUENCE: 44
TAQFAY                                                                          6

SEQ ID NO: 45           moltype = AA  length = 6
FEATURE                 Location/Qualifiers
REGION                  1..6
                        note = 8D2H14L2LCDR1
source                  1..6
                        mol_type = protein
                        organism = synthetic construct
SEQUENCE: 45
ENIYGG                                                                          6

SEQ ID NO: 46           moltype =     length =
SEQUENCE: 46
000

SEQ ID NO: 47           moltype = AA  length = 10
FEATURE                 Location/Qualifiers
REGION                  1..10
                        note = 8D2H14L2LCDR3
source                  1..10
                        mol_type = protein
                        organism = synthetic construct
SEQUENCE: 47
QNVLRSPFTF                                                                     10
```